(12) United States Patent
Sawabe et al.

(10) Patent No.: US 6,859,421 B2
(45) Date of Patent: *Feb. 22, 2005

(54) APPARATUS FOR REPRODUCING INFORMATION FROM RECORD MEDIUM ON WHICH AUDIO INFORMATION OF DIFFERING RECORDING METHODS IS RECORDED

(75) Inventors: Takao Sawabe, Tokyo-to (JP); Kaoru Yamamoto, Tsurugashima (JP); Hidehiro Ishii, Tokorozawa (JP); Shozo Ema, Tokorozawa (JP); Tokihiro Takahashi, Kawagoe (JP); Yoshinori Hasegawa, Tokyo-to (JP)

(73) Assignee: Pioneer Electronic Corporation, Tokyo-to (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/058,098

(22) Filed: Jan. 29, 2002

(65) Prior Publication Data

US 2002/0101804 A1 Aug. 1, 2002

Related U.S. Application Data

(62) Division of application No. 09/288,641, filed on Apr. 9, 1999, now Pat. No. 6,687,211.

(30) Foreign Application Priority Data

Apr. 10, 1998 (JP) .......................... P10-116149

(51) Int. Cl.⁷ .............................. G11B 21/08; G11B 7/24
(52) U.S. Cl. ................................ 369/30.01; 369/47.16; 369/53.37; 369/275.3
(58) Field of Search ........................... 369/275.3, 275.1, 369/30.04, 30.18, 59.29, 47.54, 47.16, 47.24, 53.31, 53.37, 59.13; 386/126, 96–99; 700/94

(56) References Cited

U.S. PATENT DOCUMENTS

| 4,847,816 | A | * | 7/1989 | Kawahara et al. |
|---|---|---|---|---|
| 5,315,570 | A | * | 5/1994 | Miura et al. |
| 5,646,931 | A | * | 7/1997 | Terasaki |
| 5,748,835 | A | * | 5/1998 | Lee ........................ 386/97 X |
| 5,754,521 | A | | 5/1998 | Yokota |
| 5,960,152 | A | | 9/1999 | Sawabe et al. |
| 5,966,352 | A | | 10/1999 | Sawabe et al. |

(List continued on next page.)

*Primary Examiner*—Ali Neyzari
(74) *Attorney, Agent, or Firm*—Morgan Lewis & Bockius LLP

(57) ABSTRACT

An information record medium (1) is provided with: an audio information recording area on which a plurality of audio information (210) which are different in recording method are recorded; and a control information recording area on which control information (211) required to reproduce the plurality of audio information recorded on the audio information recording area is recorded. The control information recorded on the control information recording area includes identification information indicating that the plurality of audio information are same in content and different in recording method with each other. The control information may include a plurality of first division information for identifying first division units (260) respectively so as to divide each of the plurality of audio information recorded on the audio information recording area by the first division units respectively. The first division information, which indicates that the audio information divided by the first division units belongs to a same first division unit, may be provided as the identification information for each of the plurality of audio information same in content and different in recording method.

28 Claims, 23 Drawing Sheets

U.S. PATENT DOCUMENTS

| | | | |
|---|---|---|---|
| 5,987,417 A | * | 11/1999 | Heo et al. |
| 5,991,496 A | | 11/1999 | Kojima |
| 6,016,295 A | * | 1/2000 | Endoh et al. |
| 6,034,942 A | | 3/2000 | Yoshio et al. |
| 6,072,759 A | | 6/2000 | Maeda et al. |
| 6,104,684 A | | 8/2000 | Moriyama et al. |
| 6,160,953 A | | 12/2000 | Fuchigami et al. |
| 6,169,847 B1 | | 1/2001 | Mizoguchi et al. |
| 6,222,805 B1 | * | 4/2001 | Mori et al. |
| 6,246,645 B1 | * | 6/2001 | Tsutsui ............... 369/47.24 |
| 6,308,006 B1 | | 10/2001 | Yamamoto et al. |
| 6,353,580 B1 | | 3/2002 | Mons |
| 6,392,969 B1 | * | 5/2002 | Heo ............... 369/47.16 X |
| 6,396,781 B2 | | 5/2002 | Ishii et al. |

* cited by examiner

LOGICAL STRUCTRE OF RECORD INFORMATION
(LOGICAL FORMAT)

FIG. 5
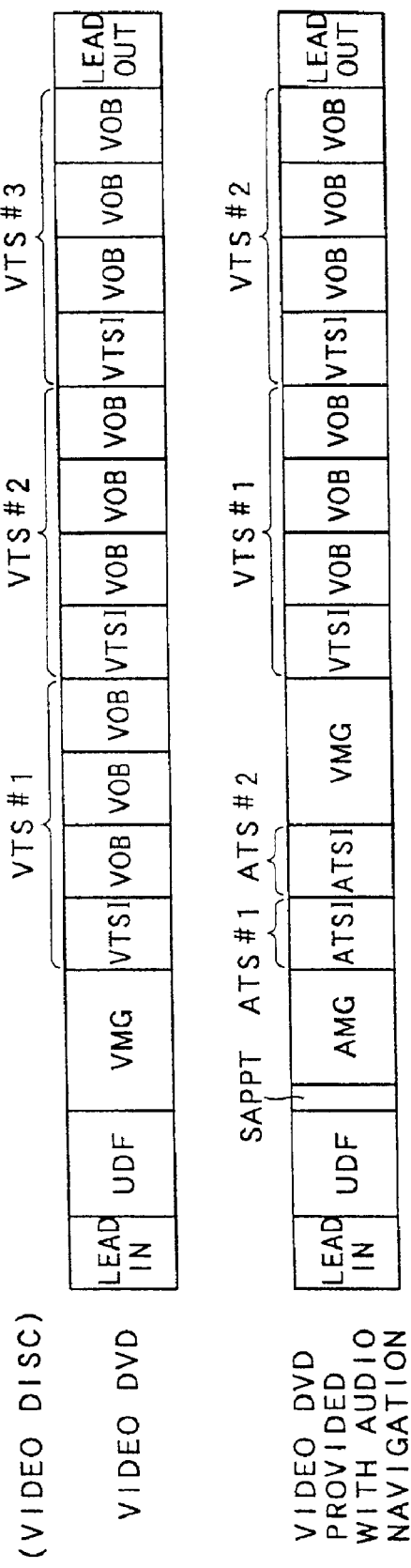
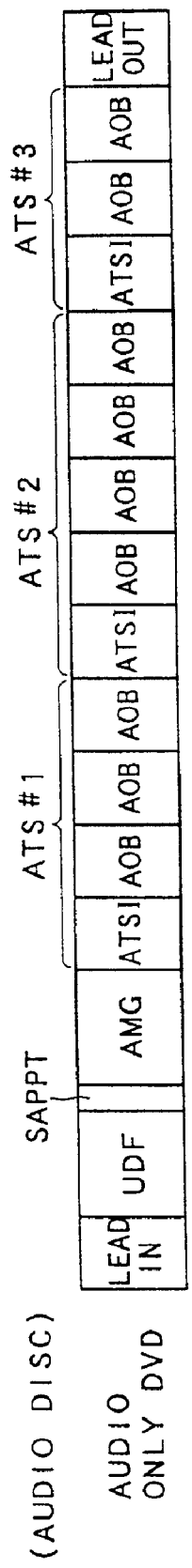
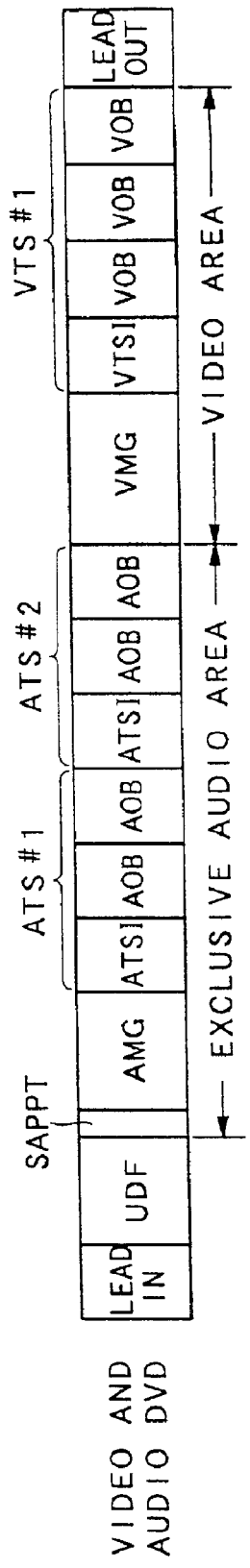

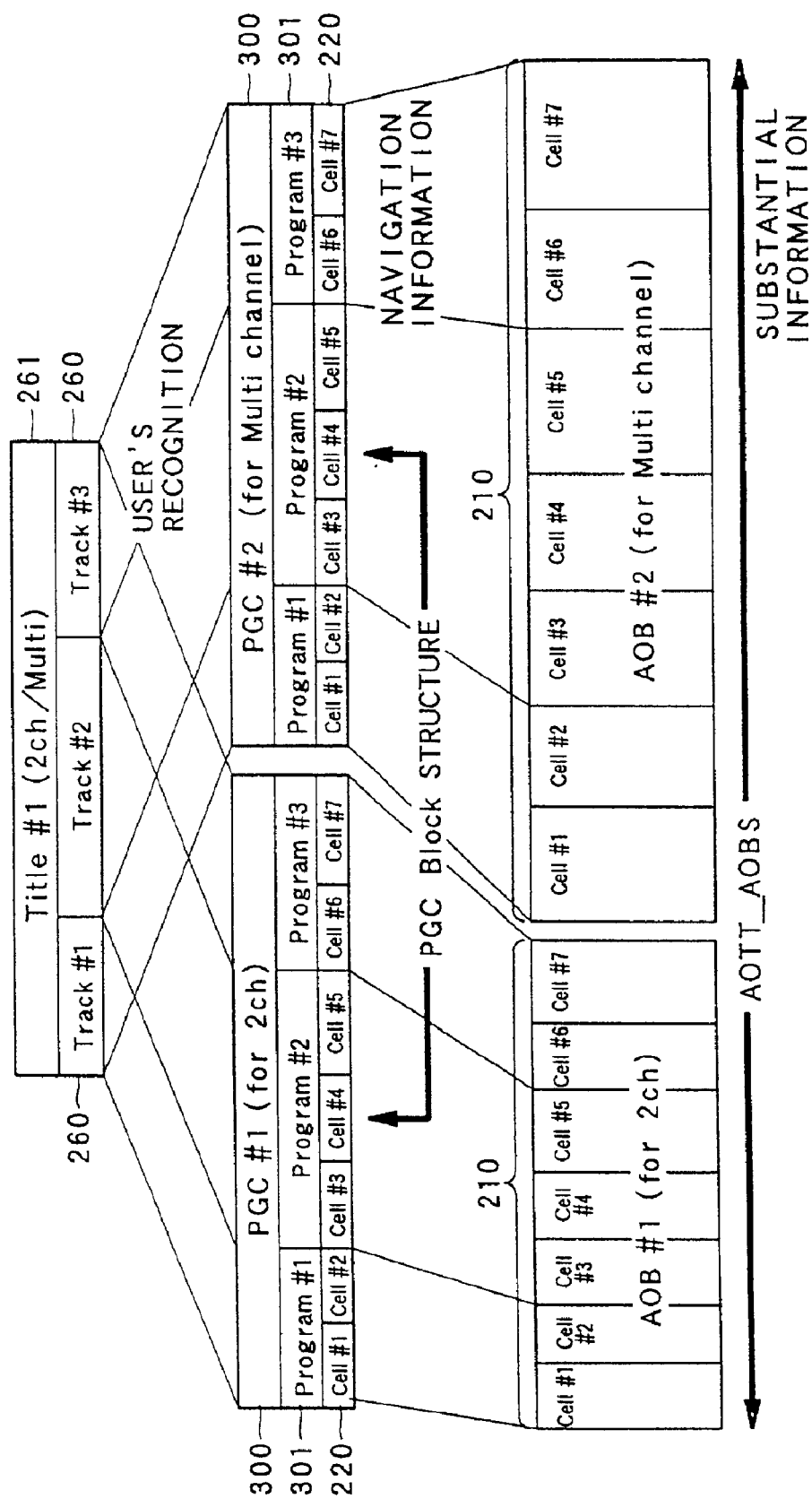

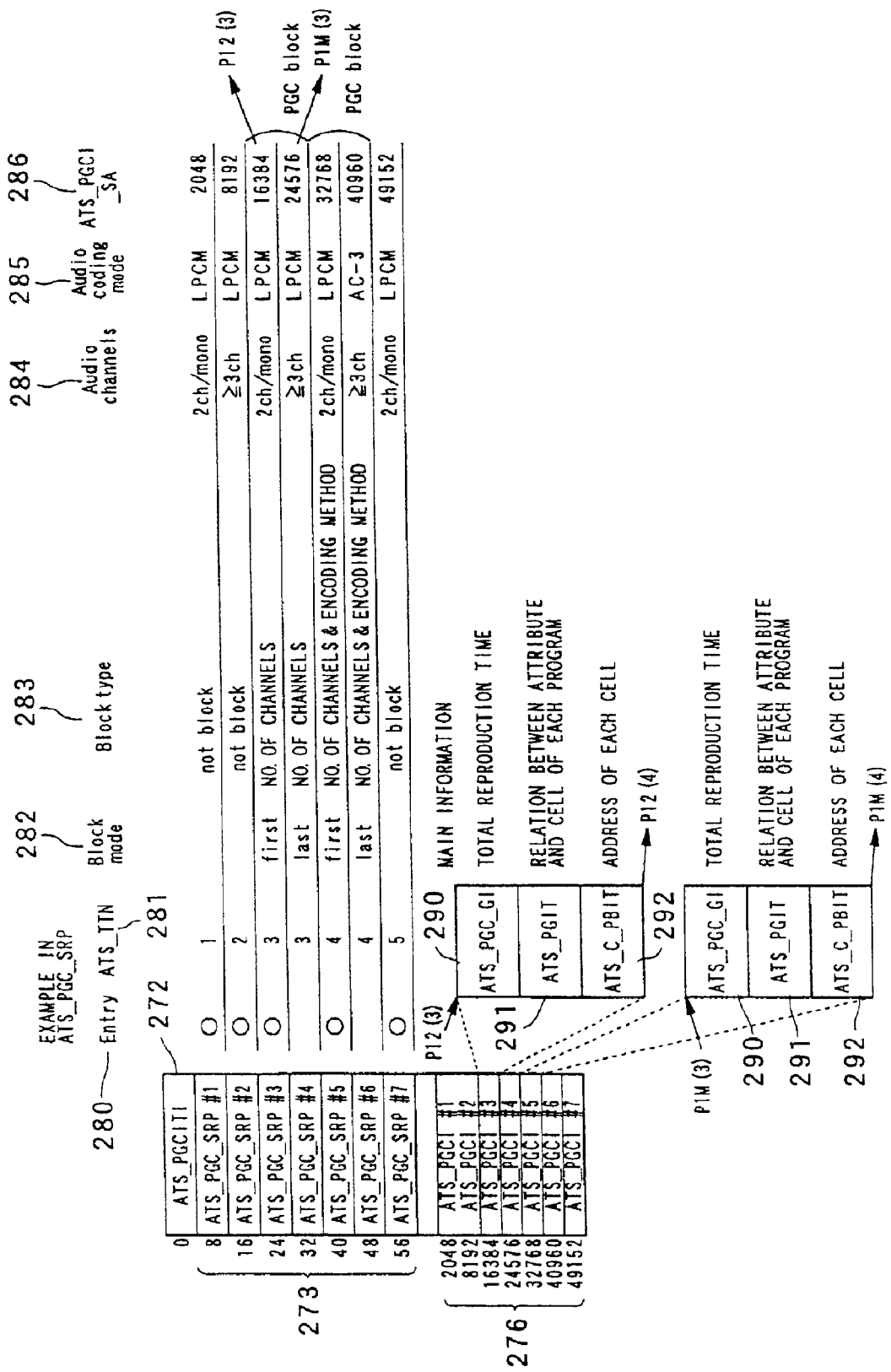

APPARATUS FOR REPRODUCING INFORMATION FROM RECORD MEDIUM ON WHICH AUDIO INFORMATION OF DIFFERING RECORDING METHODS IS RECORDED

This application is Divisional of application Ser. No. 09/288,641, filed on Apr. 9, 1999, now U.S. Pat. No. 6,687,211.

BACKGROUND OF THE INVENTION

1. Field of the Invention

The present invention relates to an information record medium such as a DVD disc, on which audio information of music and the like which are different in the recording methods or encoding methods are recorded, and a reproducing apparatus for reproducing the audio information and the like.

2. Description of the Related Art

There is a video DVD (which is a disc conformable to a DVD-Video standard) as a recording medium for recording video information such as a movie and the like. The video DVD is used as a recording medium for recording the movie and the like, since it has a large capacity.

There is an audio DVD (which a disc conformable to a DVD-Audio standard) to record only the audio information such as a music and the like but not the video information such as the movie and the like. In a case of this audio DVD, the audio information corresponding to a plurality of CDs (Compact Discs) can be recorded on a single audio DVD, because of its large capacity as the DVD. In addition to the video information such as the movie and the like, the audio DVD can also record the audio information corresponding to a music CD that is a sound track version of that movie.

It is intended that the audio DVD mainly records the audio information such as a music and the like, and also enables the reproduction of unprecedented multi-channel. Moreover, it is intended that the audio DVD enables the reproduction of unprecedented high quality even as not only the multi-channel but also a two-channel stereo.

In such a DVD audio disc, if only the audio information of the multi-channel is recorded, this results in such a problem that a user having the two-channel reproducing apparatus can listen to only a part of the sound thereof, or the reproduction cannot be performed at all.

So, it is necessary to record the audio information for the two-channel reproduction together with the audio information for the multi-channel reproduction on the disc, in order for even the user having only the reproducing apparatus dedicated to the two-channel to enjoy this disc.

However, in this case, these two kinds of audio information are duly the same title and the same song. Thus, recording these two kinds of audio information as they are on the disc leads to the existence of the two kinds of titles having the same name and songs having the same name. Hence, this results in a first problem that the user is confused. This first problem is similarly brought about not only in a case when a reproducing manner of the channel and the like is different, but also in a case when a recording manner such as a binaurally recording operation and the like is different, in a case when an encoding method such as an AC-3 and the like is different and in a case when a combination of the reproducing manner, the recording manner or the encoding method is different.

Next, in an already-standardized DVD video format, a plurality of audio information can be recorded together with video information, at the same time. For example, it is possible to switch between a voice of an original language and a voice dubbed in Japanese, for a certain movie. Similarly, it is also possible to switch between an LPCM stereo voice and an AC-3 multi-channel voice, under the same title. Thus, the plurality of audio information can be treated as the same title and the same song. Hence, it is possible to change an audio stream to thereby change the kind of audio information to be reproduced.

On the other hand, it is desired to record the video information even on the audio DVD, so as to record the video information such as a menu and additional information. In this case, if an image is recorded by using a method different from the DVD video format, this cannot attain the compatibility with the video format. It is desirable to reproduce a portion where the image is attached on the audio disc, even for a video player which is presently marketed.

Thus, from these viewpoints, it is desirable that the structure to record the substantial information containing the image is similar to that of the DVD video format.

However, in order to achieve that structure, it is necessary to multiplex a plurality of kinds of audio information and then record them on the disc as one object. Also, in order to manage a plurality of streams, it is necessary that management information is included in the data. Thus, the case of having the same structure as the video format reduces the process necessary for the switching operation of the reproducing apparatus at the time of the reproduction. However, this case brings about such a trouble that the process at the time of the recording becomes complex.

The performance for the recording operation and the conformity with a presently-used studio unit are significant, and the non-complex process in the recording operation are desired for the audio format. In particular, the structure that the management information is not included in the data is desired.

Thus, there are two kinds of structures i.e., a structure peculiar to the DVD audio format in the case of recording only the audio information and a structure conformable to the DVD video format containing the image. When only the audio information is reproduced for the data having the two kinds of structures, there are the two kinds of formats, which are completely different from each other, in the reproduction control information, unless the logical structures are common. Hence, the process in the reproducing apparatus becomes heavy, which cannot provide a unified operation. Therefore, this results in a second problem that the user is confused.

SUMMARY OF THE INVENTION

The present invention is proposed in view of the above mentioned problems. It is therefore a first subject of the present invention to provide an information record medium, from which respective audio information can be properly reproduced without introducing a confusion to a user even if a plurality of audio information different in recording methods, reproducing manners and/or encoding methods are recorded on the information record medium, and an information reproducing apparatus, which can properly reproduce the respective audio information from the information record medium.

Moreover, it is a second object of the present invention to provide an information record medium, which can offer an environment to select a plurality of kinds of audio information by using a unified operation without the consciousness of a structural difference between two information record mediums even if one of them has a structure peculiar to the DVD audio format for recording only audio information and the other of them has a structure conformable to the DVD video format containing an image, and further a reproducing apparatus which can properly reproduce it.

1) The above first object of the present invention can be achieved by a first information record medium such as an DVD provided with: an audio information recording area on which a plurality of audio information (e.g., AOB #1, AOB #2, . . . ) which are different in recording method are recorded; and a control information recording area on which control information (e.g., ATSI) required to reproduce the plurality of audio information recorded on the audio information recording area is recorded. The control information recorded on the control information recording area includes identification information indicating that the plurality of audio information are same in content and different in recording method with each other.

According to the information record medium of the present invention, the control information recorded on the control information recording area is read out by an information reproducing apparatus. Then, a desirable audio information is searched from the plurality of audio information recorded on the audio information recording area, and a reproduction of the searched audio information is performed. Therefore, since the plurality of audio information same in content and different in recording method are recorded on the audio information recording area, it is necessary to search the audio information for respective one of the plurality of audio information. However, by virtue of the identification information included in the control information, such a fact that the desired audio information corresponds to the plurality of audio information of such type (i.e., which are different in recording method and same in content) is recognized. Accordingly, at the stage that the user designates the audio information to be reproduced by the information reproducing apparatus, just by performing a designation corresponding to the content of the desired audio information, one of the plurality of audio information in a particular recording method corresponding to a processing capability of the pertinent information reproducing apparatus for example, is searched and reproduced. In this manner, since the plurality of audio information different in recording method and same in content can be managed under the content thereof, it is possible to give no confusion or mess in the operation to the user.

2) In one aspect of the information record medium of the present invention, the control information includes a plurality of first division information (e.g., track number or ATS title number in one title) for identifying first division units (e.g., tracks or ATS titles) respectively so as to divide each of the plurality of audio information recorded on the audio information recording area by the first division units respectively. The first division information, which indicates that the audio information divided by the first division units belongs to a same first division unit, is provided for each of the plurality of audio information same in content and different in recording method.

According to this aspect, the first division information as one portion of the control information recorded on the control information recording area is read out by an information reproducing apparatus. Then, the first division unit to which a desirable audio information belongs is searched, and a reproduction of the audio information belonging to the searched first division unit is performed. Therefore, since the plurality of audio information same in content and different in recording method are recorded for the first division units respectively, it is necessary to search the first division unit for respective one of the plurality of audio information. However, the first division information as the identification information, which indicates that the audio information divided by the first division units belong to a same first division unit, is provided for each of the plurality of audio information same in content and different in recording method. Namely, the plurality of audio information indicated by the same first division information are different in recording method, belong to the same first division unit and are same in content. Consequently, as a designation for such audio information, a designation corresponding to a single first division information is enough. And that, since this single first division information is respectively provided for the plurality of audio information different in recording method and same in content, such a fact that the desired audio information corresponds to the plurality of audio information of such type (i.e., which are different in recording method and same in content) is recognized by the information reproducing apparatus when reading the first division information. Then, after recognizing this fact, one of the plurality of audio information in a particular recording method corresponding to a processing capability of the pertinent information reproducing apparatus for example, among the plurality of audio information belonging to the single first division unit indicated by the pertinent single first division information is reproduced. In this manner, since the plurality of audio information different in recording method and same in content can be managed under the content thereof, it is not necessary for a user to designate the audio information for each of the plurality of audio information even in the presence of the plurality of audio information different in recording method and same in content. Thus, it is possible to give no confusion or mess in the operation to the user 3) In one aspect of the first information record medium of the present invention, the control information (ATSI) further includes: a plurality of second division information (e.g., program number) for identifying second division units (e.g., programs) respectively so as to divide each of the plurality of audio information recorded on the audio information recording area by the second division units as a single reproduction unit; and a plurality of management information for correlating the plurality of second division information and the plurality of first division information with each other so that the audio information divided by the first division units are composed of one or a plurality of the audio information divided by the second division units. The management information is provided for each of the plurality of audio information so as to respectively correlate the second division information, which identifies a same second division unit to which the plurality of audio information same in content and different in recording method belong, with the first division information for identifying the same first division unit to which the plurality of audio information same in content and different in recording method belong, for each of the plurality of audio information same in content and different in recording method.

According to this aspect, the first division information as one portion of the control information recorded on the control information recording area is read out by an information reproducing apparatus, and the first division unit to which a desirable audio information belongs is searched. Then, the management information corresponding to the first division information indicating the searched first division unit is read out, and the second division information correlated with this first division information is read out. By this second division information, with respect to the audio information in the previously searched first division unit, the search for the second division unit us further performed, and the audio information is reproduced for each reproduction unit. Alternatively, if a designation of the second division unit is directly performed by a user, the search for this second division unit designated by the user is performed in the same procedure, and only the audio information in the designated second division unit is reproduced.

The plurality of audio information same in content and different in recording method are recorded for each of the first division units on the audio information recording area. The first division information as the identification information, which indicates that the audio information divided by the first division units belong to a same first division unit, is provided for each of the plurality of audio information same in content and different in recording method. Further, with respect to this first division information, the second division information is correlated by the management information for each of the plurality of audio information same in content and different in recording method. The second division information gives a same second division unit to which the plurality of audio information same in content and different in recording method belong. As mentioned above, although the first division information is provided for each of the plurality of audio information same in content and different in recording method, since the content thereof is the same, the single first division information is given. The second division information is provided for each of the plurality of audio information same in content and different in recording method, since the content thereof is the same, the single second division information is given. Therefore, in case of reproducing the plurality of audio information different in recording method recorded on the audio recording area, the processes of searching for the first division unit and the second division unit are the same for the plurality of audio information different in recording method. Thus, it is possible to perform a continuous reproduction of the second division units or a reproduction of the designated second division unit by a single process under a single designation. In this manner, since the plurality of audio information different in recording method and same in content can be managed under the content thereof and for each of the reproduction units, it is not necessary for a user to designate the audio information for each of the plurality of audio information even in the presence of the plurality of audio information different in recording method and same in content. Thus, it is possible to give no confusion or mess in the operation to the user. Therefore, even the audio information recorded in the DVD video format can be reproduced in accordance with the control information of the DVD audio format.

4) In this aspect, the management information may respectively correlate the second division information for identifying the second division units, the numbers and orders (e.g., the number of programs and the order of programs) of which are same to each other, with the first division information for each of the plurality of audio information same in content and different in recording method.

Accordingly, even if the second division information correlated to the first division information for each of the plurality of audio information same in content and different in recording method indicates a plurality of second division units, since the numbers and the orders of the second division units are to each other for each of the plurality of audio information same in content and different in recording method, the procedure to perform the search for and the reproduction of the $n^{th}$ second division unit, which divides the first division unit, can be made same to each other for each of plurality of audio information same in content and different in recording method, so that the simplification of the processes can be improved. This leads to the commonness of the processes in the information reproducing apparatus and further the commonness of the operations by the user, so that it is possible to give no confusion or mess in the operation to the user even more certainly.

5) In this case, the audio information divided by the second division units in accordance with the second division information, which is respectively correlated with the first division information for each of the plurality of audio information same in content and different in recording method, may be recorded on the audio information recording area as the audio information, whose reproduction time is substantially same for each of the plurality of audio information same in content and different in recording method.

Accordingly, even if the second division information correlated with the first division information for each of the plurality of audio information same in content and different in recording method indicates a plurality of second division units, the audio information is recorded such that the reproduction time of the audio information divided by the second division units is substantially same for each of the plurality of audio information same in content and different in recording method. Therefore, even in case of reproducing the audio information by respective one of the recording methods, it is possible to give agreeableness to the user, so that it is possible to give no confusion or mess in the operation to the user even more certainly.

6) In another aspect of the information record medium of the present invention, the plurality of audio information same in content and different in recording method, which are identified by the identification information, are multiplexed and recorded at a same recording position in the audio information recording area.

According to this aspect, the plurality of audio information same in content and different in recording method which are identified by the identification information are recorded by the record unit in the audio information recording area, where the record unit is same irrespective of the recording method of the pertinent audio information and the plurality of audio information are multiplexed and recorded at the same recording position therein. Therefore, after recognizing the plurality of audio information same in content and different in recording method by the identification information, it is possible to search the record unit where the desired audio information is recorded on the basis of the control information, and it is further possible to reproduce only the desired audio information among the multiplexed audio information in the searched record unit. Particularly, in the above described information record medium of the present invention in various aspects, the search for the record unit with respect to the plurality of audio information same in content and different in recording method is performed on the basis of the single first division unit indicated by the single first division information. Since the single first division information is provided for each of the plurality of audio information same in content and different in recording method, it is possible to have the information to select the respective audio information at the hierarchy of the first division information level. Consequently, it is possible to reproduce the audio information, which is recorded in the DVD video format, on the basis of the control information in accordance with the DVD audio format.

7) In another aspect of the information record medium of the present invention, the control information includes information indicative of the recording method as information to select one of the plurality of audio information same in content and different in recording method to be reproduced.

According to this aspect, if a desired audio information is recognized by the information reproducing apparatus as the plurality of audio information same in content and different in recording method, one of the plurality of audio information same in content and different in recording method, which is the audio information in a desirable recording method, is easily selected on the basis of the information indicative of the recording method included in the control information. Also, if the information reproducing apparatus to reproduce the pertinent information record medium has no capability of performing the process based on the desired recording method, it is possible to easily warn that the designation of the desired recording method by the user is invalid for example.

8) In another aspect of the information record medium of the present invention, the recording method is at least one of a recording form, a reproducing form and an encoding method.

According to this aspect, since the plurality of audio information same in content whose recording method is a recording form, a reproducing form or an encoding method, or combinations of those are recorded, an appropriate reproduction of the audio information corresponding to the request by the user or corresponding to the capability of the information reproducing apparatus to reproduce the pertinent information record medium can be performed with giving no confusion or mess to the user.

9) The above objects of the present invention can be achieved by an information reproducing apparatus for reproducing the above described information record medium of the present invention. The information reproducing apparatus for reproducing the audio information in accordance with the control information is provided with: a reading device for reading record information which is recorded on the information record medium and includes the audio information and the control information; an inputting device for inputting designation information to designate a condition to reproduce the information record medium; a selecting device for selecting the recording method, the audio information in which is to be reproduced, on the basis of the designation information or set information stored in a memory device; and a reproducing device for reproducing the audio information in the recording method, which is selected by the selecting device from among the plurality of audio information same in content and different in recording method, on the basis of the control information and the record information read by the reading device.

According to the information reproducing apparatus, when a user designates a desired audio information, the designation information is inputted by the inputting device. Then, the control information corresponding to the designation information inputted in this manner is read out from the information record medium by the reading device. The recording method, which is designated by the user or corresponding to the capability of the information reproducing apparatus, is selected by the selecting device, on the basis of the inputted designation information or the set information which is set and stored in the memory device in advance. Then, the audio information in the recording method selected by the selecting device from among the plurality of audio information same in content and different in recording method is reproduced by the reproducing device on the basis of the control information and the record information read by the reading device. Therefore, the search and the reproduction of the audio information of the desired recording method can be performed just by performing the designation corresponding to the content of the desired audio information by the user. In this manner, it is possible to appropriately reproduce the plurality of audio information same in content and different in recording method, which are recorded on the information record medium, with giving no confusion or mess to the user.

10) In one aspect of the information reproducing apparatus of the present invention, the apparatus is further provided with: an extracting device for extracting information indicating the recording method of each of the plurality of audio information recorded on the information record medium from the control information; and a displaying device for displaying the extracted information.

According to this aspect, the information indicating the recording method is extracted from the control information by the extracting device. Then, the extracted information is displayed by the displaying device. Therefore, the user can designate the recording method, the audio information in which is to be reproduced, with referring to the displayed recording method, so that it is possible to perform an appropriate reproduction in accordance with the request of the user.

11) In another aspect of the information reproducing apparatus of the present invention, the inputting device is set to receive an input of the designation information regardless of an operation condition of the information reproducing apparatus, and the selecting device or the reproducing device is set to perform, when a content of the designation information inputted by the inputting device is changed, respective process on the basis of the changed designation information.

According to this aspect, even while the information reproducing apparatus is reproducing or stopping, the inputting device receives the input of the designation information of the audio information by the user. Then, if the content of the designation information inputted in this manner is changed, the respective process is performed by the selecting device or the reproducing device, on the basis of the changed designation information. Therefore, since the request such as the change of the reproducing method from the user can be reflected to the reproduction of the audio information in a real time manner, it is possible to perform an even more appropriate reproduction in line with the request from the user.

12) In another aspect of the information reproducing apparatus of the present invention, the apparatus is further provided with a re-writing device for re-writing a content of set information stored in the memory device.

According to this aspect, when the user instructs re-writing of the set information by the re-writing device, the content of the set information stored in the memory device is re-written. Therefore, since the recording method suitable for the usage condition of the information reproducing apparatus etc., can be stored in advance in line with the request from the user, it is possible to provided an appropriate usage environment for the information reproducing apparatus.

13) In another aspect of the information reproducing apparatus of the present invention, the apparatus is further provided with a warning display device for performing an warning display if the recording method selected by the selecting device on the basis of the designation information or the set information cannot be processed by the information reproducing apparatus.

According to this aspect, if the recording method selected by the selecting device on the basis of the designation information or the set information cannot be processed by the pertinent information reproducing apparatus, the warning display is performed by the warning display device. Therefore, it is possible for the user to set or re-write an appropriate recording method in accordance with the capability of the pertinent information reproducing apparatus.

14) In another aspect of the information reproducing apparatus of the present invention, in the initial setting condition, the selection of the recording method by the selecting device is performed on the basis of the initial set information, which is set in advance and is stored in the memory device. Therefore, it is possible to give no trouble to the user, and it is possible to perform an appropriate reproduction by means of the recording method suitable for the information reproducing apparatus.

15) In another aspect of the information reproducing apparatus of the present invention, the apparatus is further provided with: a re-writing device for re-writing a content of set information stored in the memory device; and a warning display device for performing an warning display if the recording method selected by the selecting device on the basis of the designation information or the set information cannot be processed by the information reproducing apparatus. The selecting device selects the recording method, on the basis of (i) designation information inputted by the inputting device, (ii) set information re-written by the re-writing device and (iii) initial set information stored in the memory device in an initial setting condition, in this priority order, as long as the warning display is not performed by the warning display device.

According to this aspect, the recording method is selected, on the basis of either one of the (i) the designation information which is designated by the user in a real time manner, (ii) the set information which is re-written by the user in advance and (iii) the initial set information. The priority order is given to this selecting process. This priority order corresponds to the order of the capability of the information reproducing apparatus itself, the real time designation by the user and the initial setting. Therefore, since the capability of the information reproducing apparatus itself has the highest priority, it is possible to avoid the selection which is not suitable for the information reproducing apparatus. Further, if the designation or the re-writing is not performed by the user, an appropriate recording method is selected by the initial set information. However, this information can be appropriately re-written in accordance with the request from the user. Furthermore, even if such a re-writing is performed, since it is possible to designate the recording method in the real time manner, it is possible to perform an appropriate reproduction to which the request from the user is efficiently reflected while the recording method suitable for the information reproducing apparatus is performed.

16) In another aspect of the information reproducing apparatus of the present invention, the apparatus is further provided with a detecting device for detecting an insertion condition of a headphone plug with respect to a headphone jack. The reproducing device reproduces the audio information which is binaural-recorded if the detecting device detects that the headphone plug is inserted in the head phone jack.

In this aspect, when the user inserts the headphone plug into the headphone jack, this insertion is detected by the detecting device. Thus, in case that the audio information which is binaural-recorded is recorded on the information record medium to be reproduced, even if the designation to designate this binaural-recorded audio information is not performed, the binaural-recorded audio information suitable for the headphone reproduction is reproduced. Therefore, while it is not necessary for the user to perform a bothersome operation, it is possible to perform an appropriate reproduction in accordance with the usage condition.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 5 is a diagram showing a plurality of kinds of the DVDs;

FIG. 10 is a diagram showing a relation between substantial information, navigation information and a user's recognition at a time of reproducing an audio title;

FIG. 12B is another diagram showing the information to be recorded to the ATSI of the DVD disc recorded in the audio format;

DETAILED DESCRIPTION OF THE PREFERRED EMBODIMENTS

Referring to the accompanying drawings, embodiments of the present invention will be now explained.

(1) Format of Video DVD

First of all, a record format on a video DVD of video information and audio information (which includes music information, hereinbelow) is explained.

(1.A) Physical Format of Video DVD

A physical format of the record format on the video DVD is explained with reference to FIG. 1.

Figure 1:
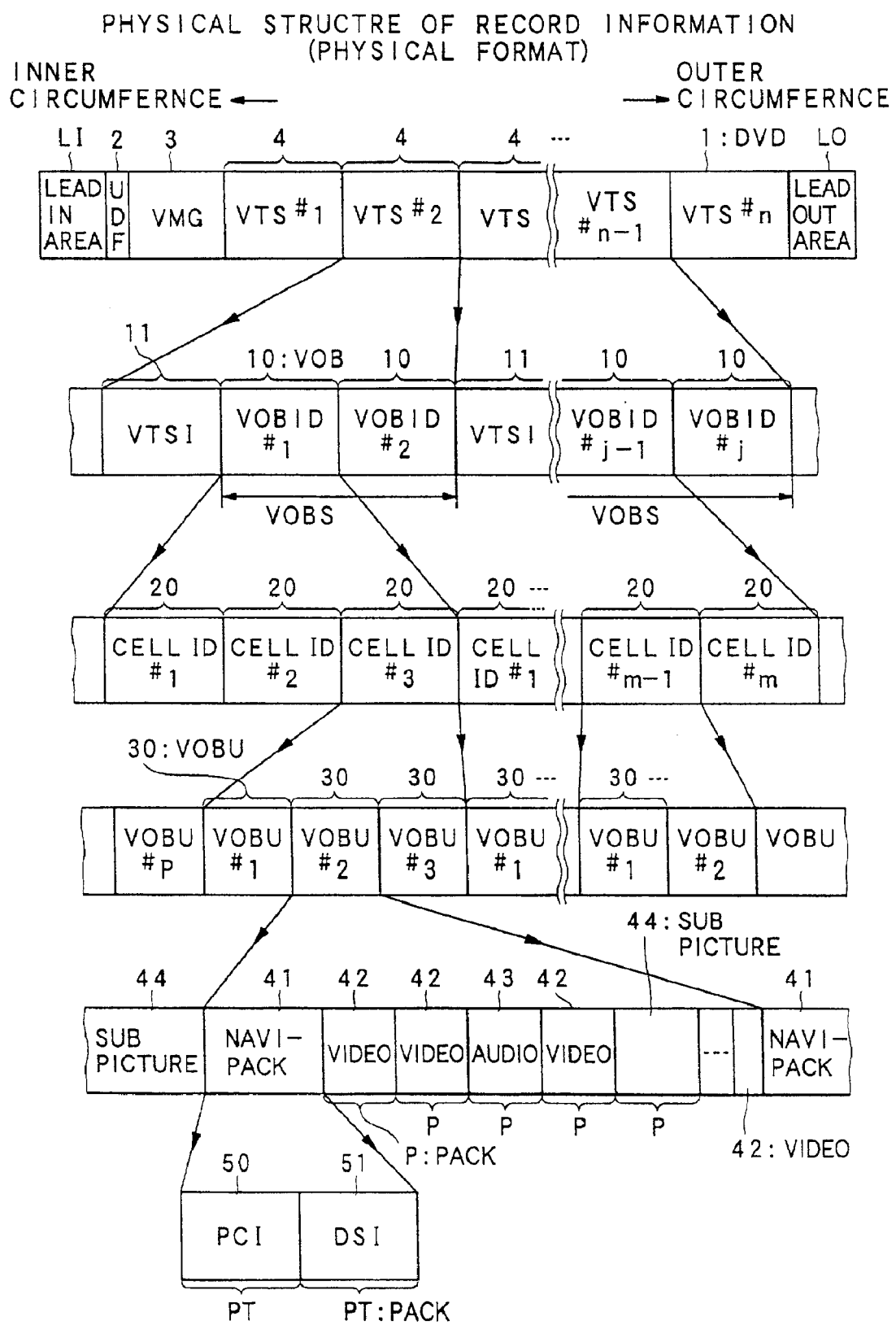
FIG. 1 is a diagram showing a physical structure (physical format) of a video DVD.

As shown in FIG. 1, a video DVD 1 is provided with a lead in area LI at its most inner circumferential portion and a lead out area LO at its most outer circumferential portion, between which video information and audio information are recorded such that they are divided into a plurality of VTSs (Video Title Sets) 4, each of which has a unique ID (Identification) number (i.e. VTS#1 to VTS#n). Here, the VTS 4 is a set (bundle) of titles (each of which is one production or one work which an author or producer intends to offer to the audience), which are related to each other (e.g., attributes, such as the number, the specification, the corresponding languages etc. of the audio information and the video information included therein are the same to each other). At an immediate outer circumferential side of the lead in area LI, there is recorded a UDF (Universal Disc Format) 2 including information to manage a format of a file recorded within the pertinent disc. Following the UDF 2, a VMG (Video Manager) 3 is recorded. As the information recorded in the video manager 3, for example, information related to the whole video and audio information recorded on the video DVD 1, such as a menu for showing a name of each title, information for preventing an illegal copy, an access table for directly accessing each title and so on, is recorded.

One VTS 4 is recorded such that it is divided into a plurality of VOBs (Video Objects) 10, each of which has an ID number (VOB ID#1, VOB ID#2, . . . ), and VTSI (Video Title Set Information) 11 disposed ahead of the VOBs 10. Here, a data portion constructed by a plurality of VOBs 10 is defined as a VOB set (VOBS) as shown in FIG. 1.

In the VTSI 11 recorded at the head of the VTS 4, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, . . . ). One cell 20 is constructed of a plurality of VOB units (VOBUs) 30, each of which has an ID number VOBU#1, VOBU#2, . . . ). Here, the VOB unit 30 is an information unit, each of which includes the video information, the audio information and sub picture information (which is defined as information of a sub picture such as a subtitle of a movie etc.), or only includes a navi-pack which is described layer.

One VOB unit 30 is provided with: a navi-pack (a navigation pack) 41 for storing various control data whose control object is the video information etc. included in the VOBU 30; a video pack 42 for storing video data as the video information; an audio pack 43 for storing audio data as the audio information; and a sub picture pack 44 for sub picture data as the sub picture information. Here, in the video pack 42, only the video information is recorded. In the audio pack 43, only the audio data is recorded. Further, in the sub picture pack 44, only the sub picture data which are graphic data such as a character and a diagram as the sub picture is recorded.

In a pack header recorded at the head of each pack P, a reading-start time information so-called as a SCR (System Clock reference), which indicates a reading-start time on a reproduction time axis to start reading the data included in each pack P from a track buffer of a reproducing apparatus described layer and inputting it into respective one of buffers, a start code indicating a start of each pack P and the like are recorded.

Finally, the navi-pack 41 is provided with: a DSI (Data Search Information) packet 51 including search information to search a video image or an audio sound desired to be displayed or sound-outputted (concretely, search information such as an address, where the video or audio to be displayed or sound-outputted is recorded, on the DVD 1); and a PCI (Presentation Control Information) packet 50 including information related to a display control at a time of displaying the video image or outputting the audio sound, which is searched on the basis of the information of the DSI packet 51.

Each video pack 42 included in one VOB unit 30 consist of at least one GOP (Group Of Pictures). The GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

(1-B) Logical Format

Nextly, a logical format (logical structure) constructed by combining the information recorded by the physical divisions shown in FIG. 1 is explained with reference to FIG. 2. The information is not actually recorded on the DVD 1 in the logical structure of FIG. 2. Instead, information (e.g. access information or time information) to reproduce each data shown in FIG. 1 by combining them (especially combining the cells 20) in the logical structure shown in FIG. 2, is recorded on the DVD 1, especially in the VTSI 11.

Figure 2:
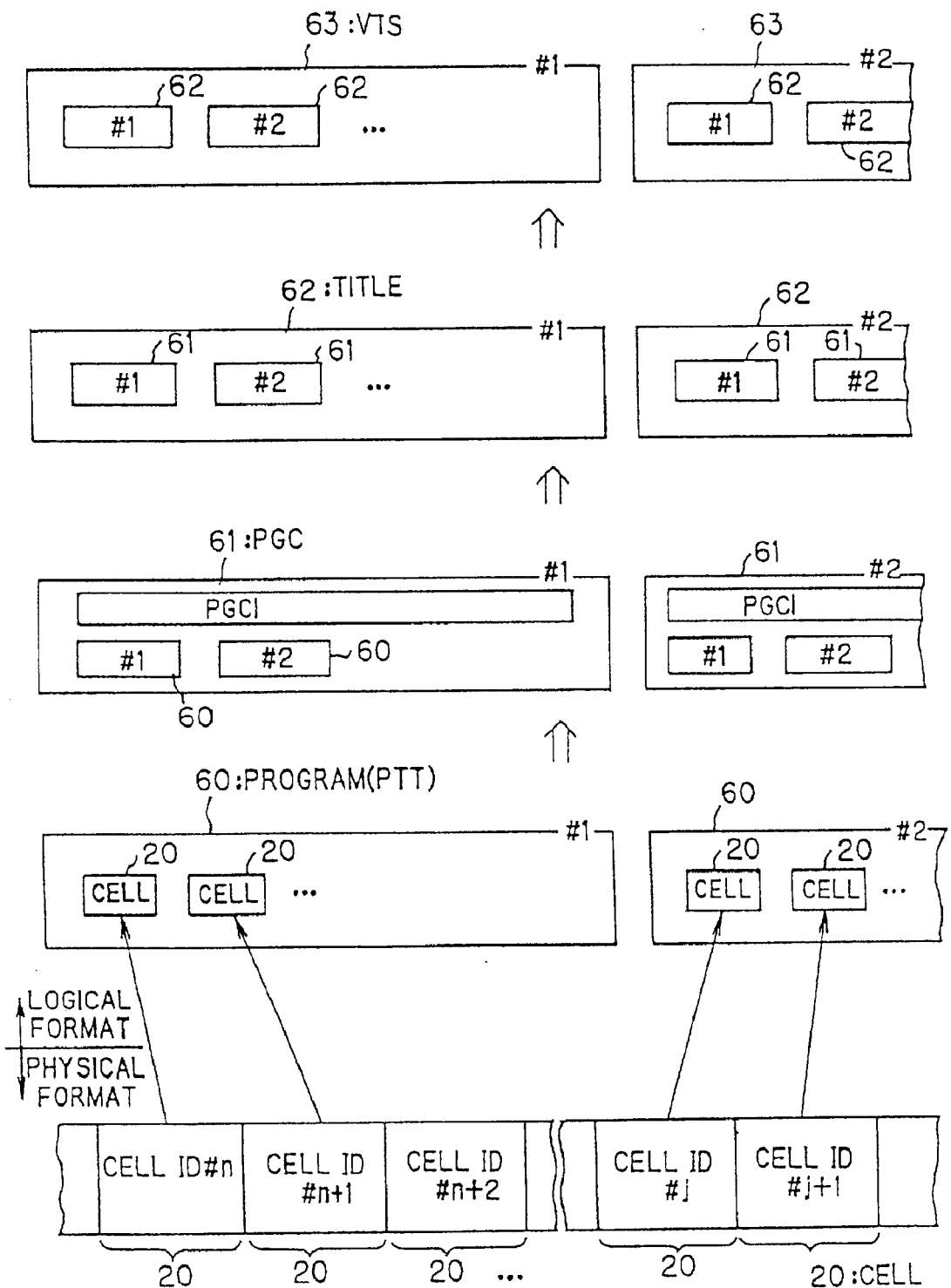
FIG. 2 is a diagram showing a logical structure (logical format) of the video DVD.

To make the explanation clear, the following explanation is made from the lower hierarchical layer in FIG. 2. One program 60 is logically constructed on the basis of the author's intention by selecting and combining a plurality of cells 20 among the physical structures explained by use of FIG. 1. It is also possible for the author to define a gathering of one or more programs 60 as a minimum unit, which can be freely selected to be watched or listened to by the audience and which is referred to as a PTT (ParT of Title).

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 2, the number is treated as the cell number in the order of description in the PGCI described later.

Next, by combining a plurality of programs 60, one PGC (Program Chain) 61 is logically constructed. The aforementioned PGCI (ProGram Chain Information) is defined by a unit of the PGC 61. The PGCI includes information indicating: the reproduction order of the cells 20 for each program 60 at a time of reproducing each program 60 (by this reproduction order, a unique program number (#1, #2, . . . ) is assigned to each program 60); an address which is a record position of each cell 20 on the DVD 1; the number of the cell 20 positioned at the head of one program 60 to be firstly reproduced; and so on.

In one PGC 61, the substantial video and audio data etc. are included as a combination of the programs 60 (in other words, the combination of the cells 20) other than the above mentioned PGCI.

Then, one title 62 is logically constructed of one or a plurality of PGCs 61 (PGC #1, PGC #2, . . . ) as shown in FIG. 2. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 2. The information included in one VTS 63 shown in FIG. 2 corresponds to information included in one VTS 4 shown in FIG. 1. Namely, all information included in the logical VTS 63 shown in FIG. 2 is recorded as one VTS 4 in the DVD 1 shown in FIG. 1.

As the author specifies the information divided in the physical structure on the DVD 1 in conformity to the above described logical format, the video image and/or the music for the audience to watch and/or listen to is to be formed.

(2) Format of Audio DVD

Next, a record format on an audio DVD of audio information (which includes music and voice information, hereinbelow) is explained.

(2-A) Physical Format of Audio DVD

A physical format of the record format on the audio DVD is explained with reference to FIG. 3.

Figure 3:
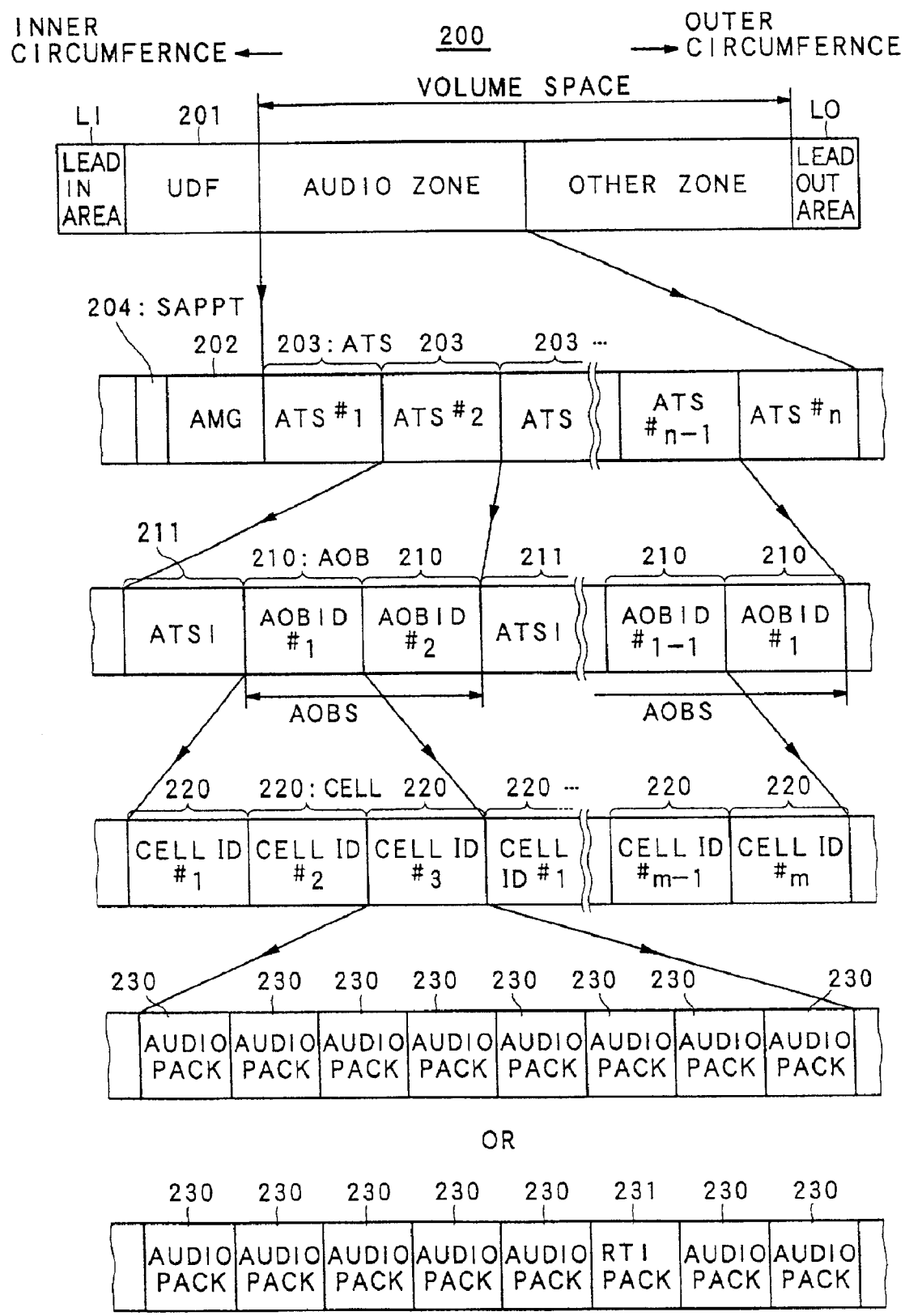
FIG. 3 is a diagram showing a physical structure (physical format) of an audio DVD.

As shown in FIG. 3, an audio DVD 200 as an embodiment is provided with the lead in area LI at its most inner circumferential portion and the lead out area LO at its most outer circumferential portion, between which one volume space is recorded. Within the volume space, an audio zone is always recorded. In this audio zone, the audio information is recorded such that it is divided into a plurality of ATSs (Audio Title Sets) 203, each of which has a unique ID (Identification) number (i.e. ATS#1 to ATS#n). At a head of the audio zone, there is recorded a SAPPT (Simple Audio Play Pointer Table) 204 as reproduction control information to perform a simple reproduction (such as a two channel reproduction). The SAPPT 204 is recorded on each of DVDs having the audio zone. The SAPPT 204 may be recorded in the lead in area LI or in an AMG 202 described later.

At the outer circumference side of the lead in area LI, a UDF (User Disc Format) 201 for managing the format of the file recorded on the audio DVD 200 is recorded, and, next to it, the SAPPT 204 is recorded, and further next to it, the AMG (Audio Manager) 202 is recorded. However, the order of the positions of the UDF 201, the SAPPT 204 and other files is not limited to this order shown in FIG. 3.

As the information recorded in the SAPPT 204, information to reproduce the LPCM data by 2 channels, for example. As the information recorded in the AMG 202, for example, management information related to the whole audio information recorded on the audio DVD 200, such as a menu for showing a name of each item, information for preventing an illegal copy, an access table for directly accessing each title and so on, is recorded.

One ATS 203 is recorded such that it is divided into a plurality of AOBs (Audio Objects) 210, each of which has an ID number (AOB ID#1, AOB ID#2, . . . ), and ATSI (Audio Title Set Information) 211 disposed ahead of the AOBs 210.

Here, a data portion constructed by a plurality of AOBs 210 is defined as an AOB set (AOBS) as shown in FIG. 3. The AOB set is the substantial portion of the audio information.

In the ATSI 211 recorded at the head of the ATS 203, information such as APGCI (Audio ProGram Chain Information) as reproduction control information, which is various information related to a program chain as a logical division obtained by combining a plurality of cells (the "cell" will be described later in detail), is recorded. In each AOB 210, the substantial portion of the audio information (i.e. the audio information itself other than control information) is recorded. One AOB 210 includes a plurality of cells 220 each having an ID number (CELL ID #1, CELL ID #2, . . . ) respectively.

One cell 220 consists of a plurality of audio packs 230 each of which has been packed, or an audio pack 230 and real time information pack 231. The audio pack 230 is a data pack into which the audio information to be recorded onto the audio DVD has been packed by each predetermined size, and includes audio information digitized by a linear PCM for example. In the real time information pack 231, text information, BPM (Beat Per Minutes) information, hand clap information and the like are included.

In the above explained record format having a hierarchical structure as shown in FIG. 3, each division can be freely set according to the author's intention, so as to perform recording the record information onto the audio DVD 200 on the basis of these set divisions. By performing the reproduction on the basis of a later described logical structure for each of these divisions, the variegated reproduction can be performed.

(2-B) Logical Format

Nextly, a logical format (logical structure) constructed by combining the information recorded by the physical divisions shown in FIG. 3 is explained with reference to FIG. 4.

Figure 4:
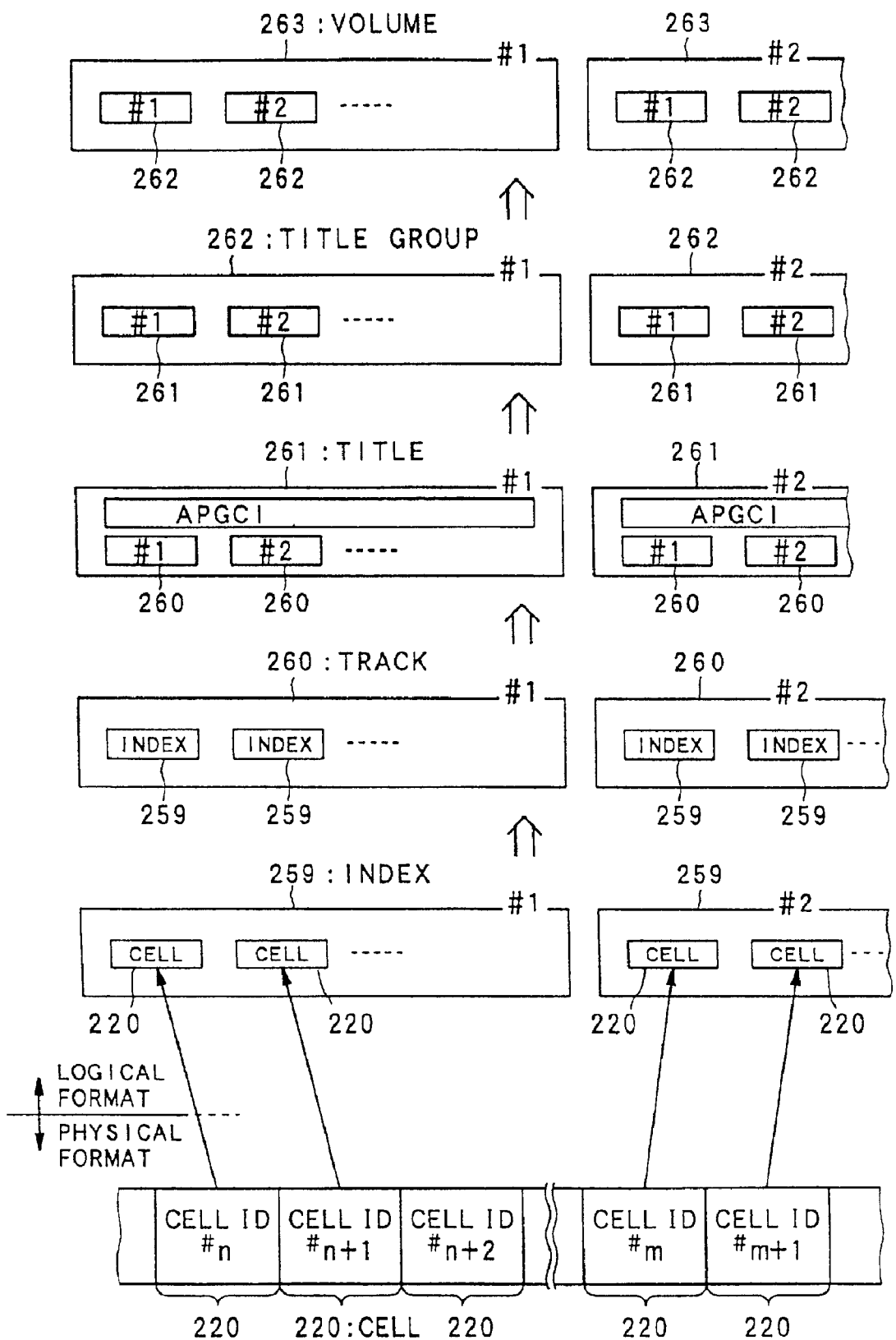
FIG. 4 is a diagram showing a logical structure (logical format) of the audio DVD.

The information is not actually recorded on the audio DVD 200 in the logical structure of FIG. 4. Instead, the audio information is recorded on the audio DVD in the physical format shown in FIG. 3, and the information to reproduce the audio information is recorded in the aforementioned SAPPT 204, AMG 202 and ATSI 211 in the logical format shown in FIG. 4.

To make the explanation clear, the following explanation is made from the lower hierarchical layer in FIG. 4. An index 259 is constructed by selecting and combining one cell 220 or a plurality of cells 220 among the physical structure explained with reference to FIG. 3. The index 259 can be used as the music number, and is the minimum unit which can be accessed by the user.

By one or a plurality of indexes 259, one track 260 is logically constructed. The track 260 is an information unit corresponding to one music composition. The user can select an arbitrary track (music composition) and directly access it.

Here, as for the number of each cell 220, at a time of treating the cell 220 on the physical format shown in FIG. 3, the number is treated as the cell ID number (which is indicated by cell ID # in FIG. 3). On the other hand, at a time of treating the cell 220 on the logical format shown in FIG. 4, the number is treated as the cell number in the order of description in the APGCI described later.

The track (music composition) 260 is an information unit including a plurality of cells, and is a group of cells having certain common attributes to each other. Namely, the attributes of all of the cells in one track 260 are the same to each other. Further, all of the cells included in the track 260 are recorded adjacent to each other within the same object.

One title 261 is logically constructed of one track 260 or a plurality of tracks 260. However, the title 261 itself is not recognized as a unit of access by the user. Therefore, it is not possible to access an arbitrary title by specifying the title number.

In case of the audio DVD, the attribute of each track 260 constructing the title 261 can be defined independently within 8 patterns at the maximum. Namely, the attribute as the audio information such as the channel number, the quantization method, the sampling frequency and the like may be changed for each track (i.e., each music composition).

The aforementioned APGCI is defined by the unit of this title 261. In the APGCI, the attribute of each track 260, the reproduction order of the cells 220 in each track 260 when reproducing each track 260, the address which is the recording position of each cell 220 on the audio DVD 220, the number of the cell 220 at the head to be reproduced on one track 260, the reproducing method of each track 260 and various commands are included.

In one title 261, the substantial audio information is included as the combination of the tracks 260 (i.e., the combination of the cells 220) other than the above mentioned APGCI.

One title group 262 is logically constructed by one or a plurality of titles 261. The title group 262 is the maximum unit which the user can access, and can be defined up to 9 groups at the maximum within one volume. This title group 262 is constructed by one or a plurality of titles 261 which are collected on the basis of a certain relationship, and all of the titles 261 within the title group 262 are continuously reproduced. For example, it is possible to collect as one title group the music compositions of a particular singer, a particular composer or the like.

One volume 262 is logically constructed by one or a plurality of title groups 262. The volume 262 is an information unit corresponding to one album (DVD).

The actual audio information included in one title shown in FIG. 4 is recorded within one ATS 203 shown in FIG. 3 on the audio DVD.

As the author specifies the information divided in the physical structure on the audio DVD 200 in conformity to the above described logical format, the music for the audience to listen to is to be formed.

(3) Kinds of DVDs

Next, the kinds of the DVDs will be explained with reference to FIG. 5. In the explanation below, as for the information recorded on the DVD, the information including both of video and audio such as a movie may be called as "AV information" while the information thereof only related to the video portion may be simply called as "video information", and the information thereof only related to the audio portion as well as the pure audio information such as music may be simply called as "audio information".

As a DVD player for reproducing the DVDs of various kinds, there are 4 kinds i.e., a video DVD player capable of reproducing the AV information in conformity to the DVD video format (hereinbelow, it is referred to as a "video player"), an audio DVD player for reproducing the audio information in conformity to the DVD audio format in various reproduction manners (hereinbelow, it is referred to as an "audio player"), a simple audio DVD player for reproducing the LPCM audio information in conformity to the DVD audio format by 2 channels (hereinbelow, it is referred to as a "simple audio player"), and a compatible DVD player capable of reproducing the AV information in conformity to the DVD video format and the audio information in conformity to the DVD audio format (hereinbelow, it is referred to as a "compatible player"). Each of those DVD players will be described later in detail.

At the present, there exist 4 kinds of discs as the DVD) on which the AV information or the audio information is recorded. Namely, there are ① a video DVD, ② a video DVD provided with audio navigation, ④ an audio only DVD and ④ audio and video DVD. FIG. 5 schematically shows the physical formats of these 4 kinds of the DVDs. Incidentally, the disc shapes and the information recording methods (e.g., the modulation methods, the track pitches, the pit sizes etc.,) are the same to each other between there 4 kinds of discs, and only the contents of these 4 kinds of discs are different from each other.

(3.1) Video DVD

The video DVD is shown at the top stage of FIG. 5. On this video DVD, the video information and the audio information to be simultaneously reproduced such as a movie in conformity to the DVD video format (i.e., the AV information) are recorded. Therefore, on the recording area between the lead in area LI and the lead out area LO, the video information and the audio information within a plurality of the VTSs are recorded other than the management information, and that the VMG including the managing/controlling information for these VTSs is also recorded. As explained before with reference to FIG. 1, the video information is recorded as the video pack and the audio information is recorded as the audio pack.

This video DVD is reproduced by the video player and the compatible player on the basis of the navigation information (which is the information for prescribing the control information for the reproduction and will be described later in detail) included in the management information recorded in the VMG. However, since the navigation information in conformity to the DVD audio format is not recorded, it cannot be reproduced by the audio player.

(3.2) Video DVD Provided with Audio Navigation

The video DVD provided with audio navigation as one kind of video discs is shown at the second top stage of FIG. 5. The video DVD provided with audio navigation enables a reproduction of the video information (including the audio information accompanying it) such as a movie in conformity to the DVD video format in the same manner as the mere video DVD by the video player, and also enables the reproduction of only the audio information in the AV information of the VOB within the VTS by the audio DVD player since the navigation information in conformity to the DVD audio format is recorded. This one portion of the AV information from which only the audio information can be reproduced by the audio DVD player is called as an "audio play part".

As for the recording format of the video DVD provided with audio navigation, the AV information is recorded within the video zone in the form of a plurality of VTSs in conformity to the video DVD shown in FIG. 1. In addition to it, on the video DVD provided with the audio navigation, the ATSI including the reproduction control information to reproduce only the audio information within the VTS is recorded as the ATS in the audio zone forward of the video zone in conformity to the DVD audio format. The AMG is recorded as the management information for the ATS. In the ATS, the AOB which is the substantial portion of the audio information is not recorded. Namely, in these AMG and ATSI, the navigation information for the audio player to reproduce the audio information (more concretely, the audio pack for the audio play part within each VOB (refer to FIG. 1)) included in each VTS within the video DVD provided with the audio navigation is recorded.

At a head of the audio zone, there is recorded the SAPPT. In this SAPPT, the navigation information to reproduce the LPCM audio information included in the VTS by the 2 channels is described.

This video DVD provided with audio navigation is reproduced by the video player and the compatible player on the basis of the navigation information recorded in the VMG. Further, the audio information of the audio play part of this video DVD provided with audio navigation is reproduced in various manners on the basis of the navigation information recorded in the AMG by the audio player depending upon the capability of the pertinent audio player. Furthermore, the LPCM information of the audio play part of this video DVD provided with audio navigation is reproduced by the 2 channels on the basis of the navigation information recorded in the SAPPT by the simple audio player.

(3.3) Audio Only DVD

The audio only DVD is shown at the third top stage of FIG. 5. On this disc, only the audio information except for a little amount of still pictures and/or text information is recorded. Therefore, in the record area between the lead in area LI and the lead out area LO, only the audio zone exists, the ATSI and the AOB are recorded as a plurality of ATSs, and the AMG including the management information for these ATSs is also recorded. Further, the SAPPT is recorded in the lead in area LI or the audio zone.

On the other hand, one or a plurality of AOBs as the substantial portion of the audio information are included in each ATS.

From this audio only DVD, the audio information within the audio zone is reproduced in various manners by the audio player and the compatible player depending upon the capability of the pertinent player, on the basis of the navigation information recorded in the AMG. Further, the LPCM information within the audio zone of this audio only DVD is reproduced by the 2 channels on the basis of the navigation information recorded in the SAPPT by the simple audio player. However, since the navigation information in conformity to the DVD video format is not recorded, it cannot be reproduced by the video player.

(3.4) Audio and Video DVD

The audio and video DVD is shown at the bottom stage of FIG. 5. On this disc, in the record area between the lead in area LI and the lead out area LO, the audio zone and the video zone exist. In the video zone, the VMG and the VTS including the AV information (VOB) as the substantial information and the reproduction control information are recorded, in conformity to the DVD video format in the same manner as the video DVD. Further, the SAPPT is recorded in the lead in area LI or the audio zone.

In the audio zone, the SAPPT, the AMG and a plurality of ATSs including the audio information as the substantial information and the reproduction control information (i.e., ATS #1, ATS #2 in FIG. 5) are recorded, in conformity to the DVD audio format in the same manner as the audio only DVD. Further, the ATS including only the reproduction control information to reproduce only the audio information of the VOB within the VTS in the video zone is recorded. Namely, in the audio and video DVD, the AV information in conformity to the DVD video format and the audio information in conformity to the DVD audio format are recorded in areas different from each other.

In case of the audio and video DVD, the AMG includes not only the management information for all of the ATSs within the audio zone but also the management information for all of the ATSs and the VTSs within the audio zone and the video zone collectively. Further, the SAPPT includes the management information for all of the ATSs and the VTSs within the audio zone and the video zone collectively. But, the management information of the SAPPT is only related to the LPCM data in those zones reproducible by the 2 channels.

Here, the audio and video DVD is different from the video DVD provided with audio navigation and the audio only DVD in that the record area is divided into the audio zone and the video zone, the AV information in conformity to the DVD video format and the audio information in conformity to the DVD audio format are recorded in these zones respectively, and that the AMG and the SAPPT recorded in the audio zone include the management information for all of the ATSs and the VTSs in the disc collectively.

In more detail, in case of the video DVD provided with the audio navigation, the audio information is recorded such that it is multiplexed with the video information by the unit of pack in the VOB in conformity to the DVD video format. The ATS is constituted such that the APGCI which is the reproduction control information to reproduce the audio information recorded in the VOB is set as the ATS, so that only those ATSs are managed by the AMG. In the AMG, the management information for the title in the video zone is not recorded. In the same manner, the navigation information related to the audio play part of the video zone is described in the SAPPT.

In contrast to this, in the audio and video DVD, there are the audio zone to which the audio information is recorded in conformity to the audio DVD format, and the video zone to which the video is recorded in conformity to the video DVD format. Within the audio zone, the substantial portion of the audio information is recorded by the format based on the audio DVD shown in FIG. 3, as a plurality of AOBs in each of the ATSs. Further, there are recorded two kinds of ATSs i.e., (i) the ATS in which the APGCI as the reproduction control information for the audio information in each ATS is recorded and (ii) the ATS in which the APGCI as the reproduction control information for the audio information recorded in the VOB in the VTS in the video zone is recorded in the ATSI (as the ATS, only the ATSI which is the navigation information exists while the audio substantial information is within the video zone). Namely, regardless of the zones, the reproduction control information related to the reproduction of the audio zone is managed by the AMG. Further, information related to the track reproducible by the 2 channels among the reproduction control information related to the reproduction of the LPCM audio information recorded in all of the ATSs and VTSs is recorded in the SAPPT.

On the other hand, in the video area, the AV information is recorded as a plurality of VTSs. The reproduction control information for the AV information in each VTS is recorded in the VTSI, and all of the VTSs are managed by the VMG. On the other hand, all of the reproduction control information related to the reproduction of the AV information in the video zone is also managed by the AMG.

Actually, the AGM is comprehensive management information, in case of the audio only DVD and the audio and video DVD. The VMG is mainly management information in case of the video DVD. In case of the video DVD provided with audio navigation, the AGM manages only the reproduction of the audio information within the VOB by the audio player, and does not manage the video title.

In case of the audio only DVD and the audio and video DVD, the SAPPT is comprehensive management information to reproduce the LPCM audio information by, for example, the simple type, the portable type of audio player and the like, by the two channels. In case of the video DVD, since it does not have the SAPPT, even if it is recorded by the LPCM, the reproduction of only the audio information by the simple player cannot be performed. In case of the video DVD provided with audio navigation, the SAPPT manages only the reproduction of the LPCM audio information (e.g. the audio only title) of the audio play part within the VOB by the simple audio player, and does not manage the video title.

The above described structure enables the optimum reproduction in accordance with the capability of the reproducing apparatus, and also achieves the conformable compatibility between each disc and each reproducing apparatus.

(4) Reproduction Control for the Title

The reproduction control for the title will be explained below in detail. Here, the title implies a series of works (presentation), which is constituted by the AV information recorded on the DVD, the substantial information such as the audio information and the like, and the reproduction control information indicative of a procedure of the reproduction and is common in the reproduction manner, or a part of the work. As mentioned in the physical and logical formats of the audio DVD, the user does not instruct the player to directly select the title and then start the reproduction. The user selects a title group constituted by one or a plurality of titles, and then starts the reproduction. However, the player judges from which title the instructed title group is constituted, from the navigation information within the AMG and the ATSI, and by continuously reproducing the respective titles, the reproduction of the title group is performed. Thus, the reproduction of the titles is basic in the DVD player. So, the title and the reproduction control for the title in conformity to the DVD audio format are explained with the audio and video disc as an example.

(4.1) Kind of Title

At first, the titles in the DVD audio format (titles 261 in FIG. 4) are classified into an audio title constituted by reproducing the audio information within the audio area (hereafter, it is also referred to as an "AOTT (Audio Only TiTle)") and a video title constituted by reproducing the AV information within the video area. Moreover, the video titles are classified into two kinds i.e., an AV title (hereafter, it is also referred to as an "AVTT (Audio Video TiTle)") and an AV/audio only common title (hereafter, it is also referred to as an "AVTT/AOTT (Audio Video TiTle/Audio Only TiTle) ". Incidentally, there is only the AV title, in case of the DVD video format.

The AOTT is a title in which only the audio information is reproduced. Its substantial information is composed of the audio information recorded in the AOB within the audio zone.

The AVTT is a title in which the audio information is always reproduced together with the video information. Its substantial information is composed of the AV information recorded in the VOB within the video zone. The reproduction of only the audio information is not admitted in the AVTT so that it is essential to reproduce the audio information together with the video information.

The AVTT/AOTT is a title in which only the audio information can be reproduced and further the audio information together with the video information can be reproduced as the AV information (that is, it can be said that this is a commonly usable title). In either case, its substantial information is composed of the AV information recorded in the VOB within the video zone.

Whether this AVTT/AOTT is reproduced as the AV information or the audio information depends on the capability of the reproducing apparatus. That is, the reproducing apparatus without the function of reproducing the AV information (e.g., the audio player) reproduces only the audio information for the AVTT/AOTT. The reproducing apparatus with the function of reproducing the AV information (e.g., the video player and the compatible player) reproduces the audio information together with the video information for the AVTT/AOTT.

By the way, two navigation information i.e., navigation information for the audio player and navigation information for the compatible player are separately recorded on the AMG. The navigation information for the audio player is an audio only title search pointer which describes the navigation information to reproduce the audio title (AOTT) composed of the audio information within the AOB in the audio zone and only the audio information of the commonly-used title composed of the AV information within the VOB of the video zone. This audio only title search pointer is recorded on an audio only title search pointer table (AOTT_SR). On the other hand, an audio title search pointer that is the navigation information for the compatible player which can reproduce all kinds of titles is recorded on an audio title search pointer table (ATT_SR). These navigation information will be further detailed in the explanation of FIG. 8.

If this audio and video DVD is reproduced by the video player, the AV information within each VTS is reproduced in accordance with the navigation information for the video player recorded in the VMG and the VTSI within the video zone.

If this audio and video DVD is reproduced by the audio player, the audio information is reproduced in accordance with the reproduction control information for the audio player recorded in the ATSI, by referring to the AOTT_SR within the AMG in the audio zone. There are two cases as the case of reproducing the audio information by using the audio player. Namely, in one case, the audio information within the AOB is reproduced in accordance with the ATSI and the APGCI which are the navigation information within the AMG and the ATS in the audio zone. In the other case, the audio information recorded in the VTS within the video zone is reproduced in accordance with the AMG, the ATSI and the APGCI similarly to the video DVD provided with audio navigation. In the latter case, for the same object, it is reproduced as the AV information accompanying the image by the video player, and only the audio information is reproduced by the audio player.

Moreover, if this audio and video DVD is reproduced by the compatible player, the audio information in the audio zone and the AV information in the video zone are unitedly reproduced in accordance with the reproduction control information recorded on the ATSI and the VTSI, by referring to ATT_SR which is the navigation information for the compatible player within the AMG in the audio zone.

Figure 6:
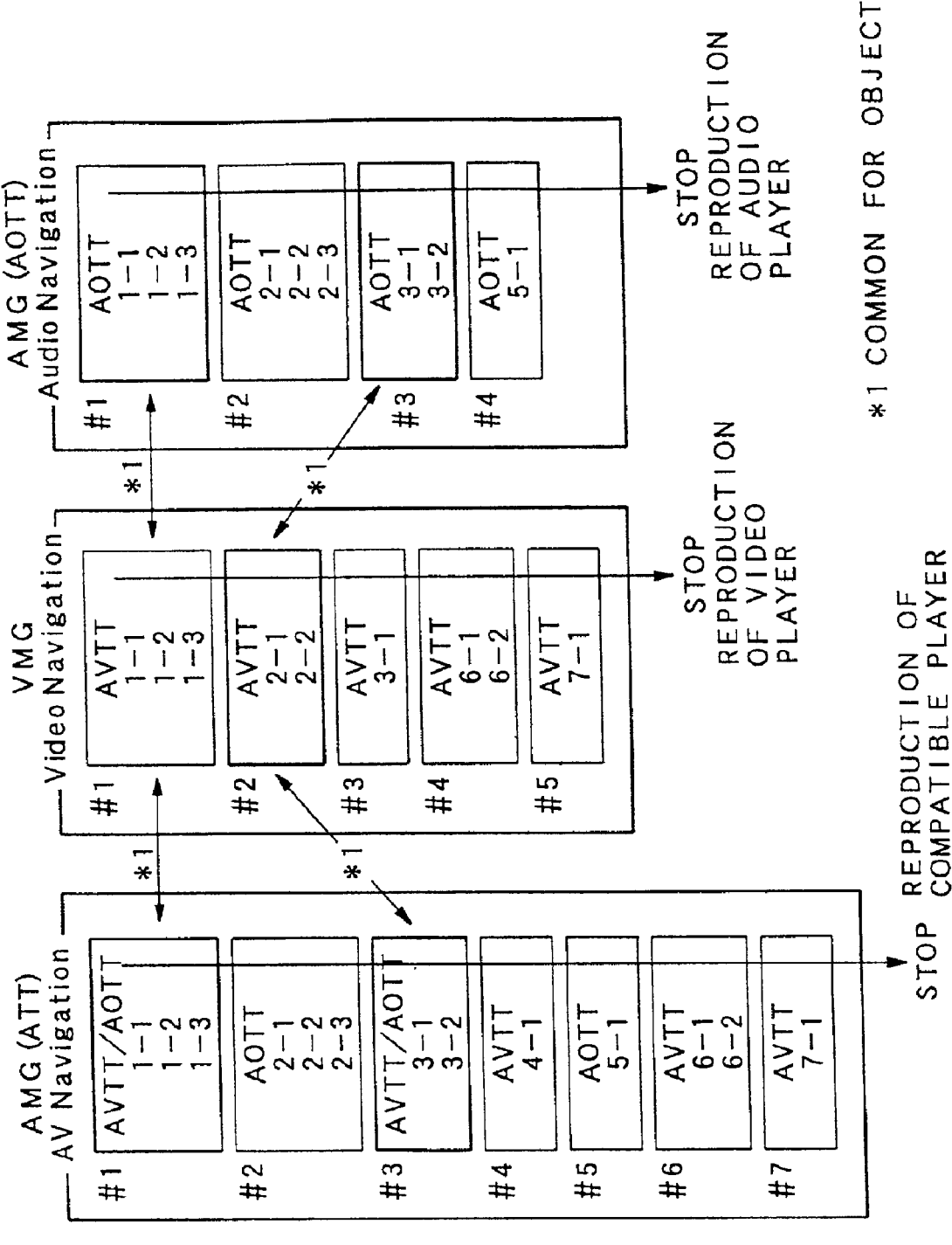
FIG. 6 is a diagram showing an example of an audio/video common DVD.

The titles in the audio and video DVD are all managed by the AMG. They are classified into any one of the above-mentioned three kinds of titles with regard to the DVD audio format, respectively. Now, it is assumed that the audio and video DVD having the example of the logical format shown in FIG. 6 is reproduced by using the compatible player having the function of reproducing both of the DVD audio format and the DVD video format. Moreover, in this audio and video DVD, it is also assumed that a volume is composed of 7 title groups #1 to #7, and each title group is composed of a single title. One or a plurality of tracks are included in the single title. In FIG. 6, the left column shows an image of the navigation information for the compatible player (ATT_SR), the central column shows an image of the navigation information for the video player (TT_SR), and the right column shows an image of the navigation information for the audio player (AOTT_SR).

Since the titles #2 and #5 are the AOTTs, only the audio information recorded in the AOB within the audio zone of the audio and video DVD is reproduced when those titles are reproduced.

Since the titles #4, #6 and #7 are the AVTTs, the AV information is reproduced which is recorded in the VOB within the video zone of the audio and video DVD. Thus, the video and the audio are always reproduced.

Since the titles #1 and #3 are the AVTT/AOTTs, the compatible player reproduces both of the video and the audio, in accordance with the video and audio information recorded in the VOB within the video zone of the audio and video DVD. In addition, if using the audio player without the function of reproducing the video information, only the audio information recorded in the VOB within the video zone of the audio and video DVD is reproduced in the titles #1 and #3 (refer to the right column of FIG. 6). That is, the AVTT/AOTT title is designed so as to enable the reproduction of the record information, in accordance with the capability of the reproducing apparatus by which the DVD disc is reproduced, with the maximum utilization of the capability.

Incidentally, it is promised that the AVTT cannot constitute the title group with other kind of title (e.g., the AOTT and the AVTT/AOTT), in order to prevent the confusion at the time of reproducing the title group.

(4.2) Double Management of VOB

The concepts of the PGCI and the APGCI prescribed with regard to the VOB within the video zone of the audio and video DVD will be explained below. The video information and the audio information are recorded in the VOB, in a multiplexed form. If the VOB is reproduced as the AV information, it is reproduced in accordance with the PGCI. This concept is similar to that of the video DVD. The compatibility with the video player can be kept since the method of recording and reproducing the AV information in the audio DVD is in conformity to the video format as mentioned above. On the contrary, if only the audio information in the VOB is reproduced, it is reproduced in accordance with the APGCI. However, this APGCI is prescribed independently of the PGCI. This point is explained with reference to FIG. 7.

Figure 7:
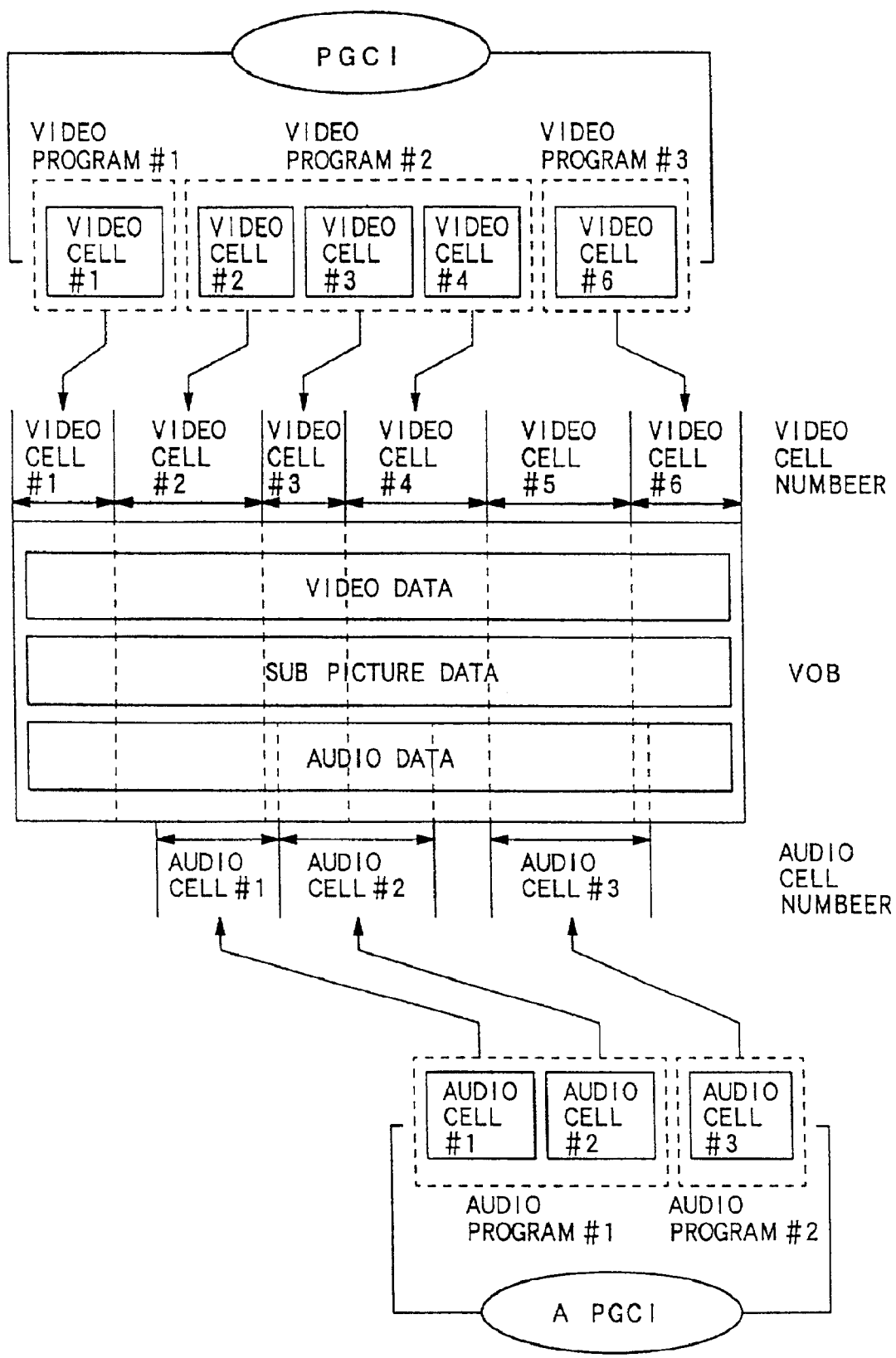
FIG. 7 is a diagram showing a concept of a double management of the same object.

FIG. 7 shows a concepts of a program in case that a certain VOB is reproduced as the AV information in accordance with the PGCI and in case that it is reproduced as only the audio information in accordance with the APGCI. In FIG. 7, the VOB includes the video data, the sub picture data and the audio data. If this VOB is reproduced as the AV information, the reproduction control is carried out in accordance with the PGCI. In the PGCI, the VOB is divided into 6 video cells #1 to #6. Then, the video cell #1 constitutes a video program #1, the video cells #2 to #4 constitute a video program #2, and the video cell #6 constitutes a video program #3. The reproduction is carried out in accordance with such PGCI, if the AV information is reproduced by the video player or the compatible player, as in the case of the AVTT/AOTT.

On the other hand, if the audio player reproduces only the audio information from the same VOB, the reproduction is carried out in accordance with the APGCI. Audio programs prescribed by the APGCI are constituted by one or more audio cells, respectively. Here, even for the same object (VOB), the audio cell can be prescribed differently from (independently of) the video cell (of course, it can be prescribed identically). That is, a start position of each audio cell, an end position and the like can be prescribed independently of any video cell. Moreover, the order of reproducing the audio cells prescribed by the APGCI can be independent of the order of reproducing the video cells prescribed by the PGCI.

In the example in FIG. 7, an audio program #1 is constituted by the audio cells #1 and #2, and an audio program #2 is constituted by the audio cell #3. The APGCI includes the information, such as a recording position, a reproducing order and the like of the audio cells included in these audio programs, so that the audio information is reproduced in accordance with this information.

The reason why the audio cell can be prescribed independently of the video cell as mentioned above is that the audio information is managed independently of the AV information. Accordingly, a time management and the like can be done independently of the AV information, if reproducing only the audio information in the VOB. Moreover, only a meaningful part can be reproduced even if only the audio information is reproduced, in the audio information included in the AV information. Of course, it may be defined as the same cell.

(4.3) Title Search Pointer

The above-mentioned reproduction of each title by using a title search pointer in the audio and video DVD will be explained below with reference to FIGS. 6 and 8.

Figure 8:
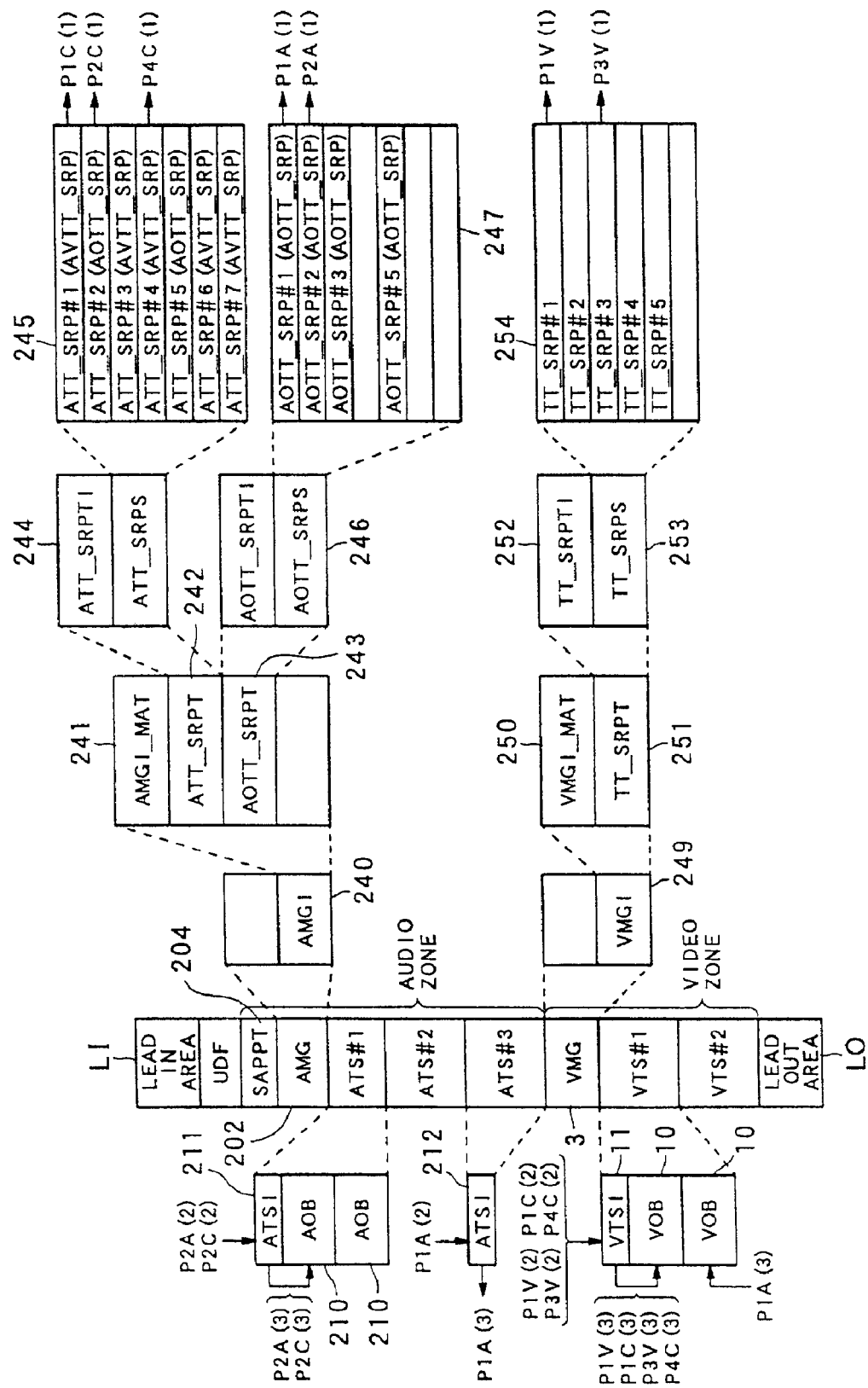
FIG. 8 is a diagram showing an example of navigation information prescribed for the audio/video common DVD of FIG. 6.

FIG. 8 shows an example of the navigation information for the audio and video DVD. As mentioned above, the audio and video DVD has the video zone based on the DVD video format and the audio zone based on the DVD audio format. The information that can be reproduced from the audio and video DVD is the AV information (i.e., video information with the audio information) such as a movie and the like, and the audio information. Then, when the respective information is reproduced by each of the various players, the navigation information to prevent confusion and conflict is separately recorded on the audio and video DVD, in response to each of the various players.

(4.3.1) AMG, ATSI and Title Search Pointer Table

In FIG. 8, the audio and video DVD has the audio zone and the video zone. The audio zone is constituted by the AMG 202, and an ATS #1, an ATS #2 and an ATS #3. The ATSI #1 is constituted by an ATSI 211 and an AOB 210, and the ATS #3 is constituted by only an ATSI 212. Moreover, the video zone is constituted by a VMG 3, a VTS #1 and a VTS #2. The VTS #1 is constituted by a VTSI 11 and a VOB 10.

The AMG 202 includes an AMGI (AMG Information) 240 that is the substantial information of the navigation information. The AMGI 240 includes: an AMGI management table (AMGI_MAT) 241 containing information such as a file size, a record address etc., of the AMGI 240; an ATT search pointer table (ATT_SRPT) 242 and an AOTT search pointer table (AOTT_SRPT) 243. Here, the ATT is a generic name of the audio only title (AOTT) composed of only the audio information, the AV title (AVTT) composed of the AV information and the AV/audio only common title (AVTT/AOTT) composed of the AV information.

Here, the search pointer is a pointer indicating a recording position on the DVD of the reproduction control information (here, this implies the APGCI and the PGCI) for each title. As mentioned above, each title is provided with the substantial information such as the audio information and the AV information, and the reproduction control information to combine these substantial information and then reproduce it. This reproduction control information is recorded in the ATSI in the ATS or the VTSI in the VTS. The search pointer is a pointer indicating a recording position within the ATSI or the VTSI of the reproduction control information for each title. In addition, the navigation information is information to manage the reproduction of each title, and also a concept including the above-mentioned search pointer in this embodiment.

The ATT search pointer table 242 is a table describing the navigation information in case that each title of the audio and video DVD is reproduced by the compatible player. On the other hand, the AOTT search pointer table 243 is a table describing the navigation information in case that each title of the audio and video DVD is reproduced by the audio player. Also, the ATT search pointer table 242 and the AOTT search pointer table 243 correspond to each other, in a one-to-one relation. The number of search pointers described within the ATT search pointer table 242 coincides with the number of all the titles included in the audio and video DVD. For example, as shown in FIG. 6, if a total of 7 titles is included in the audio and video DVD, the search pointers corresponding to the 7 titles are described within the ATT search pointer table 242. Irrespectively of the kind of title, frames to describe the 7 search pointers are also prepared in the AOTT search pointer table 243. Then, the frames of the respective tables correspond to each other, in a one-to-one relation.

(4.3.1.1) ATT_SRP

An audio title search pointer (ATT_SRP) is the navigation information when the audio and video DVD is reproduced by the compatible player. Thus, when the audio and video DVD is set, the compatible player refers to this ATT_SRP and thereby reproduces each title.

The example of the navigation information shown in FIG. 8 corresponds to the example of the audio and video DVD shown in FIG. 6. The titles #1 and #3 are the AV/audio only common title (AVTT/AOTT), the titles #2 and #5 are the audio only title (AOTT), and the titles #4, #6 and #7 are the AV title (AVTT).

As mentioned above, the three kinds of titles (the AOTT, the AVTT/AOTT and the AVTT) can be recorded on the audio and video DVD. Thus, in the audio and video DVD, the search pointers with regard to all the three kinds of titles (the AOTT, the AVTT/AOTT and the AVTT) are described in the ATT search pointer table 242 of the AMG.

However, the title search pointer 245 actually written in the ATT search pointer table 242 of FIG. 8 is only the audio only title search pointer (AOTT_SRP) or the AV title search pointer (AVTT_SRP), such that the title search pointer with regard to the AV/audio only common title (AVTT/AOTT) is described as the AV title search pointer (AVTT_SRP) (the actual description is indicated in a parenthesis in the table of FIG. 8). This is because the compatible player need not discriminate between the AV/audio only common title (AVTT/AOTT) and the AV title (AVTT). That is, the compatible player has the function of reproducing the DVD video format, and then reproduces all the AV/audio only common titles as the AV information. Hence, it is not necessary for the compatible player to discriminate the title search pointer with regard to the AV/audio only common title (AVTT/AOTT) from the video search pointer (AVTT_SRP) even on the navigation information. Therefore, the titles involving the reproduction of the video are all described in a common format as the AV title search pointer (AVTT_SRP).

Thus, as can be understood by comparing the left column of FIG. 6 with the audio title search pointer table 245 of FIG. 8, the AV title search pointer (AVTT_SRP) is described for the AV titles (e.g., the titles #4, #6 and #7) and the AV/audio only common titles (e.g., the titles #1 and #3), and the AOTT search pointer (AOTT_SRP) is described for the audio only titles (the titles #2 and #5), in the ATT search pointer table 242 describing the navigation information for the compatible player. The compatible player refers to this table 242, and as shown in the left column of FIG. 6, reproduces the titles #1, #3, #4, #6 and #7 as the AV information, and further reproduces the titles #2 and #5 as the audio information.

(4.3.1.2) AOTT_SRP

On the other hand, the navigation information for the audio player is described in the AOTT search pointer table 243. So, when the audio and video DVD is set, the audio player refers to this AOTT search pointer table 243, and thereby carries out the reproduction.

The search pointer with regard to the audio title (AOTT) and the AV/audio only common title (AVTT/AOTT) is described in this table. Since the audio player does not have the function of reproducing the AV information, it is not necessary to describe the search pointer in relation to the AV title (AVTT). However, a search pointer actually written to this table is only the AOTT search pointer (AOTT_SRP). It is enough for the audio player to have the information as to whether or not it is a title by which only the audio can be reproduced, while it is not necessary for the audio player to discriminate between the audio title (AOTT) and the AV/audio only common title (AVTT/AOTT). Thus, the discrimination between the audio title (AOTT) and the AV/audio only common title (AVTT/AOTT) is not carried out on the audio only title search pointer table (AOTT_SRPT) 243, such that all of these titles are written under a common format as the AOTT search pointer (AOTT_SRP).

Thus, as for the AV/audio only common title (AVTT/AOTT), the AV title search pointer (AVTT_SRP) is described within the ATT search pointer table 242. However, the audio only title search pointer (AOTT_SRP) is described within the AOTT search pointer table 243.

In addition, as for the AV title (AVTT), although only the frame to write the title search pointer is prepared, the substantial information is not described, or a fact that this title does not have the AOTT_SRP (i.e., that fact that the reproduction of only the audio cannot be performed) is described. This is because the AOTT search pointer table 243 describes the navigation information for the audio player and thereby the audio player cannot reproduce the AV information. Hence, the audio player judges that it cannot reproduce this title and then ignores this description.

The audio player refers to the above-described AOTT title search pointer table 243, and thereby carries out the reproduction shown in the right column of FIG. 6. That is, it ignores the AV titles #4, #6 and #7, and then reproduces the AV information for the titles #1, #2, #3 and #5.

(4.3.2) VMG, VTSI and Title Search Pointer

The VMG 3 includes VMGI (VMG Information) that is the actual portion of the navigation information. The VMGI includes: an VMGI management table 250 containing information such as a file size, a record address etc., of the VMGI; and a title search pointer table (TT_SRPT) 251. The title search pointer table 251 is a table describing the navigation information in relation to the video player. Thus, the video player refers to this title search pointer table (TT_SRPT) 251, and thereby reproduces the title in accordance with a procedure determined in a conventional video format. Hence, there are the two kinds of titles i.e., the AV/audio only common title (AVTT/AOTT) and the AV title (AVTT), in the presently-exemplified title. However, they are all described in the title search pointer table (TT_SRPT) as the TT_SRP without discriminating between these two kinds.

As mentioned above, the audio and video DVD prepares the navigation information optimum for each of the audio player, the video player and the compatible player, and then records as the three separate title search pointer tables. Accordingly, the optimum reproduction can be performed in accordance with the capability of each reproducing apparatus.

(4.4) Structure of Search Pointer Table

The structure of the search pointer table will be described below in further detail.

(4.4.1) ATT_SRP, AOTT_SRP and TT_SRP

The ATT search pointer table (ATT_SRPT) 242 includes: an ATT search pointer information (ATT_SRPTI) 244 containing information of the number of ATT search pointers and the like; and a plurality of ATT search pointers (ATT_SRPs) 245. In addition, in FIG. 8, the kind of search pointer actually written as the search pointer is indicated in a parenthesis of each ATT search pointer 245. As mentioned above, the search pointer written to the ATT search pointer table 242 is either one of the AOTT_SRP and the AVTT_SRP.

The AOTT search pointer table 243 similarly includes: an ATT search pointer information (AOTT_SRPTI) 246 containing information of the number of AOTT search pointers and the like; and a plurality of AOTT search pointers (AOTT_SRPs) 247. In FIG. 8, the kind of search pointer actually written as the search pointer is also indicated in a parenthesis of each AOTT search pointer 247. As mentioned above, all the search pointers written to the AOTT search pointer table 243 are the AOTT_SRP.

The positions on the respective search pointer table of the ATT search pointer and the AOTT search pointer which specify the same title must be identical to each other. That is, the ATT search pointer on the ATT search pointer table 242 and the AOTT search pointer on the AOTT search pointer table 243 correspond to each other, in a one-to-one relation. The ATT_SRP #1 and the AOTT_SRP #1 specify the same title.

A TT search pointer table (TT_SRPT) 251 similarly includes: a TT search pointer information (TT_SRPTI) 252 containing the number of TT search pointers and the like; and a plurality of TT search pointers (TT_SRPs) 254.

Although the ATT search pointer 245 and the AOTT search pointer 247 correspond to each other in a one-to-one relation, the one-to-one correspondence relation is not always present between both of them and the TT search pointer. However, the TT search pointer is similar to the ATT search pointer and the AOTT search pointer in that the TT search pointer indicates the PGC which logically constitutes a targeted title and thereby indicates the procedure of reproducing it.

(4.5) Method of Respectively Reproducing Titles

A method of respectively reproducing the three kinds of titles which can be recorded on the audio and video DVD will be described below with classifying these titles for each reproducible player, with reference to FIGS. 6 and 8.

(4.5.1) Method of Reproducing Audio Only Title (AOTT)

It is the audio player and the compatible player that can reproduce the AOTT. The AOTT is the title to reproduce the audio information. Moreover, the followings are the main manners (functions) of reproducing the audio only title which the present invention tries to achieve or has relation to. However, an achievable reproducing manner in the reproduction of the audio player for the AV/audio only common title (AVTT/AOTT) is also included.

① Multi-Channel Reproduction:

In the DVD audio format, the LPCM audio information of the video zone has a maximum of 8 channels. It has a maximum of 6 channels as discrete multi-channels. In this case, it is possible to set 24 pattern which is the sum of 11 patterns resulting from a combination of forward 3 channels+backward 2 channels+a sub woofer for each channel and 13 patterns resulting from a combination of the portion of the discrete multi-channel and a signal for the two-channel reproduction. The LPCM audio information of the audio zone has a maximum of 6 channels. It is possible to set 21 patterns from the combination of the forward 3 channels+the backward 2 channels+the sub woofer for each channel.

② Two-Channel Reproduction:

The LPCM audio information having two channels or less is reproduced as it is. In the multi-channel LPCM audio information of the video zone, only two channels of CH0 and CH1 are reproduced. The multi-channel LPCM audio information of the audio zone is down-mixed to two channels in accordance with a down-mix coefficient that is separately defined by a unit of a track, and is reproduced as two channels.

③ Audio Selection:

In the DVD, two audio information which are different in the reproducing manner can be defined as a single title, and one of them can be selected by a user. This function is called as an audio selection. Actually, the user can select between the different reproducing manners of the two-channel and the multi-channel, for the same song. Moreover, as a selection other than the two-channel and the multi-channel, the user can select between the audio information recorded by the LPCM method and the audio information recorded by another coding method (e.g., the compression voice, the one bit audio and the like), for the same song.

④ Audio Coding Mode (Linear PCM, Dolby AC3, MPEG Audio, DTS, SDDS):

This indicates the kinds of encoding methods when the audio information is recorded. The LPCM also used in the CD is well known. The other methods are one of compression encoding methods.

⑤ Multi-Channel Type:

This indicates the kinds of multi-channel records of the LPCM, in the DVD audio format. In a case of the type 1, it can be set up to a maximum of 6 channels. As for the relation between respective arrangements of speakers and channels, it can be set from the combination of the forward 3 channels+the backward 2 channels+the sub woofer.

⑥ Channel Assignment (the Number of Channels, Arrangement of Speakers)

This indicates the number of channels, the relation between respective arrangements of output speakers and channels and the relation between channel group and each channel. For example, if a three-channel signal is recorded, this indicates such a relation that CH0 is a signal outputted from a left front (Left Front Speaker) and is included in a channel group 1, CH1 is a signal outputted from a right front (Right Front Speaker) and is included in the channel group 1, and CH2 is a signal outputted from a rear speaker (Surround Speaker) and is included in a channel group 2. As mentioned above, if the multi-channel type is the type 1, the 21 patterns can be set from the combination of the forward 3 channels+the backward 2 channels+the sub woofer. Thus, the channel assignment information indicates which one of combinations of these 21 patterns is employed.

⑦Multi-Stream

The substantial information of the audio information recorded in the audio area in the DVD audio format is recorded as only one audio stream in the AOB. However, the substantial information of the audio information recorded in the video area is multiplexed and recorded for each pack, together with a stream of the image, in the VOB. Moreover, with the VOB, a plurality of audio streams can be multiplexed, if they belong to a range of a limited transfer rate. For example, it is possible to multiplex the 2-channel/LPCM audio stream and the multi-channel/LPCM audio stream with the VOB and also possible to multiplex the two-channel/LPCM audio stream and the AC-3 compression voice stream with the VOB. One of these two audio streams which are different in the reproducing manner can be selected by the user who specifies the value of the audio selection.

(4.5.1.1) Case of Audio Player

At first, a method by which the audio player reproduces the AOTT is explained. As mentioned above, the audio player refers to only the AOTT_SRPT 243 as the navigation information. Thus, when reproducing the title #2, the audio player refers to the AOTT_SRP #2 and then reads out the ATS number, in which the title is included (in this case, the ATS #1), and the title number within the pertinent ATS (refer to a path indicated by "P2A(1)" of FIG. 8). Next, the audio player refers to the ATSI 211 of the corresponding ATS #1 (refer to a path indicated by "P2A(2)" of FIG. 8) and then reads out the A (Audio) PGCI to which the title corresponds, from the title number within the ATS. Hence, the audio information is reproduced by reproducing the audio pack 43 within the AOB 210, in accordance with the APGCI specified by the AOTT_SRP #2 at the time of the reproduction (refer to a path indicated by "P2A(3)" of FIG. 8).

(4.5.1.2) Case of Compatible Player

Next, a method by which the compatible player reproduces the AOTT is explained. The compatible player refers to the ATT_SRPT 242 as the navigation information. Thus, when reproducing the title #2, the compatible player refers to the ATT_SRP #2. Since it is the AOTT_SRP, the compatible player recognizes that the title is the AOTT. After that, similarly to the audio player, the compatible player reads out the ATS number in which the title is included (in this case, the ATS #1) and the title number within the pertinent ATS (refer to a path-indicated by "P2C(1)" of FIG. 8). Next, the audio player refers to the ATSI 211 of the corresponding ATS #1 (refer to a path indicated by "P2C(2)" of FIG. 8) and then reads out the APGCI to which the title corresponds, from the title number within the ATS. Hence, the audio information can be reproduced by reproducing the audio pack 43 within the AOB 210, in accordance with the APGCI specified by the ATT_SRP #2 at the time of the reproduction (refer to a path indicated by "P2C(3)" of FIG. 8).

(4.5.2) AV title (AVTT)

The path for the reproduction of the AV title will be explained below. The AV title can be reproduced by the video player and the compatible player.

(4.5.2.1) Case of Video Player

The video player refers to the TT_SRPT (title search pointer table) 251 as the navigation information, and then carries out the process in accordance with the procedure of reproducing the video format. Thus, the video player firstly refers to the title search pointer table 251 in the VMG 3. Here, it is allowable that the description positions of the search pointers on the respective title search pointer tables 242 and 243 of the titles corresponding on the audio navigation do not correspond to the description position of the title search pointer on the title search pointer table 251 in the VMG 3, in a one-to-one relation. That is, in the ATT search pointer table 242 in the AMGI 242 of the AMG and the TT search pointer table 251 of the VMGI, the contents and the orders can be defined independently from each other. However, the description is done by filling the frame on the TT search pointer table as a rule, if there is not the corresponding title in the TT_SRP 254 of the VMGI, within the title search pointer table 251, in order to avoid the confusion. Hence, the title number may be different, as shown in FIG. 8. That is, although there are 7 titles on the audio and video DVD of the example shown in FIG. 6, since the video player does not reproduce the titles #2 and #5 that are the AOTT, the TT_SRP with regard to the remaining five titles (e.g., the titles #1, #3, #4, #6 and #7) except the titles #2 and #5 are described within the title search pointer table 251. Therefore, the TT_SRPs #1 to #5 within the title search pointer table 251 correspond to the respective titles #1, #3, #4, #6 and #7 shown in FIG. 6, respectively.

The TT_SRP 254 indicates the PGC logically constituting the targeted title. Thus, the video player reads out the VTS number in which the title is included (in this case, the VTS #1), from this search pointer, and the title number within the pertinent VTS (refer to a path indicated by "P3V(1)" of FIG. 8). Next, the video player refers to the VTSI 11 of the corresponding VTS #1 (refer to a path indicated by "P3V(2)" of FIG. 8), and then reads out the PGCI to which the title corresponds, from the title number within the VTS. Hence, the video player obtains this PGCI, and then uses the video pack, the audio pack etc., within the VOB, and further reproduces the title as the AV information (refer to a path indicated by "P3V(3)" of FIG. 8).

(4.5.2.2) Case of Compatible Player

Next, a path when the compatible player reproduces the AV title (AVTT) is explained. The compatible player refers to only the ATT_SRPT 242 as the navigation information. Thus, the compatible player refers to this ATT_SRP #4. Since it is the AVTT_SRP, the compatible player recognizes that the title is the AV title. As mentioned above, it does not agree with the title number in the video player. However, after that, similarly to the case that the video player reads out from the TT_SRPT, the compatible player reads out the VTS number in which the title is included (in this case, the VTS #1), from the ATT_SRP 245, and the title number within the pertinent VTS (refer to a path indicated by "P4C(2)" of FIG. 8). Next, the compatible player refers to the VTSI 11 of the corresponding VTS #1 (refer to a path indicated by "P4C(2)" of FIG. 8), and then reads out the PGCI to which the title corresponds, from the title number within the VTS. Hence, the compatible player also obtains this PGCI, and then uses the video pack, the audio pack etc., within the VOB, and further reproduces the title as the AV information (refer to a path indicated by "P4C(3)" of FIG. 8).

(4.5.2.3) Case of Audio Player

Next, the case of the audio player is explained. The audio player refers to only the AOTT_SRPT 243 as the navigation information. Thus, although the audio player reads out the AOTT_SPR #4, since an absence of the corresponding AOTT is written therein, the reproduction is stopped.

(4.5.3) Case of AV/audio Only Common Title (AVTT/AOTT)

The AV/audio only common title is reproduced by all of the audio player, the video player and the compatible player. So, the explanation is done in this order.

(4.5.3.1) Case of Audio Player

At first, a method by which the audio player reproduces the AV/audio only common title is explained. The audio player refers to only the AOTT_SRPT 243 as the navigation information. Thus, the audio player refers to the AOTT_SRP #1 and then reads out the ATS number in which the title is included (in this case, the ATS #3) and the title number within the pertinent ATS (refer to a path indicated by "P1A(1)" of FIG. 8). Next, the audio player refers to the ATSI 212 of the corresponding ATS #3 (refer to a path indicated by "P1A(2)" of FIG. 8) and then reads out the APGCI to which the title corresponds, from the title number within the ATS. However, this ATS #3 does not include the substantial audio data. So, this APGCI indicates the reproducing procedure to the VOB 10 in the VTS #1. Hence, only the audio information is reproduced by reproducing only the audio pack 43 within the VOB 10, in accordance with this APGCI at the time of the reproduction (refer to a path indicated by "P1A(3)" of FIG. 8).

(4.5.3.2) Case of Video Player

Next, a method by which the video player reproduces the AV/audio only common title is explained. As mentioned above, the video player carries out the process in accordance with the procedure of reproducing the video format, irrespectively of the kinds of discs. Thus, the video player firstly refers to the title search pointer table 251 in the VMG 3. Since the title number at this time is #1, it agrees with the title number on the audio navigation. After that, the paths are similar to those in the case of (5.2.1). Hence, the explanation thereof is omitted (refer to the paths indicated by "P1V(1), (2) and (3)" of FIG. 8).

(4.5.3.3) Case of Compatible Player

Next, a method by which the compatible player reproduces the AV/audio only common title. The compatible player refers to only the ATT_SRPT 242 as the navigation information. Thus, the compatible player refers to this ATT_SRP #1, and thereby recognizes that it is the AVTT. After that, similarly to the case that the video player reads out from the TT_SRPT 251, the compatible player reads out the VTS number in which the title is included (also in this case, the VTS #1), from the ATT_SRP 245 and the title number within the pertinent VTS (refer to a path indicated by "P1C(1)" of FIG. 8). After that, the paths are similar to those in the case of the video player. Hence, the explanation thereof is omitted (refer to the paths indicated by "P1C(2) and (3)").

As mentioned above, by having not only the navigation information for the video and the navigation information for the audio, but also the information of uniting them with each other and the information of correlating them with each other, it is possible to solve the conflict and the confusion when the various titles that are different in the reproduction manner are reproduced by the various players that are different in reproduction capabilities.

(5) Management Information of Title

As mentioned above, the user selects a desired title group or a track included therein, and then instructs the reproduction. The reproducing apparatus automatically selects the title constituting the instructed title group or the title in which the instructed track is included, in accordance with the capability of the reproducing apparatus, and then starts the reproduction.

Figure 9A:
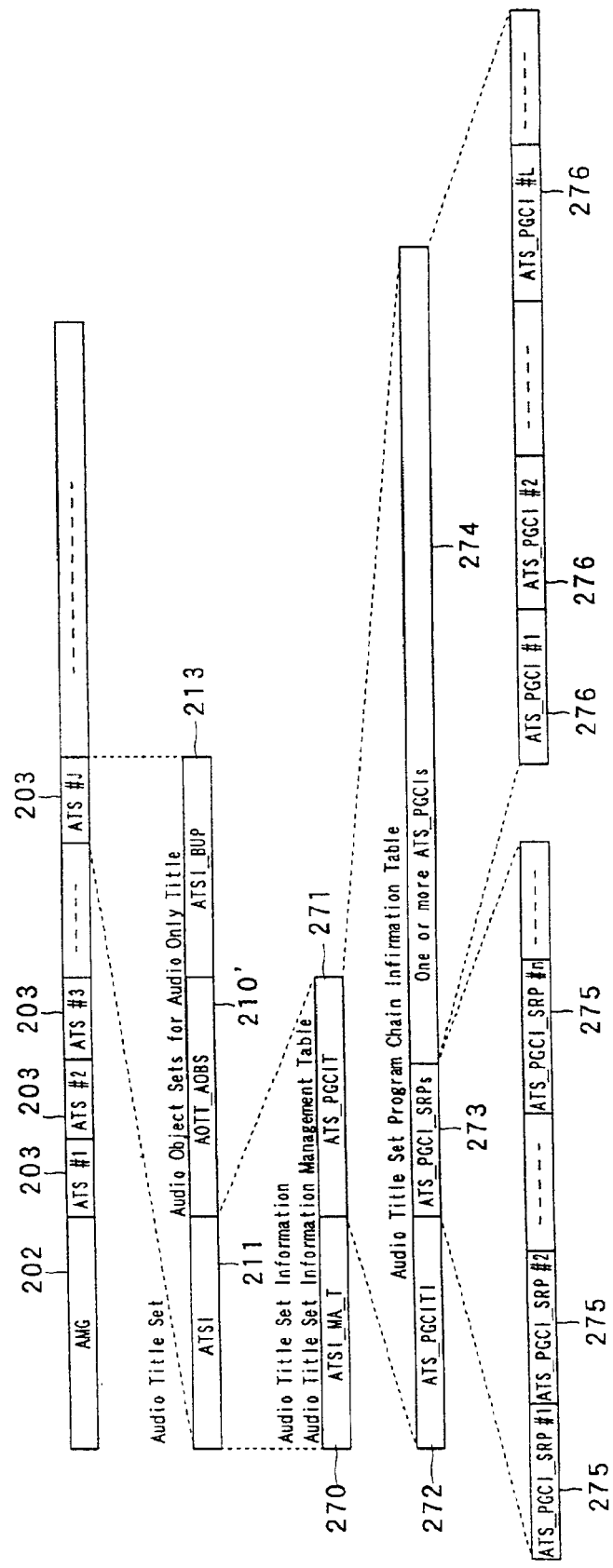
FIG. 9A is one diagram showing information to be recorded to an ATS.
Figure 9B:
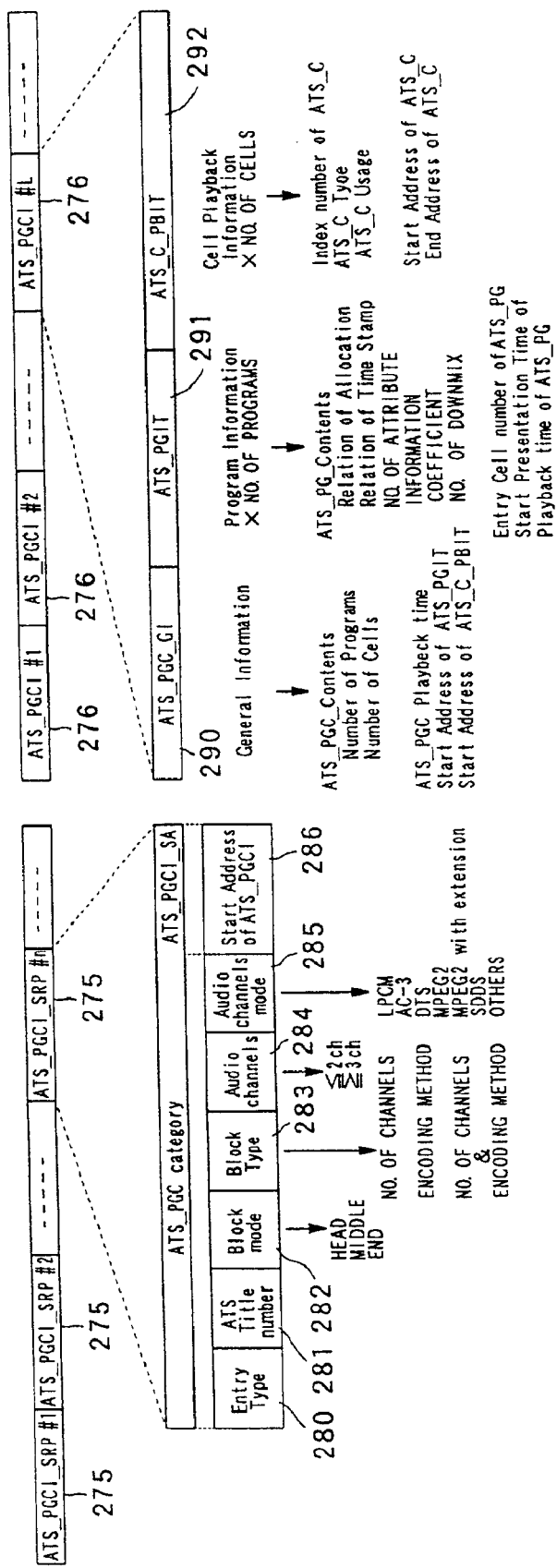
FIG. 9B is another diagram showing the information to be recorded on the ATS.

Moreover, the DVD audio format has the logical structure of selecting the audio information, when the audio title (AOTT) or the AV/audio only common title (AVTT/AOTT) is reproduced by the audio player. As for the structure to achieve this function, the navigation information thereof is firstly explained with reference to FIGS. 9A and 9B. FIGS. 9A and 9B are block diagrams showing in detail the structure of the ATS 203 shown in FIG. 3 or 8.

(5.1) ATSI

As mentioned above, the ATS 203 is provided with: the ATSI 211 serving as the navigation information; the AOTT_AOBS 10' serving as the audio substantial information (AOTT_AOB 210); and the ATSI_BUP 213 serving as the backup for the ATSI 211.

As shown in FIG. 9A, the ATSI 211 is composed of an ATSI_MAT 270 serving as the management information and an ATS_PGCIT 271 that is a table of the reproduction control information.

(5.1.1) ATSI_MAT

Address information of the various tables, attribute information with regard to the audio substantial information, the down-mix coefficient etc., are described in the ATSI_MAT 270 of the management information.

(5.1.1) Attribute Information

As for the AOTT_AOB 210 included in the AOTT_AOBS 210', for each AOTT_AOB 210, the encoding method, the sampling frequency, the quantizing bit number, the number of channels, the multi-channel type, the channel assignment and so on are described in the attribute information. If the AOTT_AOBS 210' is present in the ATS 203 as mentioned above, a plurality of kinds of audio information are individually divided and recorded in the AOTT_AOBS 210' as another AOTT_AOB 210. Moreover, some of ATS 203 may not have the AOTT_AOBS 210'. In this case, the attribute information with regard to the audio stream of the VOB (e.g., the AOTT_VOB and the AVTT_VOB) 10 recorded in the video zone is described. Thus, if the plurality of kinds of audio information are recorded in the VOB 10 as a plurality of streams, the stream number thereof and the attribute information thereof are described for each stream.

(5.1.2) ATS_PGGIT

The ATS_PGCIT 271 is composed of an ATS_PGCIT 272 for describing the information with regard to the reproduction control information as a whole, a table 275 of a search pointer (ATS_PGCI_SRP) 275 to search the reproduction control information corresponding to a title, and a table 274 of a reproduction control information (ATS_PGCI) 276 itself.

(5.1.2.1) ATS_PGCI_SRP

Figure 11:
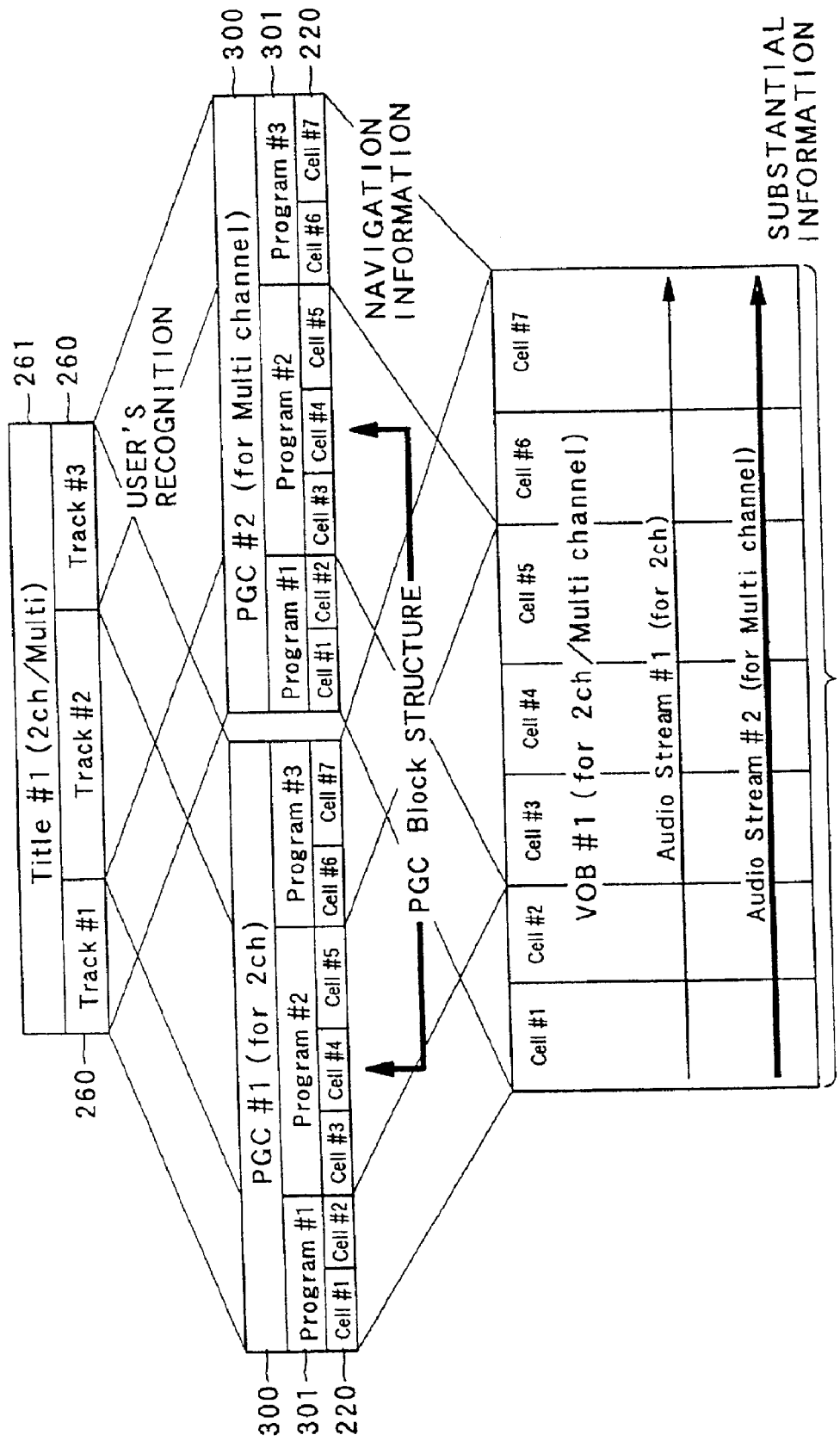
FIG. 11 is a diagram showing a relation between substantial information, navigation information and a user recognition at a time of reproducing a title commonly used for video and audio.

The present invention records on the disc a plurality of audio information which are different in kind, and also treats the audio information, which are common in record target, as the same work and the same music composition, as a rule. Thus, as shown in FIGS. 10 and 11, the present invention introduces a PGC 300 as the management information, and correlates the plurality of audio information, which are different in kind, with a single title 261. The method of managing the audio information by using this PGC 300 will be explained later in detail. The present invention has a logical structure of making the PGC 300 to a block, when correlating the plurality of audio information, which are different in kind, with the single title 261.

Then, the reproduction control information of the audio substantial information managed by this PGC 300 is an ATS_PGCI 276. The information to search the ATS_PGCI 276 corresponding to each title 621 is described in the ATS_PGCI_SRP 275. For example, for each ATS_PGCI 276, whether or not its PGC 300 is an entry is described therein. The entry is information indicative of the PGC 300 representing a PGC block. Moreover, the title number within the ATS 203, the presence or absence of a formation of the PGC block, the relation in the PGC block (a lead, a middle and an end of the PGC block), the type of a block, the number of channels, the encoding method, the start address of the ATS_PGCI 276 and so on are described in the ATS_PGCI_SRP 275.

As mentioned above, the corresponding ATS_PGCI 276 is obtained with the ATS title number and the ATSI number in the AOTT_SRP 247 in the AMG 202, at the time of the title reproduction. The confirmation of the ATS_PGCI_SRP 275 in the ATS 203 of the corresponding number can search a position at which the ATS_PGCI 276 corresponding to the ATS title number is recorded.

Moreover, the case in which a plurality of audio information correspond to a single title implies the existence of a plurality of ATS_PGCI_SRP 275 having the same ATS title number. In this case, it is judged by also considering other information (e.g., the type of the block, the number of channels and the encoding method). Accordingly, the optimum PGC 300 is selected, and then the reproduction is started.

(1.2.2) ATS_PGCI

ATS_PGCIs 276 serving as the reproduction control information corresponding to the respective titles are arranged following the table of the search pointer, and constitute the table.

The present invention uses division information of a program 301, as shown in FIG. 10 or 11, in order to manage the audio substantial information in accordance with the PGC 300. The program 301 is information of dividing the above-mentioned cell 220 by a reproduction unit of a single song or the like, and information corresponding to a track 260. Thus, the PGC 300 corresponding to a title 261 manages one or a plurality of programs 301. This information is described in the ATS_PGCI 276.

The single ATS_PGCI 276 is provided with: an information (ATS_PGC_GI) 290 with regard to the PGC 300 as a whole; a table ATS_PGCIT 291 in which the information with regard to the respective programs 301 constituting the PGC 300 is collected; and a table ATS_C_PBIT 292 in which the information with regard to the respective cell 200 constituting the program 301 is collected.

(5.1.2.2.1) ATS_PGC_GI

The number of programs, the number of cells, the PGC reproduction time, start addresses of the respective tables following this information and the like are described in the ATS_PGC_GI 290, as the information with regard to the PGC 300 as a whole.

(5.1.2.2.2) ATS_PGIT

Information ATS_PGI with regard to the programs 301 constituting the PGC 300 are arranged following the ATS_PGC_GI 290, by the number of programs in the reproducing order, and then constitute a table ATS_PGIT 291. Information for a continuous reproduction, information to specify an attribute of audio substantial information (AOB) reproduced by the program, information to specify a downmix coefficient, a cell number corresponding to a head or lead of the program, a start PTS, a program reproduction time and the like are described in a single ATS_PGI.

As for the information to specify the attribute of this ATS_PGI, the attribute information of the audio substantial information actually written in the above-mentioned ATSI_MAT 270 is specified as an attribute number, and then both of them are correlated with each other, so that the detailed attribute information of the program can be obtained. Since it is a structure of defining this attribute number for each program, the DVD audio format has a structure of changing the attribute for each song.

However, there is information with regard to an attribute even in the ATS_PGCI_SRP 275. The attribute information described in the ATS_PGCI_SRP 275 is the information to select the audio substantial information that are different in kind, and describes only the attribute information common among the respective programs 301. Conversely speaking, the encoding method must be common even if the attribute can be freely set by the unit of program. Moreover, if assembling the PGC blocks, it is necessary that all the programs 301 within the PGC 300 conform to a limitation in which the number of channels is also unified at two channels or less, or unified at three channels or more.

Moreover, the cell 220 to which the program 301 corresponds can be known in accordance with the cell number corresponding to the lead of the program.

(5.1.2.2.3) ATS_C_PBIT

Information ATS_C_PBI with regard to the cells constituting the PGC 300 are arranged following the ATS_PGIT 291, by the number of cells in the reproducing order, and then constitute a table ATS_C_PBIT 292. An index number, a cell type, a start address, an end address and the like are recorded in a single ATS_C_PBI. An address on the disc of the audio substantial information corresponding to the title 261 is known by the ATS_C_PBI at this time.

For example, it is assumed that a user instructs a third song of a certain title group 262. Moreover, it is assumed that this title group 262 is constituted by a single title 261. The ATS_PGCI corresponding to the title 261 is obtained as mentioned above. Since it is the third song, a third ATS_PGIT 291 corresponding to the program #3 is read out to then obtain a lead cell number #n in it. Since it is recognized that the program 301 (#3) begins at the cell 220 (#n), the $n^{th}$ ATS_C_PBI is read out, and a start address described therein is obtained. Then, it jumps to the start address, and starts the reproduction of the third song.

(5.2) Method of Recording Audio Information

How to record a plurality of audio information, which are different in kind, in this embodiment will be described.

The AOB 210 as the audio substantial information and the VOB 10 as the AV substantial information are respectively included in the ATS 203 and the VTS 3, as mentioned in the explanation of the physical structure of each audio disc. Moreover, the substantial information to be reproduced as the audio title are also referred to as the AOTT_AOB and the AOTT_VOB, respectively. A single set in which a plurality of AOTT_AOBs are unified is referred to as the AOTT_AOBS, and a single set in which a plurality of AOTT_VOBs are unified is referred to as the AOTT_VOBS, respectively.

A plurality of audio information which are different in kind are actually classified into three kinds, as described below.

(a) A plurality of audio information which are different in recording condition (for example, a normal recording and a binaural recording, a recording at a front portion in a hall and a recording at an S seat, a one-point recording and a recording by a multi-microphone and the like)

(b) A plurality of audio information which are different in encoding method (for example, the LPCM and the MPEG, the Dolby AC-3, the SDDS, the DTS and so on)

(c) A plurality of audio information which are different in reproducing manner (the number of channels is two or less, or three or more)

The recording condition, the encoding method and the reproducing manner can be determined independently of each other. However, the plurality of audio information, which are presently targeted and different in kind, are audio information which are common in recording target as a rule, and should be treated as the same work (title) and the same song (track). These plurality of audio information which are different in kind are recorded on the disc by using two different methods.

(5.2.1) AOTT_VOBS Having Plurality of Audio Streams

Even in the DVD audio format, the method of recording the audio information containing the video information is identical to that of the DVD video format, for the sake of the compatibility with the DVD video format. Then, if recording a plurality of audio information which are different in kind together with the video information, they are multiplexed and recorded with the same substantial information (AOTT_VOB) as another stream. As mentioned in the explanation of the video format, the video information, the audio information and the sub picture information are defined as respectively different streams in the VOB 10. Each of them is divided into a pack unit (2048 Bytes), is multiplexed by this unit and is recorded on the disc as a single system stream.

Here, the audio information can be defined up to a maximum of 8 kinds. Thus, a plurality of audio information which are different in kind can be recorded as different streams having stream numbers different from each other. The case in which such a recording method is used can have the compatibility with the DVD video format. Moreover, this also has a merit that the kind of audio information can be easily changed just by changing the stream processed by the reproducing apparatus at the time of the reproduction. Moreover, if regarding it as the video title, it is recorded as the single substantial information, and thereby it can be naturally treated as the same title and the same track. Thus, a plurality of audio information which are different in the number of channels and the like can be properly recorded without introducing confusion to a user.

However, such a manner of multiplexing the streams is not suitable for the audio format. The DVD has the limitation that the sum of data transfer rates of all the streams must be equal to or less than 10.08 Mbps. Thus, it is impossible to multiplex two streams shown in a following TABLE 1.

TABLE 1

| | Audio coding mode | fs | Qb | Number of channels | Bit Rate |
|---|---|---|---|---|---|
| Stream #1 | LPCM | 96 k | 24 bits | 2 ch | 4.608 Mbps |
| Stream #2 | LPCM | 48 k | 16 bits | 8 ch | 6.144 Mbps |
| Total | | | | | 10.742 Mbps |

It is required to always record a non-compressed LPCM audio onto the audio DVD. Thus, if the sampling frequency is high, or if the number of channels is large, the required data transfer rate becomes high. Hence, it can be said that this method of multiplexing the streams is not suitable for the case of mainly recording a plurality of non-compressed LPCM audio sounds with the audio information as a main body of the record information.

The audio format is required to emphasize the recording function and the conformation to the presently-used studio unit, and especially required to simply carry out the recording operation. If it has a structure of multiplexing a plurality of variable rates of streams as well as the video streams such as the DVD video format, the management information must be included in the data. Moreover, this management information has a structure of describing the address information with regard to data before and after several minutes. So, if regarding as the recording unit, data cannot be recorded on the disc, unless the data before and after the several minutes is completely collected. Thus, this results in a problem that the simple recorder cannot be constituted. Moreover, this results in a problem that a new authoring unit is required in addition to the present studio units.

(5.2.2) Plurality of Block AOTT_AOBS

If only the audio information is recorded, the settlement of the above-mentioned problems is considered to be more important to thereby employ the structure required as the audio format. So, it is determined that only one kind of audio stream is recorded in a single substantial information (AOTT_AOB) and that if a plurality of audio information which are different in kind are recorded, they are separated and recorded in separate areas on the disc as another substantial information (AOTT_AOB). Such a structure enables any number of audio information to be recorded, as long as a data transfer rate of a single audio information is equal to or less than 10.08 Mbps. Moreover, since the only one kind of audio stream is recorded, if the audio information thereof is a fixed rate of data such as the non-compressed LPCM, it is not necessary that the management information is included in the data. Hence, the recording process becomes also simple.

It is not necessary to simultaneously record the two-channel audio information and the multi-channel audio information. Moreover, it is not so necessary to quickly switch them over. Thus, in the case of separating them into different substantial information and recording them, the process associated with the switching operation at the time of the reproduction becomes relatively complex. However, it can be said that it is not a serious problem.

However, in this case, a mechanism of treating the plurality of substantial information as the same titl is required. Moreover, it is necessary to unitedly treat the audio information which are recorded in the AOTT_VOB as the plurality of streams, under the same mechanism.

(5.3) Audio Selection

As mentioned above, there are roughly two methods as the method of recording a plurality of audio information which are different in kind. However, the two methods have the problems, respectively. So, in the present invention, the reproduction control information has the logical structure described below to thereby solve the problems in the respective methods and enable the proper audio selection. Here, the audio selection implies the operation of switching between the plurality of audio information, which are different in kind, are required to be treated as the same title and are recorded in different areas on the disc.

At first, if employing the method of separating a plurality of audio information, which are different in kind, into different areas as different substantial information (AOTT_AOB) and then recording them, the cell 220 constituting each AOB 210 is divided into a unit of a program 301 as a second division unit, with respect to the reproduction of a plurality of respective audio substantial information (in this case, since they are the audio titles, AOTT_AOB 210 (AOB #1 and AOB #2)) which are different in method of recording the audio substantial information (in the case of FIG. 10, the recording manner of the two-channel and the multi-channel), as shown in FIG. 10. Moreover, the respective programs 301 are identified in accordance with program numbers (#1, #2, #3, . . . ) as the second division information. This program 301 is a reproduction unit corresponding to the track 260, and correspond to, for example, a single song. Thus, although the respective audio substantial information (AOTT_AOB 210 (AOB #1 and AOB #2) are different in recording method, since the contents thereof are the same to each other, the number and the order of programs 301 with regard to the respective audio substantial information become equal to each other, respectively. In the case of FIG. 10, they are constituted by the programs #1, #2 and #3, respectively.

Next, the respective programs 301 (the programs #1, #2 and #3) are unified by respective different PGCs 300 (PGC #1 and PGC #2) constituted into blocks as the management information. Then, the programs 301 (the programs #1, #2 and #3) including the audio substantial information which are respectively different in recording method are correlated with the same track 261 (#1), by making these PGCs 300 (the PGC #1 and the PGC #2) correspond to the same track 261 (the track #1, in the case of FIG. 10). That is, the present invention correlates the audio substantial information of the program unit identified in accordance with the program number as the second division information, which are respectively different in recording method, with the track 261 which serves as the first division unit identified in accordance with the track numbers (#1, #2, #3, . . . ) as the first division information and has the same track number, by using the different PGC 300 constituted into the block as the management information.

By the above-mentioned configuration, even if employing the method of separating the plurality of audio information, which are different in kind, into different areas on the disc as different substantial information (AOTT_AOB) and then recording them, the plurality of audio substantial information which are different in kind can be unitedly treated, by selecting the PGC 300 for managing the audio substantial information of the recording method which is suitable for the capability of the pertinent reproducing apparatus or the instruction of the user, so that it is recognized as the same title and the same song by the user.

Next, if employing the method of recording the audio substantial information, which are different in recording method, in the recording area of the video format by using the stream multiplexing method, as shown in FIG. 11, the audio substantial information AOTT_VOB 10 (VOB #1, in the case of FIG. 11) is correlated with the same track 261 (the track #1, in the case of FIG. 11), by using different PGCs 300 (the PGC #1 and the PGC #2, in the case of FIG. 11) which are constituted into blocks and prepared for each recording method (the recording manners of the two-channel and the multi-channel, in the case of FIG. 11). In addition, the fact that the respective PGCs 300 manage the programs 301 (the programs #1, #2 and #3, in the case of FIG. 11) is similar to the case of FIG. 10.

The employment of the above-mentioned logical structure enables the method of recording the respective audio substantial information to be managed by the respective PGCs 300. Thus, the audio information based on the desired recording method can be properly reproduced just by selecting the PGC 300 based on the recording method, without directly referring to the navigation information within the audio stream. In short, according to the present invention, the audio information recorded in the video format can be managed in accordance with the control information of the audio format. Of course, even in this case, it is recognized as the same title and the same song by the user. Hence, the plurality of audio information which are different in kind can be unitedly treated by selecting the PGC suitable for the capability of the pertinent reproducing apparatus or the instruction of the user.

As mentioned above, according to the present invention, the audio selection can be carried out by using the same mechanism, even if the audio information is recorded on the AOTT_AOB (in case of reproducing the audio title) or even if it is recorded on the AOTT_VOB (in case of reproducing the AV/audio only common title). Thus, the present invention is effective when the audio title (AOTT) or the AV/audio only common title (AVTT/AOTT) is reproduced by the audio player.

Moreover, how this audio selection is carried out is explained by using the actual example with reference to FIGS. 12A, 12B, 13A and 13B.

(5.3.1) Audio Selection in Audio Title

At first, the case is explained in which the audio title is reproduced by the audio player or the compatible player. Here, it is assumed that all the title groups are constituted under a single title. It is also assumed that the reproducing apparatus is dedicated to the two-channel or the user sets to select the two-channel reproduction, and that the user instructs the reproduction of a title group 262 (#j).

As mentioned above, the ATS title number and the ATS number of the title corresponding to the title group 262 are obtained by referring to the AOTT_SRP 247 (refer to FIG. 8). As a result, it is assumed that the ATS number is #2 and the ATS title number is #3. The flow until here is as explained in (4.5.1.1) the case of the audio player and in (4.5.1.2) case of the compatible player.

Next, the ATSI 211 of the ATS #2 is read out to then store the attribute information written in the ATSI_MAT 270 (refer to a path indicated by "P12(1)" of FIG. 12). The attribute of each track of the title to be reproduced cannot be specified at this stage. All the attribute information are stored as a temporary measure.

Figure 12A:
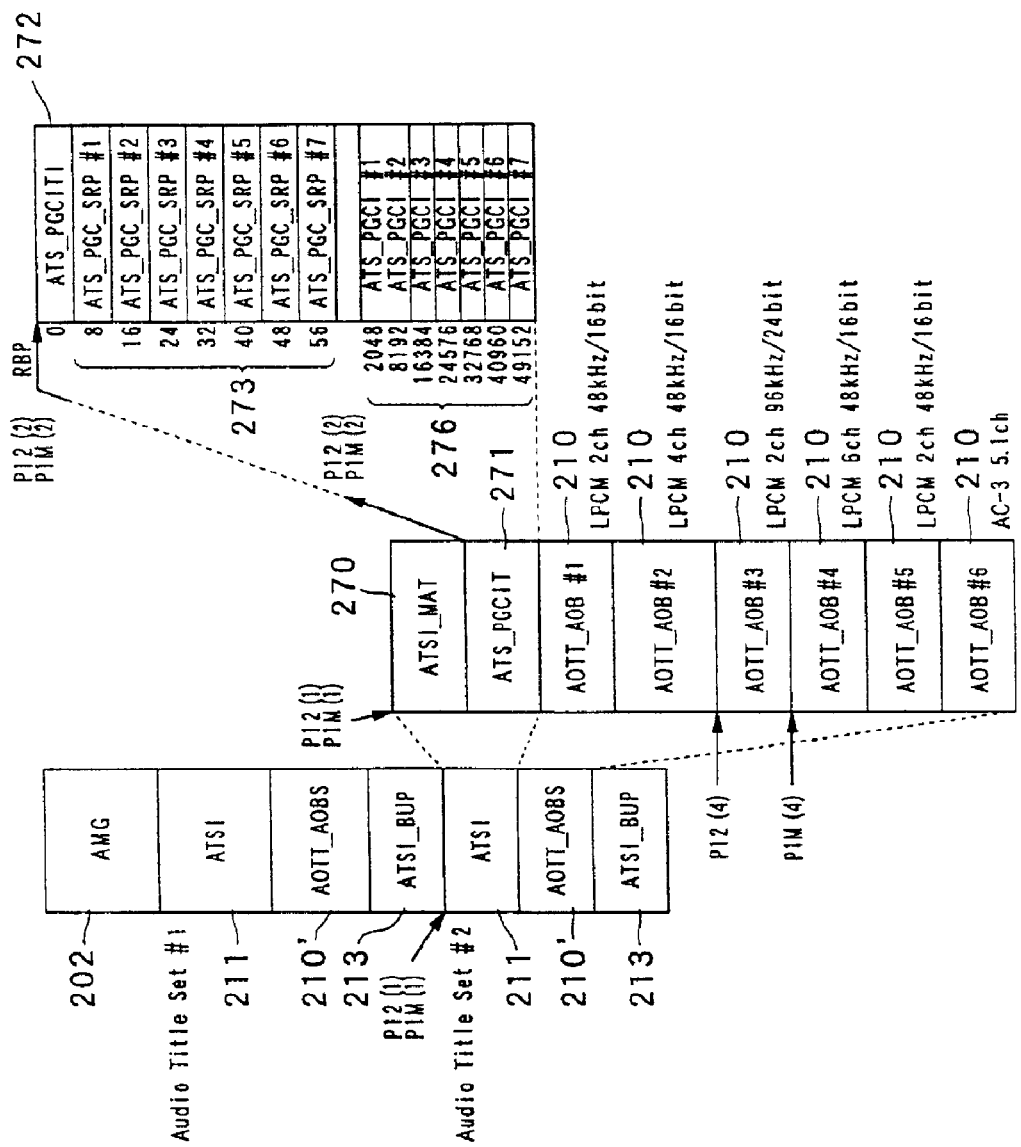
FIG. 12A is one diagram showing information to be recorded to an ATSI of a DVD disc recorded in the audio format.
Figure 13A:
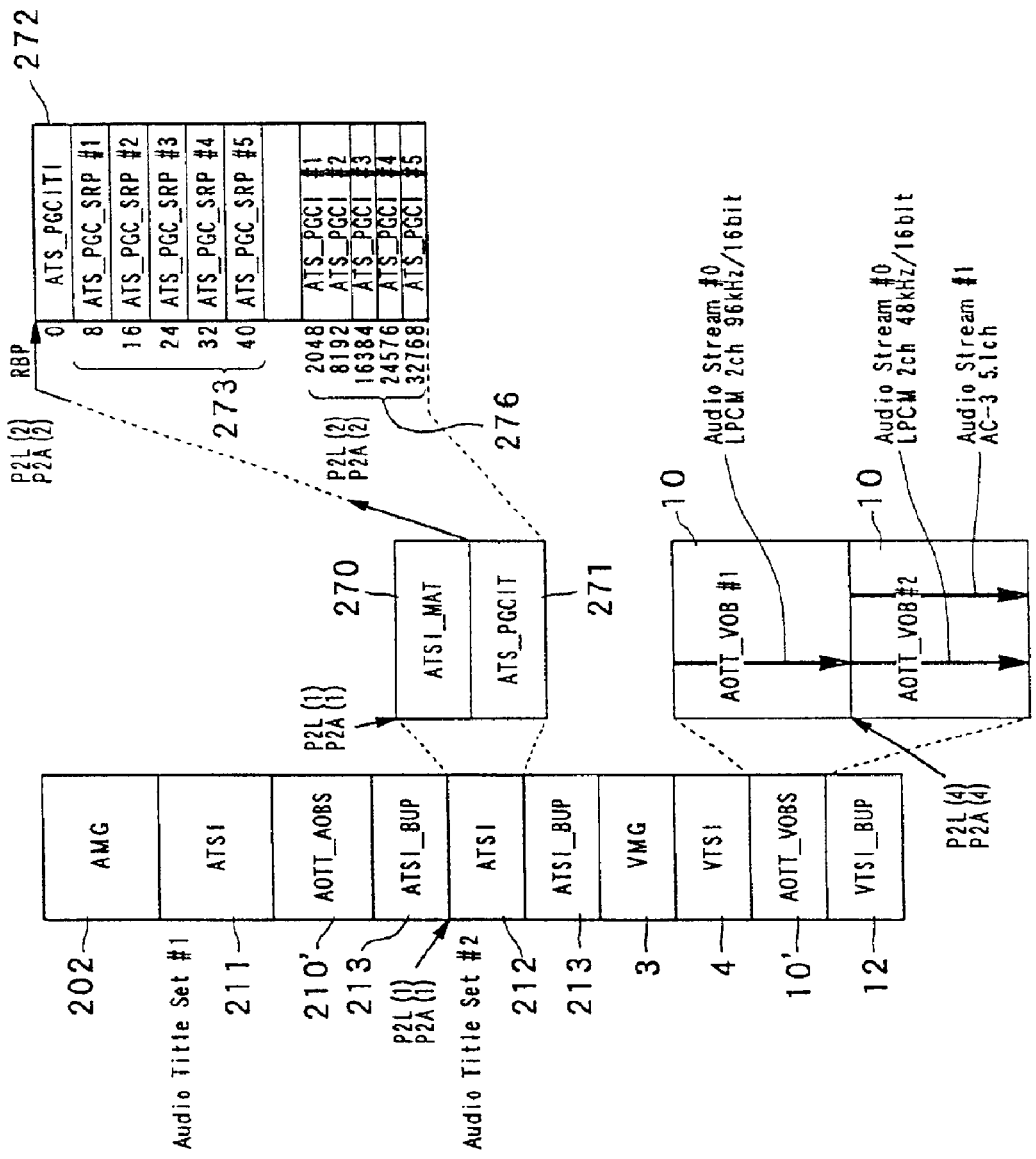
FIG. 13A is one diagram showing information to be recorded to an ATSI of a DVD disc recorded in the audio format and the video format.
Figure 13B:
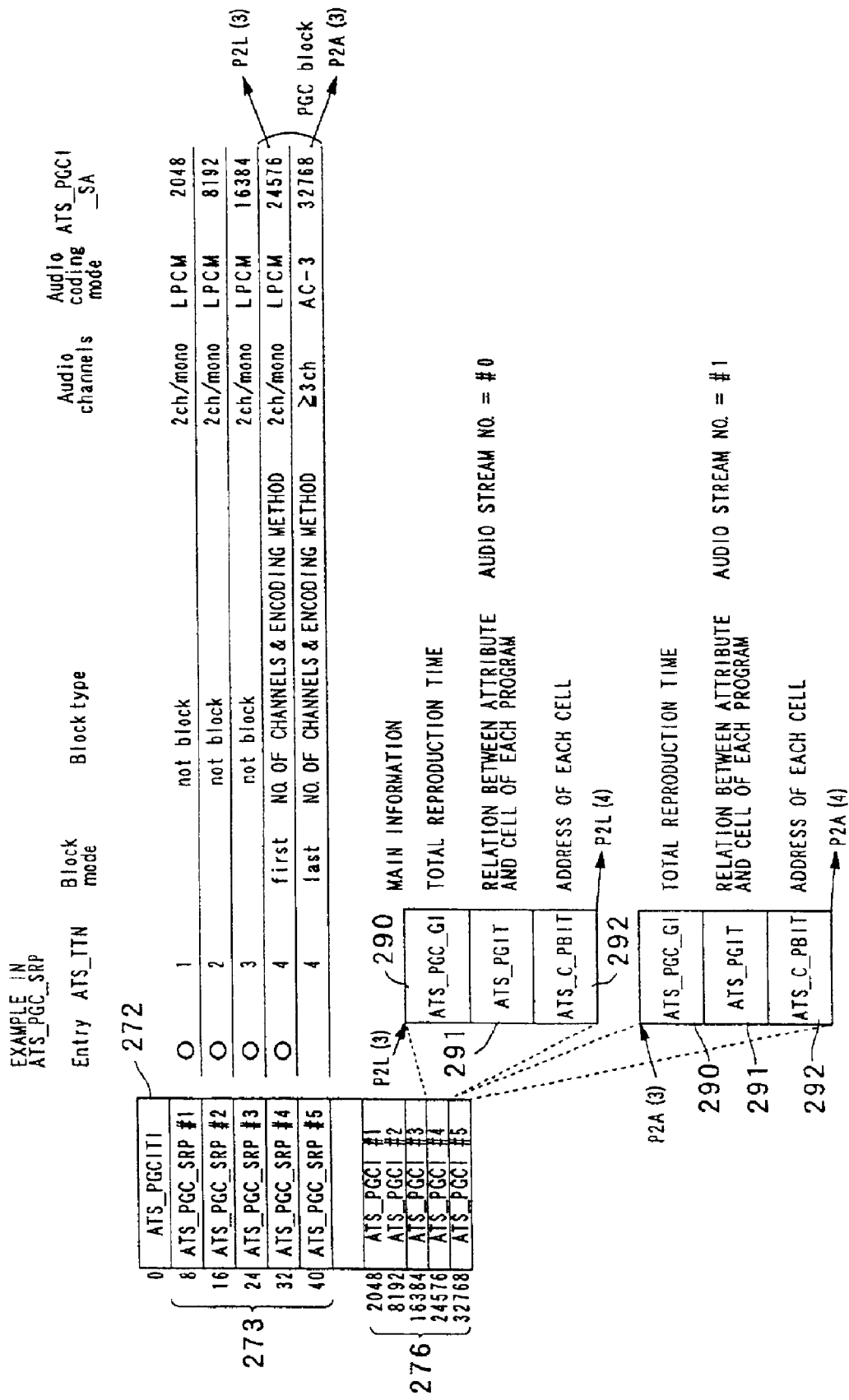
FIG. 13B is another diagram showing the information to be recorded to the ATSI of a DVD disc recorded in the audio format and the video format.

In succession, the ATS_PGCIT 271 is read out to then read out the PGCI search pointer (ATS_PGCI_SRP) 273 in it (refer to a path indicated by "P12(2)" of FIG. 12). The ATS_PGCI_SRP 273 in which the ATS title number (ATS_TTN) is #3 is searched in this table. In this case, it is recognized that there are two ATS_PGCI_SRPs 273 (#3 and #4) in which the ATS title number as the first division information is #3 and that they constitute the PGC block. Then, it is judged which one of the PGCs 300 is to be selected. In this case, the item of a block type is referred to since the reproducing apparatus is dedicated to the two-channel or the user sets to select the two-channel reproduction. Here, the fact that the PGC block is assembled in accordance with the difference of the number of channels is written in the item. Thus, an item 284 of Audio Channels (refer to FIGS. 9, 12A and 12B) is observed to select the PGC 300 in which Two-Channel Or Less is written. Then, an address in which the reproduction control information ATS_PGCI 276 of the selected PGC 300 is written is obtained (16384, in this case) to then jump to this address and read out the reproduction control information therefrom and further store it (refer to a path indicated by "P12(3)" of FIG. 12).

There are an information table with regard to the cell 220 and an information table with regard to the program 301 corresponding to the track 260, in the reproduction control information. If starting from a lead or head of the title, the ATS_PGI of the program #1 is referred to so that the information specifying the attribute of the program #1 and the previously-stored attribute information are used to thereby specify the attribute of the program #1. The audio decoder is set in accordance with this attribute. Next, the lead cell number of the program #1 is read out from the ATS_PGCI (in this case, since the target to be reproduced is the program #1, the lead cell number thereof is duly #1). Then, the address at which the cell 220 is recorded is read out from the ATS_C_PBI corresponding to the number to then jump to this address and start the reproduction therefrom (refer to a path indicated by "P12(4)" of FIG. 12).

In the case of the normal reproduction, the reproduction of the cell is continued by using the ATS_C_PBI stored in the memory which is being reproduced, until a next program. When the reproduction of the program is ended, the attribute information and the ATS_PGI in the memory at this time are also used to carry out a series of processes for reproducing the next program. Then, the reproduction is started. This operation is repeated until the end of the title. Thus, it is required to store all the reproduction control information ATS_PGCI and the attribute information within the management information as mentioned above.

Next, it is assumed that the reproducing apparatus corresponds to the multi-channel reproduction and that a user sets to select the multi-channel reproduction, and that the user instructs the reproduction of the title group 262 (#j).

An ATS title number #3 and an ATS number #2 of the title corresponding to the title group 262 are obtained to then read out an ATSI 211 of the ATS #2. The processes until here are identical to the case of selecting the two-channel reproduction (refer to a path indicated by "P1M(1)" of FIG. 12). Moreover, the attribute information written in the ATSI_MAT 270 of the ATSI 211 is stored, and the ATS_PGCIT 271 is read out to then read out the ATS_PGC search pointer 273 in it (refer to a path indicated by "P1M(2)" of FIG. 12). The processes until here are also identical to the case of selecting the two-channel reproduction.

The ATS_PGC_SRP 273 in which the ATS title number (ATS_TTN) is #3 is searched in this table. In this case, it is recognized that there are two ATS_PGCI_SRPs (#3 and #4) in which the ATS title number is #3 and that they constitute the PGC block. Then, it is judged which one of the PGCs 300 is to be selected. In this case, the item of the block type is referred to since the reproducing apparatus corresponds to the multi-channel reproduction and further the user sets to select the multi-channel reproduction. The fact that the PGC block is assembled in accordance with the difference of the number of channels is written in the item. Then, the item 284 of Audio Channels is referred to so that the PGC 300 in which Three-Channel Or More is written is selected. Then, the address in which the reproduction control information ATS PGCI 276 of the selected PGC 300 is written is obtained (24576, in this case) to then jump to this address and read out the reproduction control information therefrom and further store it (refer to a path indicated by "P1M(3)" of FIG. 12).

The processes after this stage are basically identical to the case of selecting the two-channel reproduction except that the PGC 300 to be processed is different and the substantial information to be reproduced is different. The ATS_PGI of the program #1 is referred to in the information table with regard to the program, in the reproduction control information to then specify the attribute of the program #1 to further set the audio decoder. Next, the ATS_C_PBI of the lead cell number #1 of the program #1 is read out from the ATS_PGI to then read out the address, at which the cell #1 is recorded, and further jump to this address and then start the reproduction (refer to a path indicated by "P1M(4)" of FIG. 12).

(5.3.2) Audio Selection in AV/audio Only Common Title

The case is explained in which the AV/audio only common title is reproduced by the audio player. Here, it is assumed that all the title groups 262 are constituted under a single title, the reproducing apparatus is dedicated to the LPCM or a user sets to select the reproduction of the LPCM, and that the user instructs the reproduction of the title group 262 (#j).

As mentioned above, the ATS title number and the ATS number of the title 261 corresponding to the title group 262 are obtained by referring to the AOTT_SRP 247. As a result, it is assumed that the ATS number is #2 and the ATS title number is #4. The flow until here is as explained in the (4.5.3.1) case of the audio player.

Next, the ATSI 211 of the ATS #2 is read out to then store the attribute information written in the ATSI_MAT 270 (refer to a path indicated by "P2L(1)" of FIG. 13). The attribute of each track of the title to be reproduced cannot be specified at this stage. All the attribute information are stored as a temporary measure. Also, since the AV/audio only common title is to be reproduced, the corresponding ATS 203 is the ATS having only the navigation information without the substantial information.

In succession, the ATS_PGCIT 271 is read out to then read out the PGCI search pointer 273 among it (refer to a path indicated by "P2L(2)" of FIG. 13). The ATS_PGCI_SRP 273 in which the ATS title number (ATS_TTN) is #4 is searched in this table. In this case, it is recognized that there are two ATS_PGCI_SRPs 273 (#4 and #5) in which the ATS title number is #4 and that they constitute the PGC block. Then, it is judged which one of the PGCs 300 is to be selected.

In this case, the item of the block type is referred to since the reproducing apparatus is dedicated to the LPCM or the user sets to select the LPCM reproduction. Here, the fact that the PGC block is assembled in accordance with the difference of the numbers of channels and the encoding method is written in the item. Thus, the item 285 of Audio Coding Mode is referred to so that the PGC 300 in which the LPCM is written is selected.

Next, an address in which the reproduction control information ATS_PGCI 276 of the selected PGC is written is obtained (24576, in this case) to jump to this address and then read out the reproduction control information and further store it (refer to a path indicated by "P2L(3)" of FIG. 13).

There are the information table with regard to the cell 220 and the information table with regard to the program 301 corresponding to the track 260, in the reproduction control information. If starting from the lead of the title, the ATS_PGI of the program #1 is referred to so that the information specifying the attribute of the program #1 and the previously-stored attribute information is used to thereby specify the attribute of the program #1. The audio decoder is set in accordance with this attribute. Next, the lead cell number of the program #1 is read out from the ATS_PGCI (in this case, since the target to be reproduced is the program #1, the lead cell number thereof is duly #1). Then, an address at which the cell is recorded is read out from the ATS_C_PBI corresponding to the number to then jump to the address and start the reproduction (refer to a path indicated by "P2L(4)" of FIG. 13).

In the case of the normal reproduction, the reproduction of the cell is continued by using the ATS_C_PBI stored in the memory which is being reproduced, until the next program. When the reproduction of the program is ended, the attribute information and the ATS_PGI in the memory at this time are also used to carry out a series of processes for reproducing the next program. Then, the reproduction is started. This operation is repeated until the end of the title. Thus, all the attribute information and the reproduction control information ATS_PGCI within the management information must be stored as mentioned above.

Next, it is assumed that the reproducing apparatus corresponds to the multi-channel and the AC-3 (one kind of encoding method: Dolby Digital) and that a user sets to select the reproduction of the AC-3, and that the user instructs the reproduction of the title group 262 (#j).

The ATS title number #4 and the ATS number #2 of the title 261 corresponding to the title group 262 are obtained to then read out the ATSI 211 of the ATS #2. The processes until here are identical to the case of selecting the LPCM reproduction (refer to a path indicated by "P2A(1)" of FIG. 13). Moreover, The attribute information written in the ATS_MAT 270 of the ATSI 211 is stored to then read out the ATS_PGCIT 271 and further read out the ATS_PGC search pointer 273 in it (refer to a path indicated by "P2A(2)" of FIG. 13). The processes until here are also identical to the case of selecting the LPCM reproduction.

The PGC 300 in which the ATS title number (ATS_TTN) is #4 is searched in this table. In this case, it is recognized that there are two PGCs in which the ATS title number is #4 and that they constitute the PGC block. Then, it is determined which one of the PGCs 300 is to be selected.

In this case, the item of the block type is referred to since the reproducing apparatus corresponds to the multi-channel reproduction and the AC-3 and further a user sets to select the AC-3 reproduction. The fact that the PGC block is assembled in accordance with the difference of the numbers of channels and the encoding method is written in the item. Then, the item 285 of Audio Coding Mode is referred to so that the PGC 300 in which the AC-3 is written is selected. Then, an address in which the reproduction control information ATS_PGCI 276 of the selected PGC is written is obtained (32768, in this case) to jump to this address and then read out the reproduction control information therefrom and further store it (refer to a path indicated by "P2A(3)" of FIG. 13).

The processes after this stage are basically identical to the case of selecting the LPCM reproduction except that the PGC to be processed is different and the stream to be reproduced is different. The ATS_PGI of the program #1 is referred to in the information table with regard to the program, in the reproduction control information to then specify the attribute of the PG #1 to further set the audio decoder. Next, the ATS_C_PBI of the lead cell number #1 of the program #1 is read out from the ATS_PGI to then read out an address at which the cell #1 is recorded, and further jump to this address and then start the reproduction (refer to a path indicated by "P2A(4)" of FIG. 13). However, since the substantial information (AOTT VOB) to be reproduced in this case is the same, an address of a jumping destination is also identical to the case of selecting the reproduction of the LPCM.

(6) Reproducing Apparatus
(6.1) Video DVD Player

Figure 14:
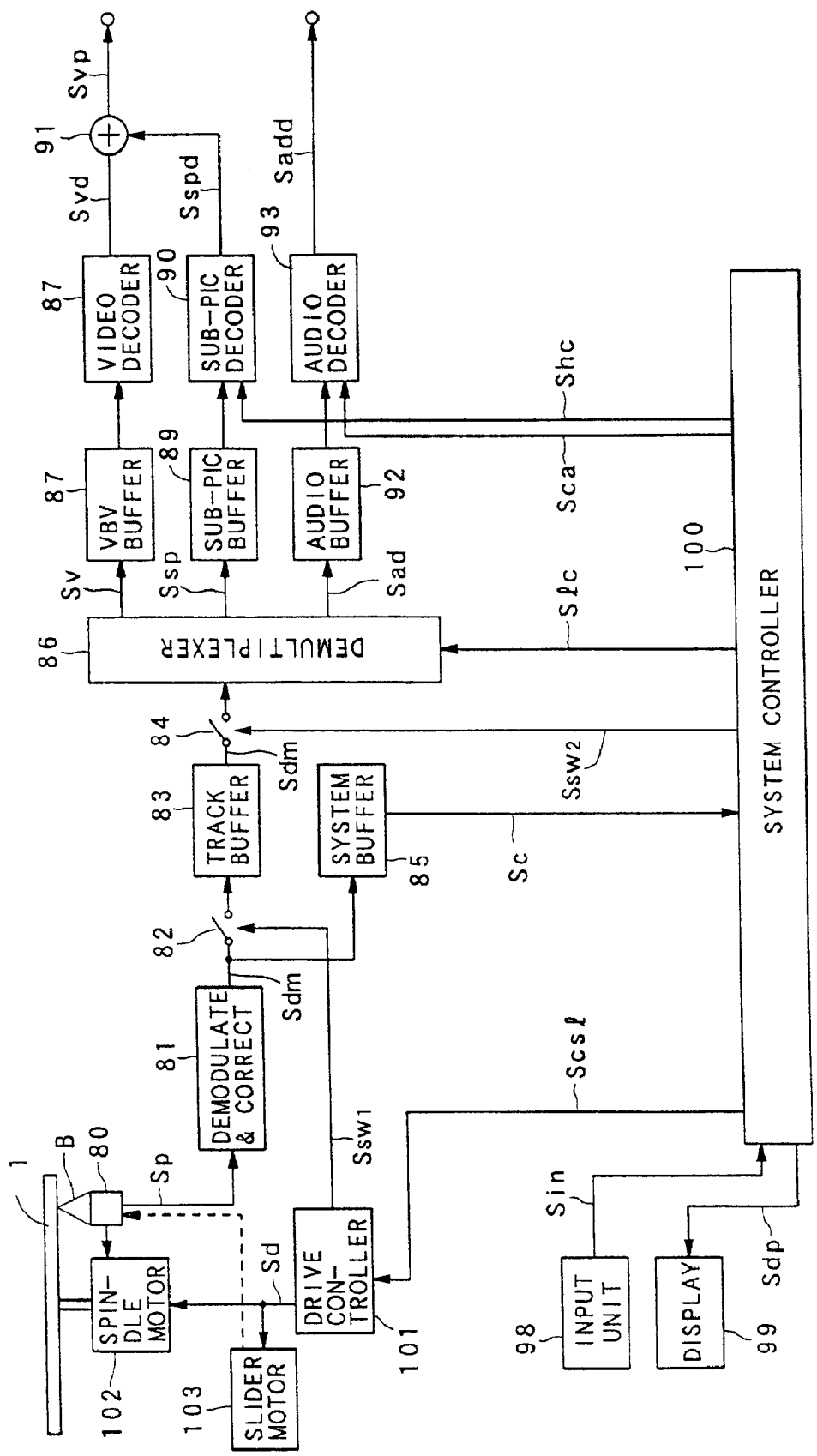
FIG. 14 is a block diagram showing a schematic configuration of a video DVD player.

As shown in FIG. 14, a video DVD player as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; an input unit 98; a display unit 99; a system controller 100; a drive controller 101; a spindle motor 102; and a slider motor 103. The construction shown in FIG. 14 only illustrates the portions related to the video and audio reproduction of the video DVD player. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the management information (e.g. the VMG 2 etc.,) or the VTSI 11 of each VTS 3 which are detected firstly upon loading the DVD 1 and which are related to the whole information recorded on the DVD 1. Then, the system buffer 85 outputs the accumulated data as a control information Sc to the system controller 100, and temporarily stores the DSI data 51 for each navi-pack 41 during the reproduction, to output it also as the control information Sc to the system controller 100.

The demultiplexer 86, to which the demodulation signal Sdm is continuously inputted through the stream switch 84, separates the video data, the audio data, the sub picture data and the PCI data for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89 and the audio buffer 92.

The demultiplexer 86 extracts the pack header, the packet header and the like from each pack (including the audio pack 43), and each packet, and outputs the information included in them as the header signal Shd to the system controller 100.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method. Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture information included in the sub picture signal Ssp with the video information corresponding to the sub picture information, and to output it. Then, the sub picture signal Ssp synchronized with the video information is inputted to the sub picture decoder 90 and is decoded to be outputted as a decoded sub picture signal Sspd to the mixer 91.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, on the basis of the header control signal Shc outputted from the system controller 100, and delays the audio signal Sad in accordance with the output condition of the corresponding video information. Then, the audio signal Sad, which is time-adjusted to synchronize with the corresponding video information, is outputted to the audio decoder 93. Then, a reproducing process based on the linear PCM method is applied thereat to the audio signal Sad on the basis of the header control signal Shc, and it is outputted as a decoded audio signal Sadd to a speaker etc. not illustrated. Incidentally, in the audio DVD including only the audio information, the process of synchronizing the audio information with the video information is not required.

(6.2) Audio DVD Player

Figure 15:
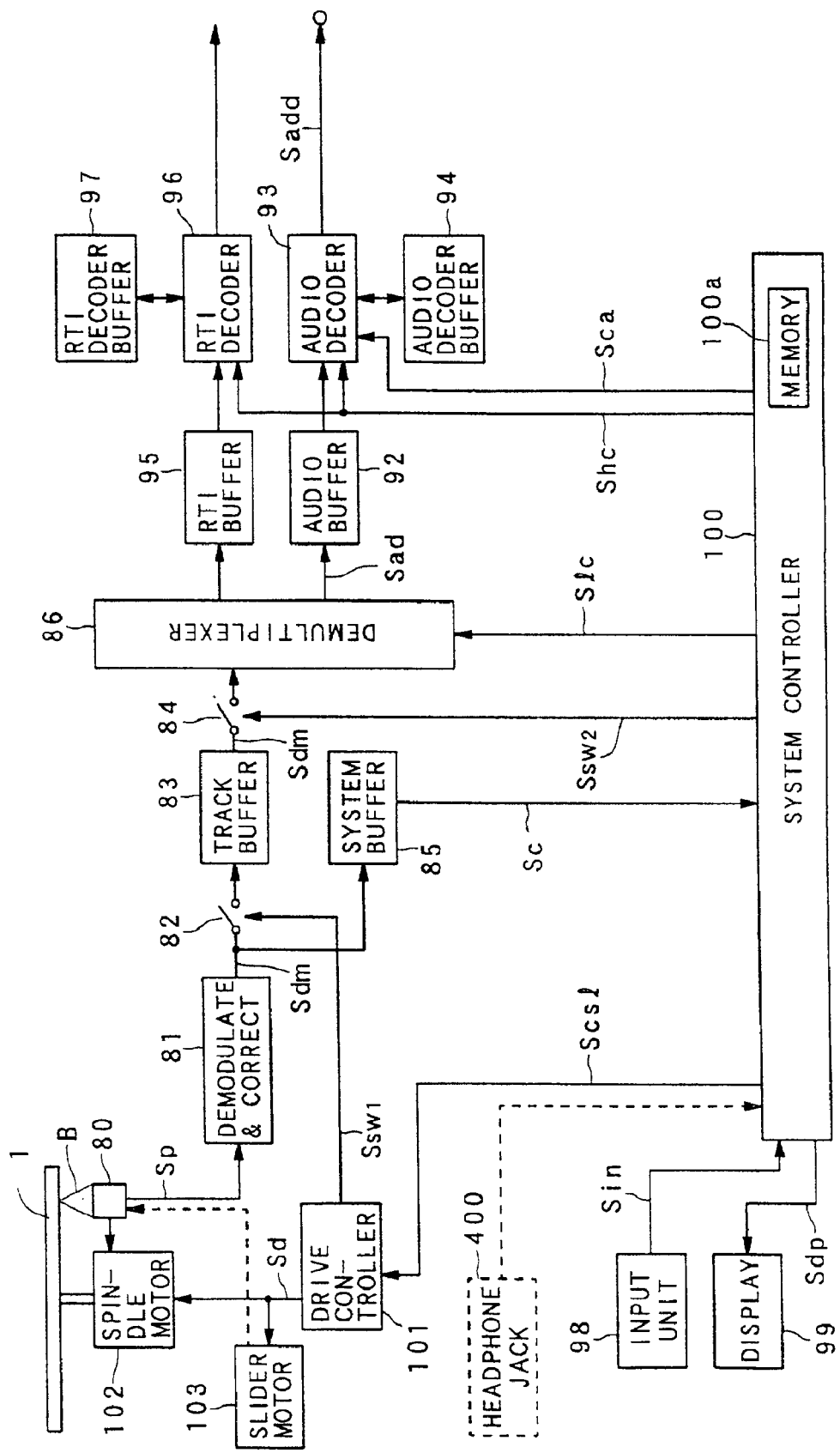
FIG. 15 is a block diagram showing a schematic configuration of an audio DVD player.

Next, the aforementioned audio DVD player is explained with reference to FIG. 15. In FIG. 15, the same constitutional elements as those in FIG. 14 carry the same reference numerals, and the explanations thereof are omitted.

As shown in FIG. 15, the structure at the later stage of the demultiplexer 86 of the audio DVD player is different from that of the video DVD player in FIG. 14. However, the structure other than that of the audio DVD player in FIG. 15 is the same as that of the video DVD player in FIG. 14. Accordingly, the structure at the later stage of the demultiplexer 86 is explained here.

In FIG. 15, the demultiplexer 86, to which the demodulation signal Sdm is continuously inputted through the stream switch 84, extracts the audio information for each pack from the demodulation signal Sdm, and outputs it to the audio buffer 92 as the audio signal Sad.

The audio buffer 92, to which the audio signal Sad is inputted, consists of a FIFO memory, for example. The audio buffer 92 temporarily stores the audio signal Sad and outputs it to the audio decoder 93. Then, a reproducing process based on the linear PCM method is applied thereat to the audio signal Sad on the basis of the header control signal Shc, and it is outputted as a decoded audio signal Sadd to a speaker etc. not illustrated.

The real time information such as the real time text etc., is outputted from the demultiplexer 86 to the RTI buffer 95. The data temporarily stored in the RTI buffer 95 is outputted to the RTI decoder 96 on the basis of the control signal Shc outputted from the system controller 100, so that the lyrics etc., of the song is displayed on the display device which is not illustrated.

If a necessity to temporarily stop the audio sound (i.e., to pause) during the reproduction immediately after the access to a desired information etc., is detected, a pause signal Sca is outputted from the system controller 100 to the audio decoder 93. Then, the audio decoder 93 temporarily stops the output of the demodulated audio signal Sadd.

Figure 16:
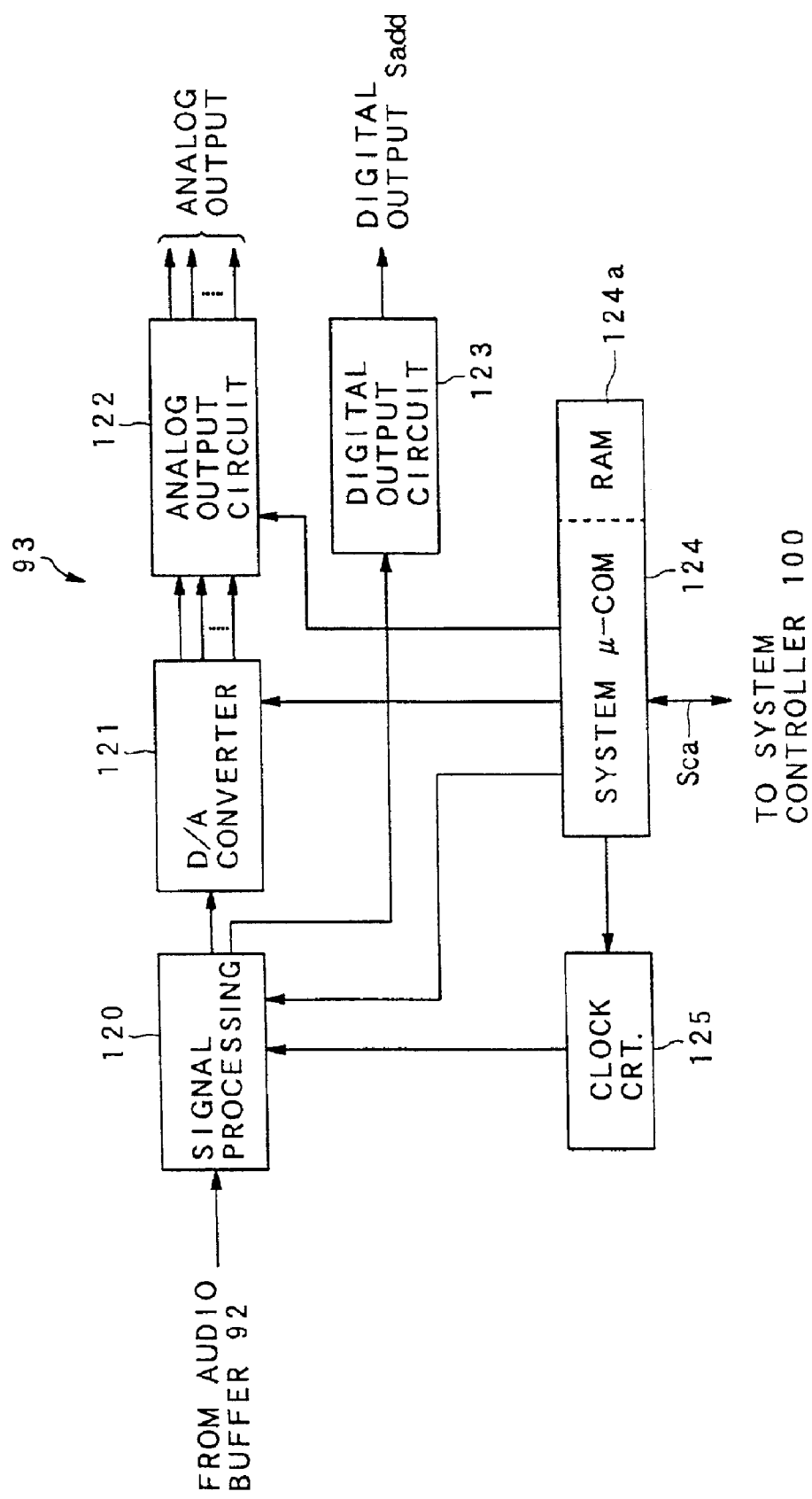
FIG. 16 is a block diagram showing a configuration of an audio decoder in the audio DVD player of FIG. 15.

FIG. 16 shows a configuration of an audio decoder 93. As shown in FIG. 16, the audio decoder 93 is provided with a signal processor 120 containing a digital filter and the like, a D/A converter 121, an analog output circuit 122 containing an amplifier and the like, a digital output circuit 123, a system microcomputer 124 containing an RAM 124a and a clock circuit 125.

The system microcomputer 124 communicates a control signal Sca with the system controller 100, and then controls the operations of the clock circuit 125, the signal processor 120, the D/A converter 121 and the analog output circuit 122. The system microcomputer 124 has the RAM 124a therein. The RAM 124a temporarily stores audio attribute information sent from the system controller 100 as the control signal Sca. The system microcomputer 124 refers to the audio attribute information stored in the RAM 124a, and then sends the content thereof to the clock circuit 125 and the signal processor 120. More concretely, the system microcomputer 124 sends sampling frequency information in the audio attribute information to the clock circuit 125. The clock circuit 125 has an oscillator, and then sends to the signal processor 120 a clock signal fs corresponding to the instructed sampling frequency. Also, the system microcomputer 124 sends the information indicative of a sampling frequency, a quantizing bit number, the number of channels, and the presence or absence of an emphasis in the audio attribute information, to the signal processor 120, and also sends the channel number information to the D/A converter 121. Moreover, the system microcomputer 124 sends information, such as an amplification degree in a signal of each channel and the like, to the analog output circuit 122. The information of the amplification degree for each channel can be sent by the system controller 100 while the information thereof is included in the audio attribute information.

The signal processor 120 uses the clock signal fs from the clock circuit 125, and then carries out the processes, such as a decoding operation of the audio signal sent from the audio buffer 92, a band limitation and the like, in accordance with the information, such as the encoding method (e.g., the linear PCM, the Dolby AC-3 and the like), the sampling frequency (fs), the quantizing bit number (Qb) and the like, which is obtained from the system microcomputer 124, and carries out a de-emphasizing process in accordance with the information of the presence or absence of emphasis, to output it to the D/A converter 121. The D/A converter 121 divides the inputted signal for each channel, in accordance with the channel information obtained from the system microcomputer 124, and further outputs them to the analog output circuit 122 as an analog signal for each channel. Moreover, the signal processor 120 sends the digital audio signal Sadd through the digital output circuit 123 to external portion.

(6.3) Compatible DVD Player

The compatible DVD player is constituted such that the VBV buffer 87, the video decoder 88, the sub picture buffer 89, the sub picture decoder 90 and the mixer 91 in the video DVD player shown in FIG. 14 in addition to the structure of the audio DVD player shown in FIG. 15, and that the system controller 100 is configured so as to enable the reproduction of both of the video format and the audio format.

(7) Audio Selection in Reproducing Apparatus

The audio selection in the reproducing apparatus implies the operation of switching between kinds of audio information to be reproduced, when the audio player reproduces the audio title or the AV/audio only common title.

The audio information is mainly classified into the following three kinds, which are explained in (5.2) the method of recording the audio information.
(a) Recording Condition
(b) Encoding Method
(c) Reproducing Manner (7.1) Case of Assembling Block Based on Recording Condition (Binaural)

If the recording condition is different, the switching operation may be always done in accordance with the taste of a user, irrespectively of the capability of the apparatus. Thus, it is not necessary to carry out an initial setting and the like. Moreover, in a case of the binaural recording, the reproducing apparatus can also perform the following switching manner.

Here, the binaural recording to achieve the binaural reproduction is explained in detail.

Figure 17A:
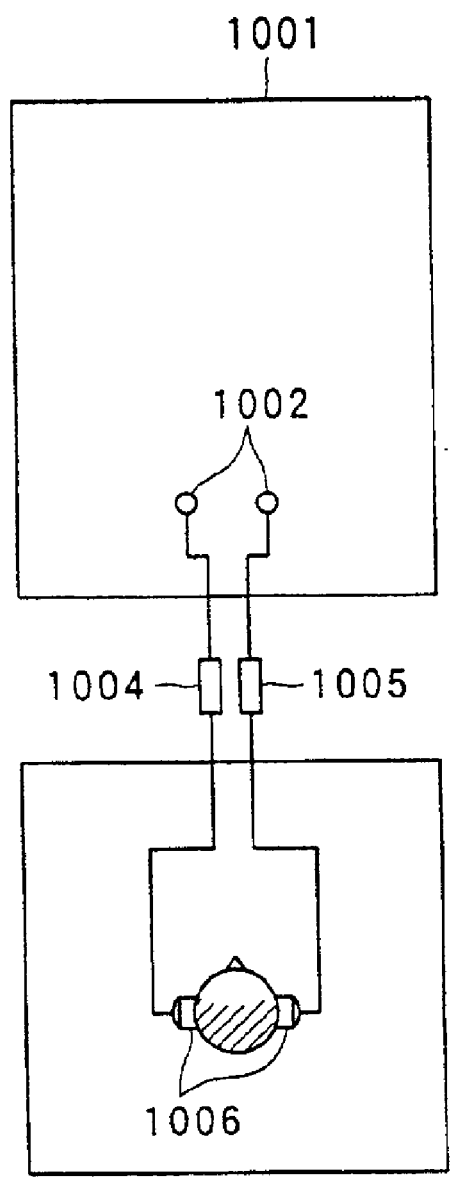
FIG. 17A is a diagram showing a sound field generated in a case of reproducing music information reproduced by an ordinary stereo with a headphone.

At first, suppose that a normal stereo signal is reproduced by a headphone. For example, as shown in FIG. 17A, two microphones 1002 are arranged at predetermined positions in a concert hall 1001, and these outputs of the microphones 1002 are reproduced through amplifiers 1004 and 1005 by a headphone 1006. In this case, reproduction sound field is generated at a rear head portion of a listener, as shown by the slanted lines in FIG. 17A. This reason is as follows. That is, in the normal stereo reproduction signal sound field using a speaker, a sound image is perfectly fixed in one speaker. Thus, it is necessary that a level difference between a left speaker and a right speaker is approximately 25 dB. On the contrary, in a case of a headphone listening, a sound image is perfectly fixed in one ear at a level difference of approximately 10 dB. In this way, if the user listens to a music, on which the normal stereo recording is performed, with the headphone, this results in a problem that stereo feeling becomes excessively strong and natural presence is not attained.

Figure 17B:
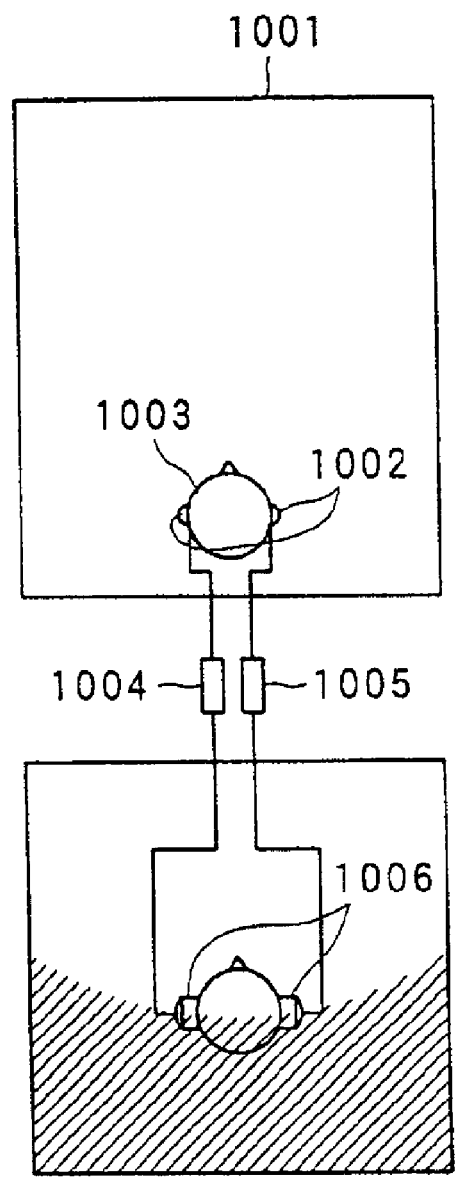
FIG. 17B is a diagram showing a sound field generated in a case of reproducing music information binaurally reproduced with a head phone.

On the contrary, a dummy head having the acoustic impedance and performance substantially equal to those of an actual human is prepared in the binaural reproduction, and microphones are set around external auditory miatuses of both ears of this dummy head. As shown in FIG. 17B, for example, a dummy head 1003 is placed in a guest box of the concert hall 1001, and then the outputs of the microphones 1002 within the dummy head 1003 are reproduced through the amplifier 1004 and 1005 by the headphone 1006. If such a binaural reproduction is done, the sound field generated around a head of the listener belongs to a range shown by the slanted lines of FIG. 17B. Thus, the further natural presence can be attained in the listening operation with the headphone, an ear phone or the like.

Figure 18:
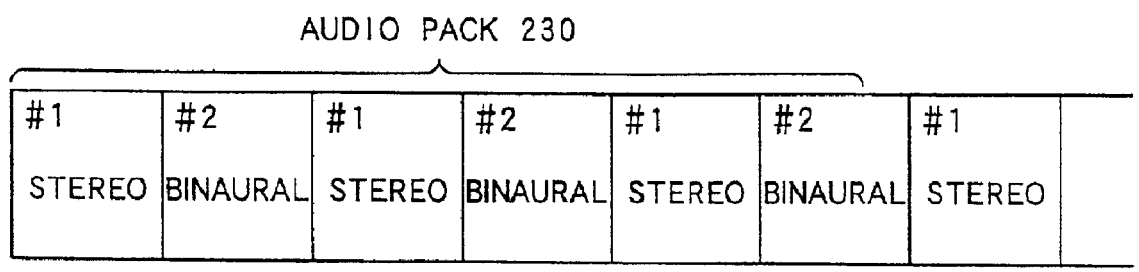
FIG. 18 is a diagram showing multiplexed audio packs, each of which is two-channel-recorded by a stereo method, and audio packs, each of which is two-channel-recorded by a binaural method.

It is the binaural recording that uses the above-mentioned dummy head to then record music, in order to attain such a binaural reproduction. For example, as shown in FIG. 18, it is possible to multiplex and record both of a work recorded binaurally as mentioned above and a stereo-recorded work on the DVD disc to thereby carry out the proper reproduction in accordance with the listening manner. In addition, the recording method is not limited to the multiplexing method. The stereo-recorded audio substantial information and the binaurally-recorded audio substantial information may be respectively recorded in different AOB 210.

The judgment as to whether or not the binaural reproduction is carried out is done by mounting, for example, a headphone jack 400 shown by a dashed line in FIG. 15, in the reproducing apparatus and then checking whether or not a plug of the headphone is inserted into this headphone jack 400.

Figure 19:
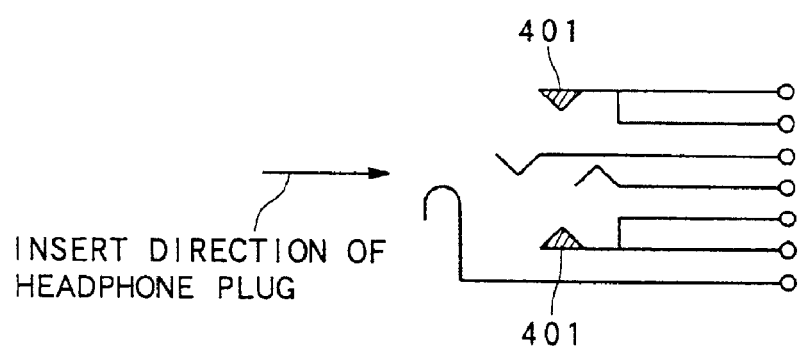
FIG. 19 is a diagram showing an example of a circuit configuration of a headphone jack.

This headphone jack 400 has, for example, a circuit configuration shown in FIG. 19. Switches 401 which are pushed up by the contact with the plug of the headphone are mounted in both of the top and the bottom of the plug. Then, when these switches 401 are pushed up by the insertion of the plug, the switches 401 become in an open state, which enables the insertion of the plug to be detected.

By such a configuration, when the plug of the headphone is inserted into the headphone jack 400 and then a certain song is specified by a user, the PGC for managing the binaurally-recorded audio substantial information is selected in accordance with the above-mentioned procedure, and the binaurally-recorded audio substantial information is automatically reproduced.

Thus, the user can listen to a binaurally-recorded desirable song by merely inserting the plug of the headphone into the headphone jack 400.

In addition, the detection as to whether or not the plug of the headphone is inserted into the headphone jack 400 is done at a proper timing, such as a time of starting the reproduction, a middle of the reproduction and the like. Moreover, it is not always necessary to select the binaurally-recorded audio substantial information when the plug of the headphone is inserted into the headphone jack 400. Instead, it is allowable to design a configuration in which the user sets a priority order by using a setting operation of the input unit 98 shown in FIG. 15. For example, when setting a higher priority order for the reproduction of the stereo recording, the user can listen to the stereo-recorded audio substantial information with the headphone.

(7.2) Case of Assembling by Encoding Method

If the encoding method is different, a user cannot listen to a sound unless the reproducing apparatus corresponds to the encoding method of the audio information recorded on the disc (unless it has the corresponding decoder). Such a situation causes the user to be confused. Thus, it is established that the audio information of the LPCM is recorded on all the discs and all the reproducing apparatuses can reproduce the LPCM. Hence, the user can reproduce at least the LPCM-recorded audio information even if any audio DVD disc is used.

On the other hand, various encoding methods are presently put to practical use. Most of them are a compressed encoding method. They have the characteristic that data can be effectively utilized, especially if the multi-channel is recorded. When there are audio information recorded by the various encoding methods based on such a purpose, only if the reproducing apparatus has the corresponding decoder, it is possible to select and reproduce them. In this case, the reproducing apparatus judges from the information indicative of the encoding method written in the item 285 of Audio Coding Mode in the already-explained ATS_PGCI_SRP 273, in accordance with a temporary setting of the user, an initial setting of the user and a setting of the reproducing apparatus, and then selects the optimum audio information in accordance with a flowchart shown in FIG. 20, and further carries out the reproduction.

In addition, each setting process may be done by the input unit 98 shown in FIG. 14 or 15. Moreover, the set information may be adapted so as to be stored in a memory within the system controller 100.

Moreover, the following configuration may be possible. That is, when the DVD disc is set in the reproducing apparatus or the reproduction is started, the system controller 100 reads out the control information recorded on the DVD disc as mentioned above, and then displays the recording manner, the reproducing manner or the encoding method of the audio substantial information recorded on the DVD disc, on the display 99. By such a configuration, the user can properly know the setting that can be selected in the DVD disc, and can carry out the proper selection operation.

An example of a process of selecting the PGC from the information indicative of the encoding method will be described below with reference to the flowchart shown in FIG. 20.

At first, when the selecting process is started (Step S1), the ATS_PGCI_SRP 273 is read out (Step S2) to then read out the encoding method written in the item 285 of Audio Coding Mode described in the ATS_PGCI_SRP 273 (Step S3). Next, it is judged whether or not the reproducing apparatus has the function of carrying out the reproduction in accordance with the read out encoding method (Step S4). As a result, if the reproducing apparatus does not have the function of carrying out the reproduction in accordance with the read out encoding method (Step S4; NO), the processes beginning from the operation of reading out the ATS_PGCI_SRP 273 are again repeated (from the step S2). On the other hand, if the reproducing apparatus has the function of carrying out the reproduction based on the read out encoding method (Step S4; YES), it is judged whether or not a user selects the read out encoding method as a temporary setting (Step S5). This setting is done when the reproduction is started or during the reproduction, for example, by using a remote controller and the like. For example, as for a particular song, it is done if reproducing in accordance with the encoding method different from the existing setting. As a result of the judgment, if the user selects the read out encoding method as the temporary setting (Step S5; YES), the selecting process is ended. Then, the PGC 300 indicated by the ATS_PGCI_SRP 273 is selected to start the reproduction (Step S8).

However, if the user does not select the read out encoding method as the temporary setting (Step S5; NO), it is judged whether or not the user selects the read out encoding method as the initial setting (Step S6). In this initial setting, the basic encoding method of the reproducing apparatus is done in accordance with the taste of the user itself and the like. Thus, if this initial setting is done, all the songs are reproduced in accordance with the initially set encoding method, unless the above mentioned temporary setting is done. In short, if the user selects the read out encoding method as the initial setting (Step S6; YES), the selecting process is ended. Then, the PGC 300 indicated by the ATS_PGCI_SRP 273 is selected to start the reproduction (Step S8).

If the user does not select the read out encoding method as the initial setting (Step S6; NO), it is judged whether or not the read out encoding method is selected as the setting of the reproducing apparatus (Step S7). This setting is done at a stage when the reproducing apparatus is manufactured. So, unless the user carries out the above-mentioned various settings, all the songs are reproduced in accordance with this set encoding method. In short, if the read out encoding method is selected as the setting of the reproducing apparatus (Step S7; YES), the selecting process is ended. Then, the PGC 300 indicated by the ATS_PGCI_SRP 273 is selected to start the reproduction (Step S8).

In addition, if the read out encoding method is not selected as the setting of the reproducing apparatus either, because of error of the read out data and other reasons (Step S7; NO), the processes beginning from the operation of reading the ATS_PGCI_SRP 273 are again repeated (from the step S2).

(7.2) Case of Assembling Based on Reproducing Manner

The selection of the reproducing manner at this time implies the selection as to whether the two-channel (stereo) reproduction is done or the multi-channel reproduction is done. If the reproducing apparatus corresponds to the multi-channel, it is possible to select and reproduce the audio information of the multi-channel record. However, only if the user has a system that can reproduce the multi-channel (e.g., a plurality of amplifiers and speakers) and further the reproducing apparatus is connected to the system, the reproduction can be performed as the multi-channel. Thus, also in this case, the reproducing apparatus judges the reproducing manner from the information indicative of the number of channels written in the item 284 of Audio Channels described in the already-explained ATS_PGCI_SRP 273, in accordance with the temporary setting of the user, the initial setting of the user and the setting of the reproducing apparatus, and then selects the optimum audio information in accordance with the flow similar to the already-explained flowchart, and further carries out the reproduction.

(7.3) Case of Assembling Block Based on Encoding Method And Reproducing Manner

As shown in the example of FIGS. 12A and 12B, there is a case that the kind of audio information within the block is different in both of the encoding method and the reproducing manner. Such a case needs the following processes.

Namely, a priority order is set for all the combinations of the respective encoding methods and the respective reproducing manners that can be processed by the reproducing apparatus. An example is shown in TABLE 2. It is constructed such that the setting in this manner can be done in each of the temporary setting of the user, the initial setting of the user and the setting of the reproducing apparatus, as the occasion demands.

TABLE 2

**Priority order to All Combination of Encoding method And Reproducing Manner

|  | LPCM | Encoding method A | Encoding method B |
|---|---|---|---|
| Two-channel Reproduction | 4 | 5 | 6 |
| Multi-channel Reproduction | 1 | 3 | 2 |

In addition, TABLE 2 implies that the smaller the value in the table, the higher the priority order.

Figure 21:
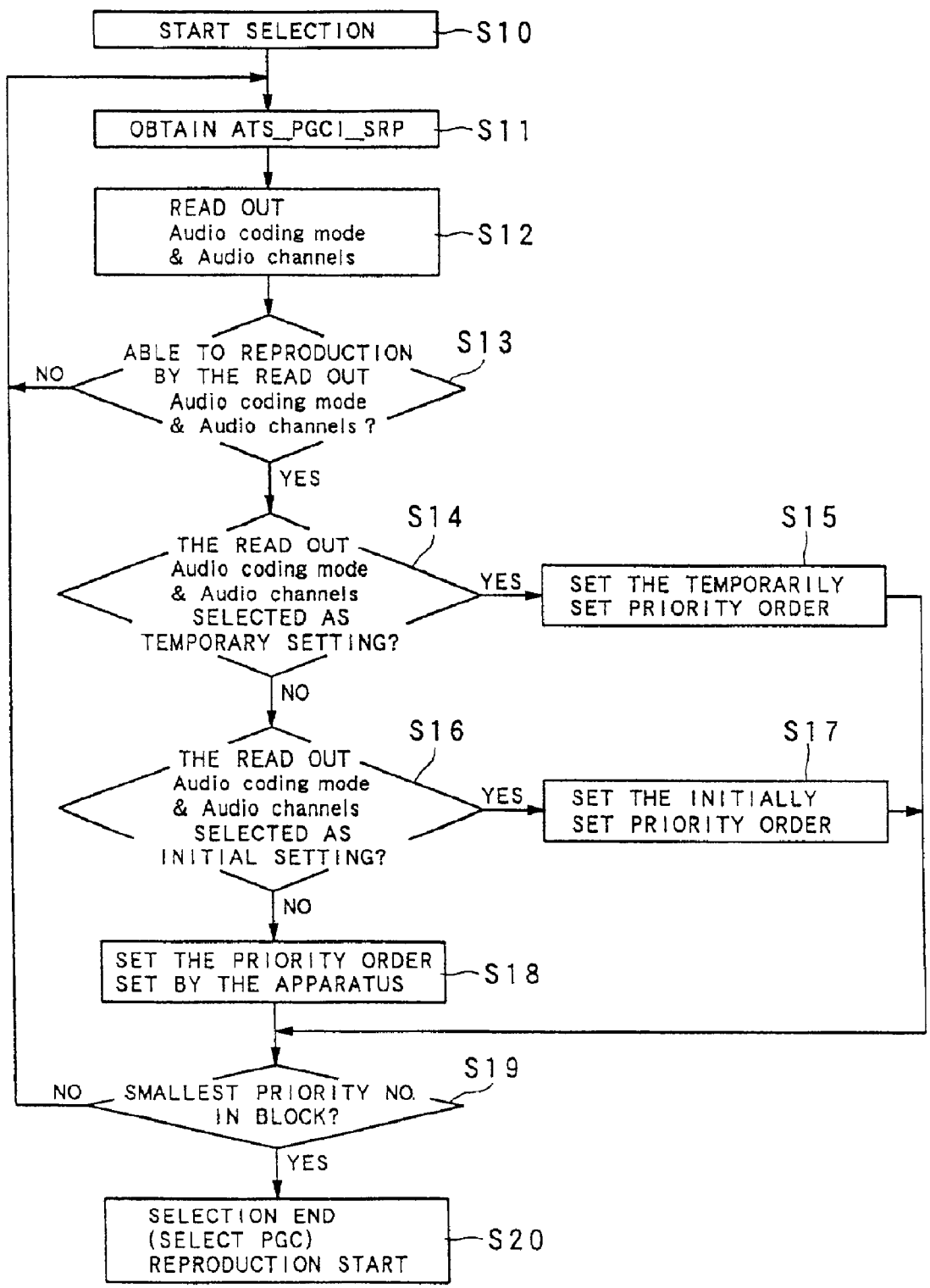
FIG. 21 is a flowchart showing an example of a process of selecting PGC from information in which an encoding method and a reproducing manner are combined.

The optimum audio information is selected to carry out the reproduction, as in the flowchart shown in FIG. 21, in accordance with this setting of the priority order. An example of a process for selecting the optimum audio information and then carrying out the reproduction will be described below, in accordance with the flowchart shown in FIG. 21.

At first, when the selecting process is started (Step S10), the ATS_PGCI_SRP 273 is obtained (Step S2) to then read out the encoding method written in the item 285 of Audio Coding Mode and the reproducing manner described in the item 284 of Audio Channels in the ATS_PGCI_SRP 273, in accordance with the block type (Step S12). Next, it is judged whether or not the reproducing apparatus has the function of carrying out the reproduction based on the combination of the read out encoding method and reproducing manner (Step S13). As a result, if the reproducing apparatus does not have the function of carrying out the reproduction based on the combination of the read out encoding method and reproducing manner (Step S13; NO), the processes beginning from the operation of reading out the ATS_PGCI_SRP 273 are again repeated (from the step S11). On the other hand, if the reproducing apparatus has the function of carrying out the reproduction based on the combination of the read out encoding method and reproducing manner (Step S13; YES), it is judged whether or not a priority order is set for the selection as the temporary setting of the user, for the combination of the read out encoding method and reproducing manner (Step S14). If the priority order is set (Step S14; YES), the priority order is set for the selection as the temporary setting of the user, as a priority order number, for the combination of the read out encoding method and reproducing manner (Step S15). Then, it is judged whether or not this set priority order is the smallest within the block (Step S19). If it is the smallest (Step S19; YES), the selecting process is ended. Then, the PGC 300 indicated by the ATS_PGCI_SRP 273 is selected to start the reproduction (Step S20).

On the other hand, if the set priority order number is not the smallest number within the block (Step S19; NO), the processes beginning from the operation of obtaining the next ATS_PGCI_SRP 273 of the block are repeated (from the step S11). Then, as for the combination of the next encoding method and reproducing manner, as mentioned above, it is judged whether or not the reproducing apparatus has the reproducing function, and it is also judged whether or not the priority order is set as the temporary setting of the user. Accordingly, the processes based on the result of the judgment are carried out (Steps S13, S14 and S15).

On the other hand, if the priority order is not set as the temporary setting of the user, for the combination of the next encoding method and reproducing manner (Step S14; NO), it is judged whether or not the priority order is set as the initial setting of the user, for the combination (Step S16). If the priority order is set (Step S16; YES), the priority order as the initial setting of the user is set as the priority order number, for the combination of the read out encoding method and reproducing manner (Step S17). Then, it is judged whether or not this set priority order number is the smallest within the block (Step S19). If it is the smallest (Step S19; YES), the selecting process is ended. Then, the PGC 300 indicated by the ATS_PGCI_SRP 273 is selected to start the reproduction (Step S20).

On the other hand, if the set priority order number is not the smallest number within the block (Step S19; NO), the processes beginning from the operation of obtaining the next ATS_PGCI_SRP 273 of the block are repeated (from the step S11). Then, for the combination of the next encoding method and reproducing manner, as mentioned above, it is judged whether or not the reproducing apparatus has the reproducing function, and it is also judged whether or not the priority order is set as the temporary setting of the user, and it is further judged whether or not the priority order is set as the initial set of the user. Accordingly, the processes based on the result of the judgment are carried out (Steps S13, S14, S15, S16 and S17).

On the other hand, if the priority order is not set as the initial setting of the user, for the combination of the next encoding method and reproducing manner (Step S16; NO), the priority order of the initial setting from the beginning of the reproducing apparatus with regard to the combination is set as the priority order number (Step S18). Then, it is judged whether or not this set priority order number is the smallest within the block (Step S19). If it is the smallest (Step S19; YES), the selecting process is ended. Then, the PGC 300 indicated by the ATS_PGCI_SRP 273 is selected to start the reproduction (Step S20).

As mentioned above, if the priority order is set for the combination of the encoding method and the reproducing manner, the selection of the PGC 300 based on the combination and the reproduction based on the combination are done, as the setting situation of the smallest number in the set priority order.

As explained above, by constituting such that the priority order can be determined by each of the temporary setting of the user, the initial setting of the user and the setting of the reproducing apparatus, as the occasion demands, for the combination of the respective encoding methods and the respective reproducing manners, even if a plurality of audio information which are different in kind are recorded, the optimum audio information can be selected and reproduced without the necessity that the user selects its kind, one by one.

Figure 20:
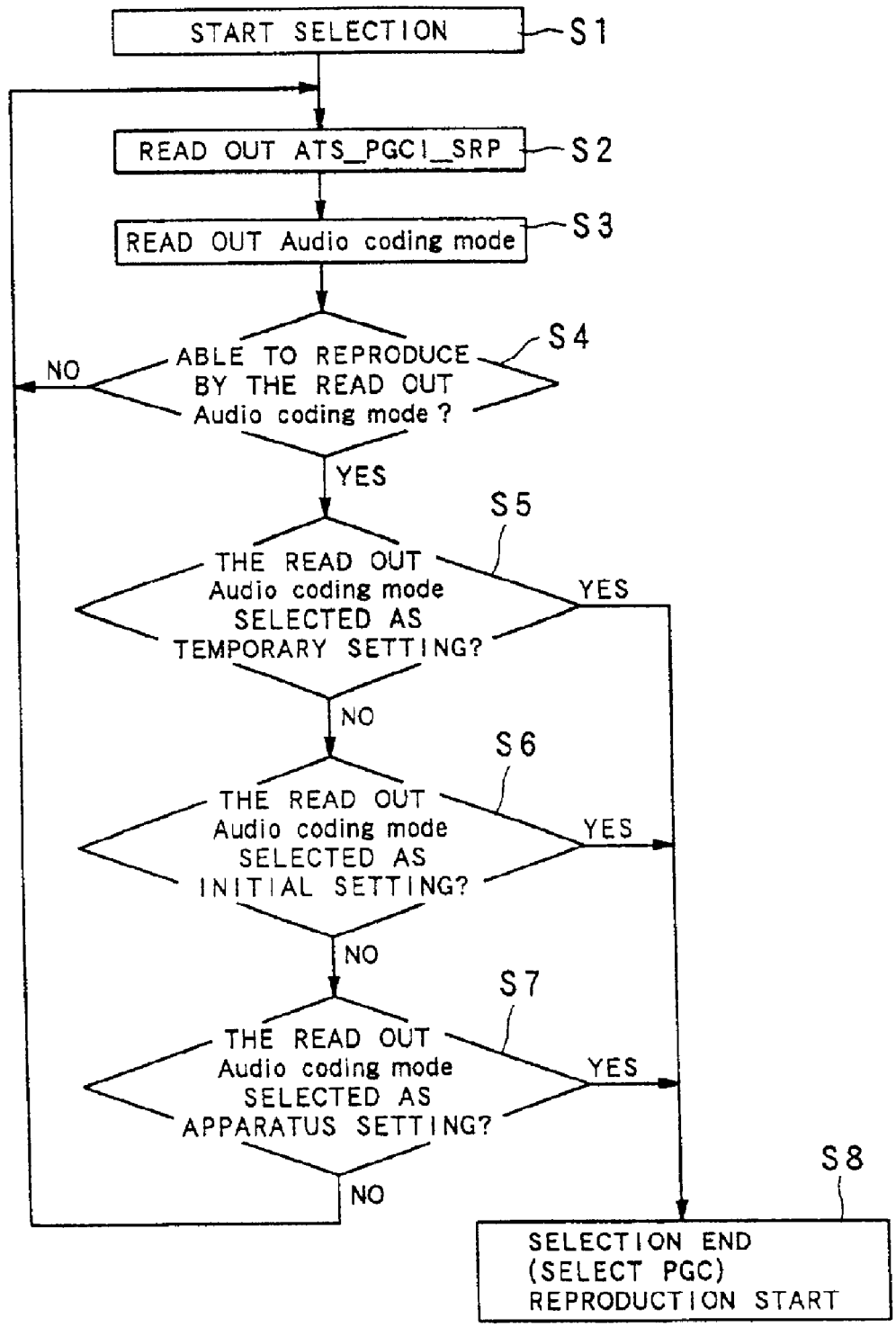
FIG. 20 is a flowchart showing an example of a process of selecting PGC from information indicative of an encoding method.

In addition, if the instruction which does not fit the reproducing capability of the reproducing apparatus or does not select any setting is carried out in the example explained by using FIGS. 20 and 21, it may be constituted such that an alarm display is carried out by a displaying unit, such as a display 99 and the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. Hei. 10-116149 filed on Apr. 10, 1998 including the specification, claims, drawings and summary is incorporated herein by reference in its entirety.

What is claimed is:

1. An information reproducing apparatus for reproducing information from an information record medium comprising: an information recording area on which a plurality of information pieces which are same in content and different in recording method are recorded; and a control information recording area on which control information is recorded, the control information including identification information indicating that the plurality of information pieces are same in content and different in recording method with each other, said information reproducing apparatus comprising:

a reading device which reads the control information from the information record medium; and a reproducing device which reproduces at least one of the plurality of information pieces on the basis of the control information.

2. The apparatus according to claim 1, further comprising:

an inputting device through which designation information is inputted to designate a condition to reproduce the information from the information record medium; and a selecting device which selects the recording method, the information piece in which is to be reproduced, on the basis of the designation information or set information stored in a memory device, wherein the reproducing device reproduces the information piece in the recording method, which is selected by the selecting device from among the plurality of information pieces.

3. The apparatus according to claim 1, further comprising:

an extracting device which extracts information indicating the recording method of each of the plurality of information pieces recorded on the information record medium from the control information; and a displaying device which displays the extracted information.

4. The apparatus according to claim 2, wherein the inputting device is set to receive an input of the designation information regardless of an operation condition of the information reproducing apparatus, and the selecting device or the reproducing device is set to perform, when a content of the designation information inputted through the inputting device is changed, respective process on the basis of the changed designation information.

5. The apparatus according to claim 2, further comprising a re-writing device which re-writes a content of set information stored in the memory device.

6. The apparatus according to claim 2, further comprising a warning display device for performing a warning display on the basis of the designation information or the set information if the recording method selected by the selecting device cannot be processed by the information reproducing apparatus.

7. The apparatus according to claim 2, wherein the selecting device is set to select the recording method, on the basis of initial set information stored in the memory device, in an initial setting condition.

8. The apparatus according to claim 2, further comprising:

a re-writing device which re-writes a content of set information stored in the memory device; and a warning display device which performs a warning display if the recording method selected by the selecting device on the basis of the designation information or the set information cannot be processed by the information reproducing apparatus, the selecting device selecting the recording method, on the basis of (i) designation information inputted by the inputting device, (ii) set information re-written by the re-writing device and (iii) initial set information stored in the memory device in an initial setting condition, in this priority order, as long as the warning display is not performed by the warning display device.

9. The apparatus according to claim 1, further comprising a detecting device which detects an insertion condition of a headphone plug with respect to a headphone jack, wherein the plurality of information pieces are audio information, and wherein the reproducing device reproduces the audio information which is binaural-recorded if the detecting device detects that the headphone plug is inserted in the headphone jack.

10. The apparatus according to claim 1, wherein the plurality of information pieces are audio information, and wherein the identification information comprises:

attribute information indicating an attribute of the audio information; and block type information indicating whether the plurality of audio information are different in a channel number or not.

11. The apparatus according to claim 1, wherein the plurality of information pieces are audio information, and wherein the identification information comprises:

attribute information indicating an attribute of the audio information; and block type information indicating whether the plurality of audio information are different in an encoding method or not.

12. The apparatus according to claim 1, further comprising:

a selecting device which selects the recording method, the information piece in which is to be reproduced, on the basis of the identification information; and wherein the reproducing device reproduces the information piece selected by the selecting device.

13. The apparatus according to claim 1, further comprising:

an inputting device through which designation information is inputted regardless of an operation condition; and a selecting device which selects information piece on the basis of the designation information.

14. The apparatus according to claim 7, wherein the selecting device selects the recording method, on the basis of (i) designation information inputted through the inputting device, and (ii) the initial set information in this priority order.

15. An information reproducing method for reproducing an information record medium comprising: an information recording area on which a plurality of information pieces which are same in content and different in recording method are recorded; and a control information recording area on which control information is recorded, the control information including identification information indicating that the plurality of information pieces are same in content and different in recording method with each other, said information reproducing method comprising the steps of:

reading control information from the information record medium; and reproducing at least one of the plurality of information pieces on the basis of the control information.

16. A method according to claim 15, further comprising the steps of;

inputting designation information to designate a condition to reproduce the information from the information record medium; and selecting the recording method in which the information piece is to be reproduced on the basis of the designation information or set information stored in a memory device, reproducing the information piece which is selected in the step of selecting the recording method.

17. A method according to claim 15, further comprising:

extracting information indicating the recording method of each of the plurality of information pieces recorded on the information record medium from the control information; and displaying the extracted information.

18. A method according to claim 16, wherein the step of inputting designation information includes receiving an input of the designation information regardless of an operation condition associated with the method, and the step of selecting the recording method includes performing, when a content of the designation information is changed, respective process on the basis of the changed designation information.

19. A method according to claim 15, further comprising a step of re-writing a content of set information stored in the memory device.

20. A method according to claim 16, further comprising a step of performing a warning display on the basis of the designation information or the set information if the recording method in the step of selecting the recording method cannot be processed.

21. A method according to claim 16, wherein the step of selecting the recording method includes selecting the recording method, on the basis of initial set information stored in the memory device, in an initial setting condition.

22. A method according to claim 16, further comprising:

re-writing a content of set information stored in the memory device; and performing a warning display if the recording method selected in the step of selecting the recording method on the basis of the designation information or the set information cannot be processed, wherein the step of selecting the recording method includes selecting the recording method, on the basis of (i) designation information inputted in the step of inputting designation information, (ii) set information re-written in the step of re-writing a content of set information, and (iii) initial set information stored in the memory device in an initial setting condition, in this priority order, as long as the warning display is not performed.

23. A method according to claim 15, further comprising a step of detecting an insertion condition of a headphone plug with respect to a headphone jack, wherein the plurality of information pieces are audio information, and wherein the step of reproducing the information piece includes reproducing the audio information which is binaural-recorded if the headphone plug is determined, in said step of detecting an insertion condition, to be inserted in the headphone jack.

24. A method according to claim 15, wherein the plurality of information pieces are audio information, and wherein the identification information comprises:

attribute information indicating an attribute of the audio information; and block type information indicating whether the plurality of audio information are different in a channel number or not.

25. A method according to claim 15, wherein the plurality of information pieces are audio information, and wherein the identification information comprises:

attribute information indicating an attribute of the audio information; and block type information indicating whether the plurality of audio information are different in an encoding method or not.

26. A method according to claim 15, further comprising:

selecting the recording method, the information piece in which is to be reproduced, on the basis of the identification information; and reproducing the information piece which is selected in the step of selecting the recording method.

27. A method according to claim 15, further comprising:

inputting designation information regardless of an operation condition; and wherein the step of selecting the recording method includes selecting information an piece based on the designation information.

28. A method according to claim 21, wherein the step of selecting the recording method includes selecting the recording method, on the basis of (i) designation information inputted in the step of inputting designation information, and (ii) the initial set information in this priority order.

* * * * *